US011748905B2

(12) United States Patent
Zhou et al.

(10) Patent No.: US 11,748,905 B2
(45) Date of Patent: Sep. 5, 2023

(54) EFFICIENT LOCALIZATION BASED ON MULTIPLE FEATURE TYPES

(71) Applicant: Magic Leap, Inc., Plantation, FL (US)

(72) Inventors: Lipu Zhou, Sunnyvale, CA (US); Ashwin Swaminathan, Dublin, CA (US); Frank Thomas Steinbruecker, Mountain View, CA (US); Daniel Esteban Koppel, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 221 days.

(21) Appl. No.: 17/190,327

(22) Filed: Mar. 2, 2021

(65) Prior Publication Data

US 2021/0279909 A1 Sep. 9, 2021

Related U.S. Application Data

(60) Provisional application No. 63/085,994, filed on Sep. 30, 2020, provisional application No. 62/984,688, filed on Mar. 3, 2020.

(51) Int. Cl.
*G06T 7/73* (2017.01)

(52) U.S. Cl.
CPC ...... *G06T 7/74* (2017.01); *G06T 2207/30244* (2013.01)

(58) Field of Classification Search
CPC ....... G06T 3/0068; G06T 3/0075; G06T 7/70; G06T 7/73; G06T 7/74; G06T 2207/30244

See application file for complete search history.

(56) References Cited

U.S. PATENT DOCUMENTS

| | | |
|---|---|---|
| 2013/0120600 A1 | 5/2013 | Jin et al. |
| 2014/0316698 A1 | 10/2014 | Roumeliotis et al. |
| 2016/0323560 A1 | 11/2016 | Jin et al. |
| 2019/0188474 A1 | 6/2019 | Zahnert et al. |
| 2020/0005486 A1* | 1/2020 | Sinha et al. ............ G06T 7/337 |
| 2020/0034624 A1 | 1/2020 | Sharma et al. |
| 2020/0126256 A1* | 4/2020 | Sinha et al. ............ G06T 17/10 |

OTHER PUBLICATIONS

International Search Report and Written Opinion dated Jul. 22, 2021 for International Application No. PCT/US2021/020403.

(Continued)

*Primary Examiner* — Andrew W Johns
(74) *Attorney, Agent, or Firm* — Wolf, Greenfield & Sacks, P.C.

(57) ABSTRACT

A method of efficiently and accurately computing a pose of an image with respect to other image information. The image may be acquired with a camera on a portable device and the other information may be a map, such that the computation of pose localizes the device relative to the map. Such a technique may be applied in a cross reality system to enable devices to efficiently and accurately access previously persisted maps. Localizing with respect to a map may enable multiple cross reality devices to render virtual content at locations specified in relation to those maps, providing an enhanced experience for uses of the system. The method may be used in other devices and for other purposes, such as for navigation of autonomous vehicles.

20 Claims, 44 Drawing Sheets

(56) References Cited

OTHER PUBLICATIONS

Invitation to Pay Additional Fees mailed May 5, 2021 for International Application No. PCT/US2021/020403.

Abdellali et al., A direct least-squares solution to multi-view absolute and relative pose from 2d-3d perspective line pairs. Proceedings of the IEEE/CVF International Conference on Computer Vision Workshops (ICCVW). Oct. 2019. 10 pages. DOI: 10.1109/ICCVW.2019.00267.

Abdellali et al., Absolute and relative pose estimation of a multi-view camera system using 2d-3d line pairs and vertical direction. 2018 Digital Image Computing: Techniques and Applications (DICTA). Dec. 2018. 9 pages. DOI: 10.1109/DICTA.2018.8615792.

Agostinho et al., CvxPnPL: A unified convex solution to the absolute pose estimation problem from point and line correspondences. arXiv preprint arXiv:1907.10545v2. Aug. 9, 2019. 25 pages.

Ansar et al., Linear pose estimation from points or lines. IEEE Transactions on Pattern Analysis and Machine Intelligence. May 2003;25(5):578-89.

Byröd et al.,. Fast and stable polynomial equation solving and its application to computer vision. International Journal of Computer Vision. 2009. 22 pages. DOI: 10.1007/s11263-009-0235-z.

Caglioti, The planar three-line junction perspective problem with application to the recognition of polygonal patterns. Pattern recognition. Nov. 1993;26(11):1603-18.

Chen, Pose determination from line-to-plane correspondences: existence condition and closed-form solutions. IEEE Transactions on Pattern Analysis & Machine Intelligence. Jun. 1991;13(6):530-41.

Christy et al., Iterative pose computation from line correspondences. Computer vision and image understanding. Jan. 1999;73(1):137-44.

Dhome et al., Determination of the attitude of 3D objects from a single perspective view. IEEE transactions on pattern analysis and machine intelligence. Dec. 1989;11(12):1265-78.

Dornaika et al., Pose estimation using point and line correspondences. Real-Time Imaging. Jun. 1999;5(3):215-30.

Fischler et al., Random sample consensus: a paradigm for model fitting with applications to image analysis and automated cartography. Communications of the ACM. Jun. 1981;24(6):381-95.

Gao et al., Complete solution classification for the perspective-three-point problem. IEEE transactions on pattern analysis and machine intelligence. Aug. 2003;25(8):930-43.

Hesch et al., A direct least-squares (DLS) method for PnP. 2011 International Conference on Computer Vision. 2011;383-390.

Kneip et al., A novel parametrization of the perspective-three-point problem for a direct computation of absolute camera position and orientation. CVPR. 2011. 8 pages. DOI:10.1109/CVPR.2011.5995464.

Kneip et al., Upnp: An optimal o(n) solution to the absolute pose problem with universal applicability. European Conference on Computer Vision. Sep. 2014, pp. 127-142.

Kukelova et al., Efficient intersection of three quadrics and applications in computer vision. InProceedings of the IEEE Conference on Computer Vision and Pattern Recognition 2016;1799-1808.

Kumar et al., Robust methods for estimating pose and a sensitivity analysis. CVGIP: Image understanding. Nov. 1994;60(3):313-42.

Larsson et al., Efficient solvers for minimal problems by syzygy-based reduction. Proceedings of the IEEE Conference on Computer Vision and Pattern Recognition. 2017;820-829.

Lecrosnier et al., Camera pose estimation based on PnL with a known vertical direction. IEEE Robotics and Automation Letters. Preprint Version. Jul. 2019. 10 pages. DOI: 10.1109/LRA.2019.2929982.

Lee, A minimal solution for non-perspective pose estimation from line correspondences. European Conference on Computer Vision. Sep. 2016, pp. 170-185.

Lepetit et al., Epnp: An accurate O(n) solution to the pnp problem. International journal of computer vision. Feb. 2009. 23 pages. DOI: 10.1007/s11263-008-0152-6.

Li et al., A robust O(n) solution to the perspective-n-point problem. IEEE transactions on pattern analysis and machine intelligence. Jan. 2012. 18 pages. DOI: 10.1109/TPAMI.2012.41.

Li-Juan et al., A new method for pose estimation from line correspondences. Acta Automatica Sinica. Feb. 2008;34(2):130-4.

Liu et al., Determination of camera location from 2-D to 3-D line and point correspondences. IEEE Transactions on pattern analysis and machine intelligence. Jan. 1990;12(1):28-37.

Mirzaei et al., Globally optimal pose estimation from line correspondences. 2011 IEEE International Conference on Robotics and Automation. 2011. 8 pages. DOI: 10.1109/ICRA.2011.5980272.

Mirzaei et al., Optimal estimation of vanishing points in a manhattan world. 2011 International Conference on Computer Vision. Nov. 2011;2454-2461. DOI:10.1109/ICCV.2011.6126530.

Moré, The Levenberg-Marquardt algorithm: implementation and theory. Conference on Numerical Analysis. Jun. 28-Jul. 1, 1977. 16 pages.

Přibyl et al., Absolute pose estimation from line correspondences using direct linear transformation. Computer Vision and Image Understanding. arXiv preprint arXiv:1608.06891v2. May 13, 2017. 37 pages. DOI: 10.1016/j.cviu.2017.05.002.

Přibyl et al., Camera Pose Estimation from Lines using Pl\ucker Coordinates. arXiv preprint arXiv:1608.02824. Aug. 9, 2016. 12 pages.

Vakhitov et al., Accurate and linear time pose estimation from points and lines. European Conference on Computer Vision. 2016, pp. 583-599. DOI: 10.1007/978-3-319-46478-736.

Wang et al., A novel algebraic solution to the perspective-three-line pose problem. Computer Vision and Image Understanding. Feb. 2020;191:102711. 7 pages.

Wang et al., Camera pose estimation from lines: a fast, robust and general method. Machine Vision and Applications. Jun. 2019. 13 pages. DOI:10.1007/s00138-019-01012-0.

Xu et al., Pose estimation from line correspondences: A complete analysis and a series of solutions. IEEE transactions on pattern analysis and machine intelligence. Jun. 2017;39(6):1209-22.

Zheng et al., Revisiting the pnp problem: A fast, general and optimal solution. Proceedings of the IEEE International Conference on Computer Vision. 2013;2344-2351.

Zhou et al., A robust and efficient algorithm for the PnL problem using algebraic distance to approximate the reprojection distance. Proceedings of the AAAI Conference on Artificial Intelligence. Jul. 2019; 33(1):9307-9315. DOI: 10.1609/aaai.v33i01.33019307.

Zhou et al., A stable algebraic camera pose estimation for minimal configurations of 2D/3D point and line correspondences. Asian Conference on Computer Vision. Dec. 2018. 16 pages. DOI: 10.1007/978-3-030-20870-7_17.

\* cited by examiner

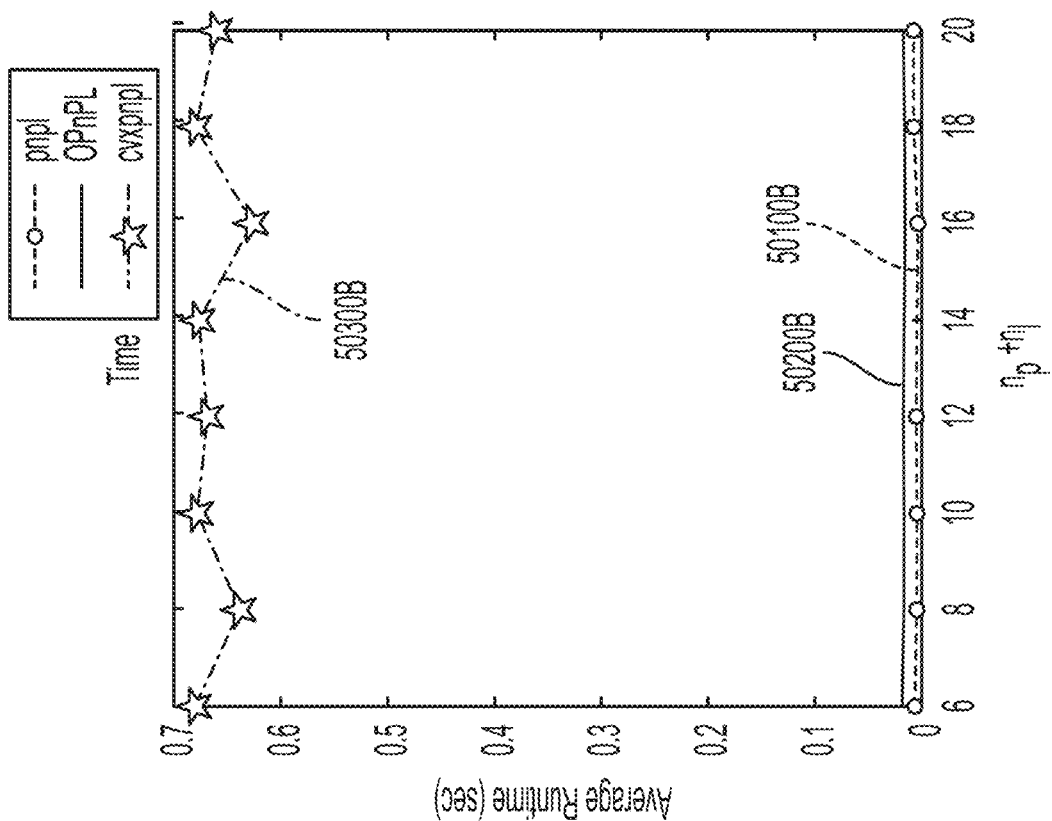
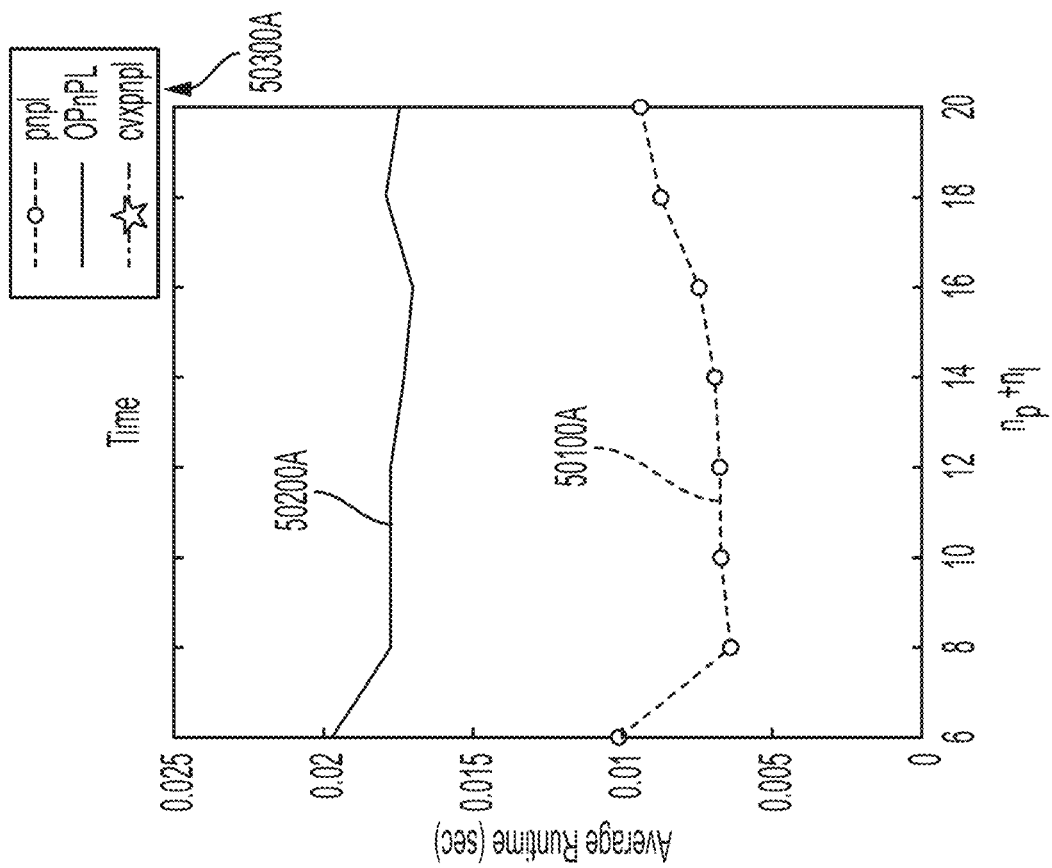
FIG. 15A
FIG. 15B

| Dataset | | BB | STR | TFH | MH | COR | MC1 | MC2 | MC3 | ULB | WDC |
|---|---|---|---|---|---|---|---|---|---|---|---|
| #images | | 66 | 20 | 72 | 10 | 11 | 3 | 3 | 3 | 3 | 5 |
| #lines | | 870 | 1841 | 828 | 30 | 69 | 295 | 302 | 177 | 253 | 380 |
| Mirzaei | Δθ | 88.18 | 0.90 | 32.24 | 0.46 | 0.22 | 4.83 | 15.47 | 5.00 | 2.51 | 36.52 |
| | Δt | 168.47 | 1.92 | 11.04 | 0.04 | 0.10 | 1.53 | 7.37 | 1.82 | 1.27 | 6.44 |
| DLT_Comb | Δθ | 0.40 | 0.22 | 0.39 | 0.41 | 0.11 | 0.11 | 0.15 | 0.16 | 0.20 | 0.23 |
| | Δt | 1.88 | 0.38 | 0.32 | 0.04 | 0.04 | 0.04 | 0.07 | 0.05 | 0.08 | 0.12 |
| DLT_Plücker | Δθ | 1.04 | 0.93 | 1.11 | 17.58 | 0.38 | 0.28 | 0.22 | 0.48 | 0.77 | 0.34 |
| | Δt | 1.88 | 0.38 | 0.32 | 0.04 | 0.04 | 0.04 | 0.07 | 0.05 | 0.08 | 0.12 |
| LPnL_ENull | Δθ | 0.30 | 0.11 | 0.57 | 0.32 | 0.10 | 0.04 | 0.03 | 0.07 | 0.39 | 0.08 |
| | Δt | 1.13 | 0.16 | 0.45 | 0.022 | 0.04 | 0.01 | 0.02 | 0.02 | 0.18 | 0.05 |
| LPnL_LS | Δθ | 1.98 | 0.15 | 1.10 | 0.45 | 0.13 | 0.03 | 0.03 | 0.09 | 0.49 | 0.18 |
| | Δt | 7.23 | 0.27 | 1.05 | 0.04 | 0.05 | 0.01 | 0.02 | 0.03 | 0.22 | 0.11 |
| ASPnL | Δθ | 37.82 | 22.08 | 7.75 | 0.25 | 0.10 | 0.15 | 0.20 | 2.08 | 4.89 | 0.51 |
| | Δt | 76.61 | 30.47 | 6.11 | 0.018 | 0.03 | 0.04 | 0.08 | 0.74 | 2.22 | 0.23 |
| SRPnL | Δθ | 36.92 | 0.47 | 3.40 | 0.25 | 0.063 | 0.58 | 0.15 | 48.53 | 5.58 | 0.11 |
| | Δt | 42.98 | 0.20 | 2.67 | 0.018 | 0.021 | 0.14 | 0.066 | 5.254 | 2.75 | 0.049 |
| OPnPL | Δθ | 0.19 | 0.09 | 0.42 | 0.25 | 0.07 | 0.03 | 0.03 | 0.06 | 0.06 | 0.13 |
| | Δt | 0.81 | 0.07 | 0.31 | 0.02 | 0.02 | 0.01 | 0.01 | 0.02 | 0.02 | 0.06 |

FIG. 28

| | | | | | | | | | | |
|---|---|---|---|---|---|---|---|---|---|---|
| cvxPnPL | $\Delta\theta$ | 0.18 | 0.081 | 0.40 | 0.25 | 0.055 | 0.035 | 0.025 | 0.065 | 0.12 | 0.10 |
| | $\Delta t$ | 0.78 | 0.058 | 0.31 | 0.018 | 0.019 | 0.011 | 0.013 | 0.020 | 0.048 | 0.047 |
| OAPnL | $\Delta\theta$ | 0.18 | 0.080 | 0.10 | 0.22 | 0.031 | 0.011 | 0.012 | 0.022 | 0.030 | 0.036 |
| | $\Delta t$ | 0.78 | 0.029 | 0.070 | 0.015 | 0.011 | 3.5e-3 | 6.0e-3 | 7.4e-3 | 0.014 | 0.019 |
| MinPnL | $\Delta\theta$ | 0.18 | 0.080 | 0.089 | 0.21 | 0.031 | 0.010 | 0.013 | 0.022 | 0.030 | 0.036 |
| | $\Delta t$ | 0.78 | 0.024 | 0.057 | 0.015 | 0.011 | 3.4e-3 | 6.3e-3 | 7.4e-3 | 0.014 | 0.019 |

FIG. 28 CONTINUED

---
Algorithm 1: Our PnL algorithm

Input: $N \geq 3$ 2D/3D line correspondences
Output: Camera Pose R and t

3110 → 1. Compress the $2N$ constraints (4') from $N$ 2D/3D line correspondences:
— Calculate $\tau$ as a function of s in (9') and substitute it into (8') to generate a quadratic system (10') in s.
— Split the quadratic system (10') into two parts as (12') by the Gram-Schmidt process with column pivoting.
— Solve for $r_3$ to generate an equation system (15') in s.

3120 → 2. Solve (15') for s by the hidden variable method introduced in section 3.3.
3130 → 3. Compute R by the CRG definition (3'), and t by (6') and (9')
3140 → 4. Refine the solution by the damped Newton step as described in section 3.4.
---

FIG. 31

EFFICIENT LOCALIZATION BASED ON MULTIPLE FEATURE TYPES

CROSS-REFERENCE TO RELATED APPLICATIONS

This application claims the benefit under 35 U.S.C. § 119(e) of U.S. Provisional Patent Application Ser. No. 63/085,994, filed on Sep. 30, 2020, and entitled "EFFICIENT LOCALIZATION BASED ON MULTIPLE FEATURE TYPES," as well as U.S. Provisional Patent Application Ser. No. 62/984,688, filed on Mar. 3, 2020, and entitled "POSE ESTIMATION USING POINT AND LINE CORRESPONDENCE," each of which is hereby incorporated herein by reference in its entirety.

TECHNICAL FIELD

This application relates generally to a machine vision system, such as a cross reality system.

BACKGROUND

Localization is performed in some machine vision systems to relate the location of a device, equipped with a camera to capture images of a 3D environment, to locations in a map of the 3D environment. A new image captured by the device may be matched to a portion of the map. A spatial transformation between the new image of the matching portion of the map may indicate the "pose" of the device with respect to the map.

A form of localization may be performed while creating the map. The location of new images with respect to existing portions of the map may enable those new images to be integrated into the map. New images may be used to extend the map to represent portions of the 3D environment not previously mapped or to update the representation of portions of the 3D environment that were previously mapped.

The results of localization may be used in various ways in various machine vision systems. In a robotic system, for example, locations of goals or obstacles may be specified with respect to the coordinates of the map. Once a robotic device is localized with respect to the map, it may be guided towards the goals along a route that avoids the obstacles.

BRIEF SUMMARY

Aspects of the present application relate to methods and apparatus for providing localization. Techniques as described herein may be used together, separately, or in any suitable combination.

The inventors have appreciated that points and lines can be separately or jointly used in a cross reality (XR) or robot system for localization. Typically, the resulting problems are treated individually and multiple algorithms are implemented in a localization or robot system, for instance algorithms for different number N of correspondences (such as minimal problems (N=3) and least-squares problems (N>3)), and for different configurations (planar and non-planar configurations). The inventors have appreciated that a lot of effort may be required to implement these algorithms.

In some aspects, localization may be used in an XR system. In such a system, computers may control human user interfaces to create a cross reality environment in which some or all of the XR environment, as perceived by the user, is generated by a computer. These XR environments may be virtual reality (VR), augmented reality (AR), and/or mixed reality (MR) environments, in which some or all of an XR environment may be generated by computers. Data generated by a computer may describe, for example, virtual objects that may be rendered in a way that users perceive as part of a physical world such that users can interact with the virtual objects. The user may experience these virtual objects as a result of the data being rendered through a user interface device, such as a head-mounted display device that enables the user to simultaneously see both the virtual content and objects in the physical world.

To realistically render virtual content, an XR system may build a representation of the physical world around a user of the system. This representation, for example, may be constructed by processing images acquired with sensors on wearable devices that form a part of the XR system. The locations of both physical and virtual objects may be expressed with respect to a map to which a user device in the XR system may localize. Localization enables the user devices to render virtual objects so as to take into account the locations of physical objects. It also enables multiple user devices to render virtual content so that their respective users share the same experience of that virtual content in the 3D environment.

A conventional approach to localization is to store, in conjunction with a map, collections of feature points derived from images of the 3D environment. Feature points may be selected for inclusion in the map based on how readily identifiable they are and the likelihood that they represent persistent objects, such as corners of rooms or large furniture. Localization entails selecting feature points from new images and identifying matching feature points in the map. The identification is based on finding a transformation that aligns a collection of feature points from a new image with matching feature points in the map.

Finding a suitable transformation is computationally intensive and is often performed by selecting a group of feature points in the new image and attempting to compute a transformation that aligns that group of feature points against each of multiple groups of feature points from the map. Attempts to compute a transformation may use a non-linear least squared approach, which may entail computing a Jacobean matrix which is used to iteratively arrive at a transformation. This computation may be repeated for multiple groups of feature points in the map and possibly multiple groups of feature points in one or new images to arrive at a transformation accepted as providing a suitable match.

One or more techniques may be applied to decrease the computational burden of such matching. RANSAC, for example, is a process in which the matching process is performed in two stages. In a first stage, a coarse transformation between a new image and a map might be identified based on processing of multiple groups, each with a small number of feature points. The coarse alignment is used as a starting point for computing a more refined transformation that achieves suitable alignment between larger groups of feature points.

Some aspects relate to a method of determining a pose of a camera with respect to a map based on one or more images captured with the camera, wherein the pose is represented as a rotation matrix and a translation matrix. The method may comprise developing correspondences between a combination of points and/or lines in the one or more images and the map, transforming the correspondences into a set of three second-order polynomial equations, solving the set of equations for the rotation matrix, and computing the translation matrix based on the rotation matrix.

In some embodiments, the combination of points and/or lines may be determined dynamically based on characteristics of the one or more images.

In some embodiments, the method may further comprise refining the pose by minimizing a cost function.

In some embodiments, the method may further comprise refining the pose by using a damped Newton step.

In some embodiments, transforming the correspondences into a set of three second-order polynomial equations comprises deriving a set of constraints from the correspondences, forming a close-form expression of the translation matrix, and using a 3D vector to form a parametrization of the rotation matrix.

In some embodiments, transforming the correspondences into a set of three second-order polynomial equations further comprises denoising by rank approximation.

In some embodiments, solving the set of equations for the rotation matrix comprises using a hidden variable method.

In some embodiments, using a 3D vector to form the parametrization of the rotation matrix comprises using Cayley-Gibbs-Rodriguez (CGR) parametrization.

In some embodiments forming a close-form expression of the translation matrix comprises forming a linear equation system using the set of constraints.

Some aspects relate to a method of determining the pose of a camera with respect to a map based on one or more images captured with the camera, wherein the pose is represented as a rotation matrix and a translation matrix. The method may comprise developing a plurality of correspondences between a combination of points and/or lines in the one or more images and the map, expressing the correspondences as an over-determined set of equations in a plurality of variables, formatting the over-determined set of equations as a minimal set of equations of meta-variables, in which each of the meta-variables represents a group of the plurality of variables, computing values of the meta-variables based on the minimal set of equations, and computing the pose from the meta-variables.

In some embodiments, the combination of points and/or lines may be determined dynamically based on characteristics of the one or more images.

In some embodiments, computing the pose from the meta-variables comprises computing the rotation matrix, and computing the translation matrix based on the rotation matrix.

In some embodiments, computing the translation matrix based on the rotation matrix comprises computing the translation matrix from an equation that expresses the plurality of correspondences based on the rotation matrix and is linear with respect to the translation matrix.

In some embodiments, computing the translation matrix comprises deriving a set of constraints from the correspondences, forming a close-form expression of the translation matrix, and forming a linear equation system using the set of constraints.

Some aspects relate to a non-transitory computer-readable storage medium storing instructions that, when executed by at least one processor, cause the at least one processor to perform a method. The method may comprise developing correspondences between a combination of points and/or lines in one or more images and a map, transforming the correspondences into a set of three second-order polynomial equations, solving the set of equations for the rotation matrix, and computing the translation matrix based on the rotation matrix.

In some embodiments, the points and/or lines in the one or more images may be two-dimensional features and corresponding features in the map may be three-dimensional features.

Some aspects relate to a non-transitory computer-readable storage medium storing instructions that, when executed by at least one processor, cause the at least one processor to perform a method. The method may comprise developing a plurality of correspondences between a combination of points and/or lines in the one or more images and the map, expressing the correspondences as an over-determined set of equations in a plurality of variables, formatting the over-determined set of equations as a minimal set of equations of meta-variables, in which each of the meta-variables represents a group of the plurality of variables, computing values of the meta-variables based on the minimal set of equations, and computing the pose from the meta-variables.

Some aspects relate to a portable electronic device, comprising: a camera configured to capture one or more images of a 3D environment and at least one processor configured to execute computer executable instructions. The computer executable instructions may comprise instructions for determining a pose of the camera with respect to a map based on the one or more images, comprising: determining information about a combination of points and/or lines in the one or more images of the 3D environment; sending, to a localization service, the information about the combination of points and/or lines in the one or more images to determine a pose of the camera with respect to the map; and receiving, from the localization service, the pose of the camera with respect to the map represented as a rotation matrix and a translation matrix.

In some embodiments, the localization service is implemented on the portable electronic device.

In some embodiments, the localization service is implemented on a server remote from the portable electronic device, wherein the information about the combination of points and/or lines in the one or more images is sent to the localization service over a network.

In some embodiments, determining the pose of the camera with respect to the map comprises: developing correspondences between the combination of points and/or lines in the one or more images and the map; transforming the correspondences into a set of three second-order polynomial equations; solving the set of equations for the rotation matrix; and computing the translation matrix based on the rotation matrix.

In some embodiments, the combination of points and/or lines is determined dynamically based on characteristics of the one or more images.

In some embodiments, determining the pose of the camera with respect to the map comprises further comprises refining the pose by minimizing a cost function.

In some embodiments, determining the pose of the camera with respect to the map comprises further comprises refining the pose by using a damped Newton step.

In some embodiments, transforming the correspondences into a set of three second-order polynomial equations comprises: deriving a set of constraints from the correspondences; forming a close-form expression of the translation matrix; and using a 3D vector to form a parametrization of the rotation matrix.

In some embodiments, transforming the correspondences into a set of three second-order polynomial equations further comprises denoising by rank approximation.

In some embodiments, solving the set of equations for the rotation matrix comprises using a hidden variable method.

In some embodiments, using a 3D vector to form the parametrization of the rotation matrix comprises using Cayley-Gibbs-Rodriguez (CGR) parametrization.

In some embodiments, forming a close-form expression of the translation matrix comprises forming a linear equation system using the set of constraints.

In some embodiments, determining the pose of the camera with respect to the map comprises: developing correspondences between the combination of points and/or lines in the one or more images and the map; expressing the correspondences as an over-determined set of equations in a plurality of variables; formatting the over-determined set of equations as a minimal set of equations of meta-variables, in which each of the meta-variables represents a group of the plurality of variables; computing values of the meta-variables based on the minimal set of equations; and computing the pose from the meta-variables.

In some embodiments, the combination of points and/or lines is determined dynamically based on characteristics of the one or more images.

In some embodiments, computing the pose from the meta-variables comprises: computing the rotation matrix; and computing the translation matrix based on the rotation matrix.

In some embodiments, computing the translation matrix based on the rotation matrix comprises computing the translation matrix from an equation that expresses the plurality of correspondences based on the rotation matrix and is linear with respect to the translation matrix.

In some embodiments, computing the translation matrix comprises: deriving a set of constraints from the correspondences; forming a close-form expression of the translation matrix; and forming a linear equation system using the set of constraints.

In some embodiments, the points and lines in the one or more images are two-dimensional features; and corresponding features in the map are three-dimensional features.

Some aspects relate to a method for determining a pose of a camera with respect to a map based on one or more images of a 3D environment captured by the camera, comprising: determining information about a combination of points and/or lines in the one or more images of the 3D environment; sending, to a localization service, the information about the combination of points and/or lines in the one or more images to determine a pose of the camera with respect to the map; and receiving, from the localization service, the pose of the camera with respect to the map represented as a rotation matrix and a translation matrix.

Some aspects relate to a non-transitory computer readable medium comprising computer executable instructions for execution by at least one processor, wherein the computer executable instructions comprise instructions for determining a pose of a camera with respect to a map based on one or more images of a 3D environment captured by the camera, comprising: determining information about a combination of points and/or lines in the one or more images of the 3D environment; sending, to a localization service, the information about the combination of points and/or lines in the one or more images to determine a pose of the camera with respect to the map; and receiving, from the localization service, the pose of the camera with respect to the map represented as a rotation matrix and a translation matrix.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 15A is a diagram of computational time of different PnPL algorithms, according to some embodiments;

FIG. 15B is a diagram of computational time of different PnPL algorithms, according to some embodiments;

FIG. 28 is an exemplary diagram of experimental results of real data, according to some embodiments;

FIG. 31 is a pseudo code implementation of an exemplary algorithm for solving the PnL problem, according to some embodiments.

DETAILED DESCRIPTION

Figure 1:
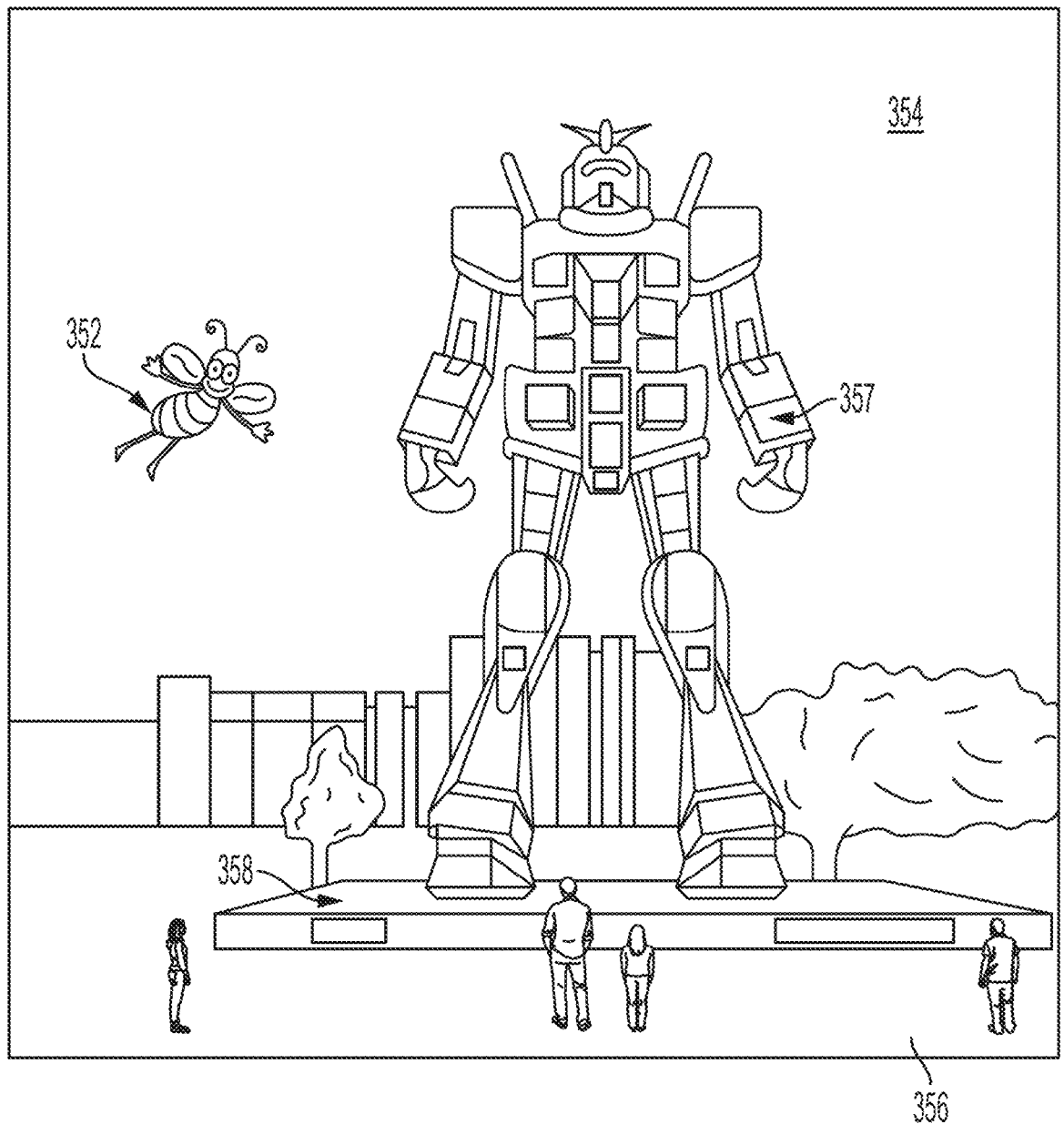
FIG. 1 is a sketch illustrating an example of a simplified augmented reality (AR) scene, according to some embodiments.

Described herein are methods and apparatus for efficiently and accurately computing pose between a device containing a camera and a coordinate frame of other image information. The other image information may act as a map, such that determining pose localizes the device with respect to the map. The map, for example may represent a 3D environment. The device containing a camera may be, for example, an XR system, an autonomous vehicle, or a smart phone. Localizing these devices relative to a map enables the devices to perform location-based functions, such as rendering virtual content registered with the physical world, navigation, or rendering content based on location.

Pose may be computed by finding correspondences between at least one set of features extracted from an image acquired with the camera and features stored in the map. Correspondences may be based, for example, on a determination that the corresponding features likely represent the same structure in the physical world. Once corresponding features in the image and the map are identified, an attempt is made to determine a transformation that aligns the corresponding features with little or no error is computed. Such a transformation indicates the pose between the image and a frame of reference of the features supplied by the map. As the image is correlated to the location of the camera at the time the image was acquired, the computed pose also indicates the pose of the camera, and by extension the device containing the camera, relative to the frame of reference of the map.

The inventors have recognized and appreciated that an algorithm that provides a uniform solution, meaning that one algorithm may be used to solve all resulting problems, whether based on features that are points, lines or a combination of both, can significantly reduce the coding effort for software architecture design. Furthermore, experimental results described herein show that the algorithm providing a uniform solution can achieve better or comparable performance compared to previous work in terms of both accuracy and runtime.

Computation of pose conventionally requires large amounts of computational resources, such as processing power or, for a portable device, battery power. Every two corresponding features may provide a constraint on the computed pose. But, taking into consideration noise or other errors, it is conventional for sets of features to contain enough features that there are more constraints than there are degrees of freedom in a transformation to be computed. Finding a solution in this case may involve computing the solution of an over-determined system of equations. Conventional techniques for solving an over-determined system may employ a least squares approach, which is a known iterative approach to finding a solution that provides as a solution a transformation that has a low overall squared error in satisfying all the constraints.

In many practical devices, the computational burden is compounded by the fact that finding a pose may require attempts to compute a transformation between multiple corresponding sets of features. For example, two structures in the physical world might give rise to two similar sets of features, which may seemingly correspond. However, a computed transformation may have a relatively high error such that those seemingly corresponding features are ignored for computing pose. The computation might be repeated for other sets of seemingly corresponding features until a transformation is computed with relatively low error. Alternatively or additionally, because of the possibility that a set of features in an image might seemingly, though incorrectly, correspond to a set of features in a map, a computed transformation may not be accepted as a solution unless there is sufficient similarity of the transformations computed for multiple sets of features, which may be taken from different portions of an image or from different images.

Techniques as described herein may reduce the computational burden of computing a pose. In some embodiments, the computational burden may be reduced by reformatting the over-determined set of equations into a minimal set of equations, which may be solved with a lower computational burden than solving a least squared problem. The minimal set of equations may be expressed in terms of meta-variables that each represent a group of variables in the over-determined set of equations. Once a solution is obtained for the meta-variables, the elements of the transformation between features sets may be computed from the meta-variables. The elements of the transformation maybe, for example, a rotation matrix and translation vector, Use of meta-variables, for example, may enable the problem to be solved to be expressed as a set with a small number of low order polynomials, which can be solved more efficiently than a full least squared problem. Some or all the polynomials may have an order as low as two. In some embodiments, there may be as few as three such polynomials, enabling a solution to be arrived at with relatively low computation.

Lower computational burden and/or increased accuracy in computing pose may result by selecting sets of features for which correspondences are less likely to be erroneous. Image features used for computing pose are frequently image points, representing a small area of an image. A feature point, for example, may be represented as a rectangular region with sides that extend three or four pixels of the image. For some systems, using points as the features may lead to an adequate solution in many scenarios. However, in other scenarios, using lines as features may be more likely to lead to an adequate solution, which, in comparison to using points as features, may require fewer attempts to compute a suitable transformation. Thus, the overall computational burden may be less by using lines as features. A technique as described herein may be used to efficiently compute a pose when lines are used as features.

In some systems, an efficient solution may be more likely to result from using features that are a combination of features and lines. The number or proportion of each type of feature that leads to an efficient solution may vary based on scenario. A system configured to compute a pose based on corresponding sets of features, with an arbitrary mix of feature types, may enable the mix of feature types to be selected so as to increase the likelihood of finding a solution with reduced computational burden from multiple attempts to find a solution. A technique as described herein may be used to efficiently compute a pose when an arbitrary mix of points and lines are used as features.

These techniques may be used alone or in combination to reduce computational burden and/or increase the accuracy of localization, leading to more efficient or more accurate operation of many types of devices. For example, during the operation of an XR system, which may contain multiple components that may move with respect to each other, there may be multiple scenarios in which a coordinate frame of one component may be related to a coordinate frame of another component. Such a relationship, defining the relative pose of the two components, may be developed through a localization process. In a localization process, information expressed in a coordinate frame of one component (e.g. a portable XR device) is transformed to align with corresponding information expressed in coordinate frame of another component (e.g. a map). The transformation may be used to relate locations specified in the coordinate frame of one component in the coordinate frame of the other and vice versa.

The localization techniques described herein may be used for providing XR scenes. An XR system therefore provides a useful example of how computationally efficient pose computation techniques may be applied in practice. To provide realistic XR experiences to multiple users, an XR system must know the users' location within the physical world in order to correctly correlate locations of virtual objects to real objects. The inventors have recognized and appreciated methods and apparatus that are computationally efficient and quick in localizing XR devices, even in large and very large scale environments (e.g., a neighborhood, a city, a country, the globe).

An XR system may build a map of an environment in which user devices may operate. The environment map may be created from image information collected with sensors that are part of XR devices worn by users of the XR system. Each XR device may develop a local map of its physical environment by integrating information from one or more images collected as the device operates. In some embodiments, the coordinate system of the local map is tied to the position and/or orientation of the device when the device first initiates scanning the physical world (e.g. starts a new session). That position and/or orientation of the device may change from session to session as a user interacts with the XR system, whether different sessions are associated with different users, each with their own wearable device with sensors that scan the environment, or the same user who uses the same device at different times.

The XR system may implement one or more techniques to enable persistent operation across sessions based on persistent spatial information. The techniques, for example, may provide XR scenes for a more computationally efficient and immersive experiences for a single or multiple users by enabling persistent spatial information to be created, stored, and retrieved by any of multiple users of an XR system. When shared by multiple users, persistent spatial information provides a more immersive experience as it enables multiple users to experience virtual content in the same location with respect to the physical world. Even when used by a single user, persistent spatial information may enable quickly recovering and resetting headposes on an XR device in a computationally efficient way.

The persistent spatial information may be represented by a persistent map. The persistent map may be stored in a remote storage medium (e.g., a cloud). A wearable device worn by a user, after being turned on, may retrieve from persistent storage an appropriate map that was previously created and stored. That previously stored map may have been based on data about the environment collected with sensors on the user's wearable device during prior sessions. Retrieving a stored map may enable use of the wearable device without completing a scan of the physical world with the sensors on the wearable device. Alternatively or additionally, the device, upon entering a new region of the physical world, may similarly retrieve an appropriate stored map.

The stored map may be represented in a canonical form to which a local frame of reference on each XR device may be related. In a multi-device XR system, the stored map accessed by one device may have been created and stored by another device and/or may have been constructed by aggregating data about the physical world collected by sensors on multiple wearable devices that were previously present in at least a portion of the physical world represented by the stored map.

In some embodiments, persistent spatial information may be represented in a way that may be readily shared among users and among the distributed components, including applications.

Canonical maps may provide information about the physical world, which may be formatted, for example, as persistent coordinate frames (PCFs). A PCF may be defined based on a set of features recognized in the physical world. The features may be selected such that they are likely to be the same from user session to user session of the XR system. PCFs may be sparse, providing less than all of the available information about the physical world, such that they may be efficiently processed and transferred.

Techniques for processing persistent spatial information also may include creating dynamic maps based on the local coordinate systems of one or more devices. These maps may be sparse maps, representing the physical world with features, such as points or edges or other structures that appear as lines, detected in images used in forming the maps. Canonical maps may be formed by merging multiple such maps created by one or more XR devices.

The relationship between a canonical map and a local map for each device may be determined through a localization process. That localization process may be performed on each XR device based on a set of canonical maps selected and sent to the device. Alternatively or additionally, a localization service may be provided on remote processors, such as might be implemented in the cloud.

Two XR devices that have access to the same stored map, for example, may both localize with respect to the stored map. Once localized, a user device may render virtual content that has a location specified by reference to the stored map by translating that location to a frame of reference maintained by the user device. The user device may use this local frame of reference to control the display of the user device to render the virtual content in the specified location.

The XR system may be configured to create, share, and use persistent spatial information with low usage of computational resources and/or low latency to provide a more immersive user experience. To support these operations, the system may use techniques for efficient comparison of spatial information. Such comparisons may arise, for example, as part of localization in which a collection of features from a local device is matched to a collection of features in a canonical map. Similarly, in map merge, attempts may be made to match one or more collections of features in a tracking map from a device to corresponding features in a canonical map.

Techniques as described herein may be used together or separately with many types of devices and for many types of scenes, including wearable or portable devices with limited computational resources that provide an augmented or mixed reality scene. In some embodiments, the techniques may be implemented by one or more services that form a portion of an XR system.

AR System Overview

Figure 2:
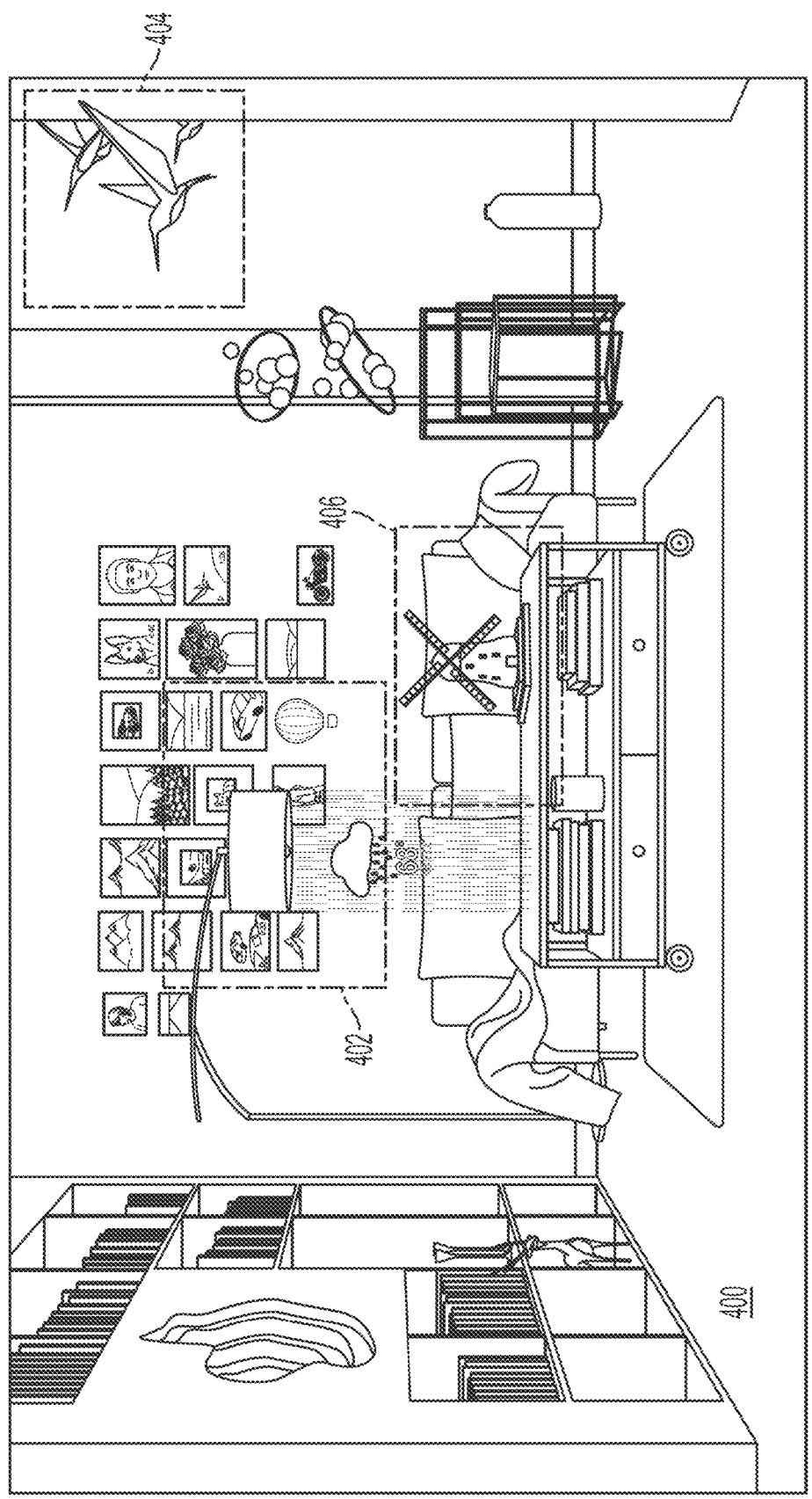
FIG. 2 is a sketch of an exemplary simplified AR scene, showing exemplary use cases of an XR system, according to some embodiments.

FIGS. 1 and 2 illustrate scenes with virtual content displayed in conjunction with a portion of the physical world. For purposes of illustration, an AR system is used as an example of an XR system. FIGS. 3-6B illustrate an exemplary AR system, including one or more processors, memory, sensors and user interfaces that may operate according to the techniques described herein.

Referring to FIG. 1, an outdoor AR scene 354 is depicted in which a user of an AR technology sees a physical world park-like setting 356, featuring people, trees, buildings in the background, and a concrete platform 358. In addition to these items, the user of the AR technology also perceives that they "see" a robot statue 357 standing upon the physical world concrete platform 358, and a cartoon-like avatar character 352 flying by which seems to be a personification of a bumble bee, even though these elements (e.g., the avatar character 352, and the robot statue 357) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that builds maps of the physical world based on tracking information, enables users to place AR content in the physical world, determines locations in the maps of the physical world where AR content is placed, preserves the AR scenes such that the placed AR content can be reloaded to display in the physical world during, for example, a different AR experience session, and enables multiple users to share an AR experience. The system may build and update a digital representation of the physical world surfaces around the user. This representation may be used to render virtual content so as to appear fully or partially occluded by physical objects between the user and the rendered location of the virtual content, to place virtual objects, in physics based interactions, and for virtual character path planning and navigation, or for other operations in which information about the physical world is used.

FIG. 2 depicts another example of an indoor AR scene 400, showing exemplary use cases of an XR system, according to some embodiments. The exemplary scene 400 is a living room having walls, a bookshelf on one side of a wall, a floor lamp at a corner of the room, a floor, a sofa, and coffee table on the floor. In addition to these physical items, the user of the AR technology also perceives virtual objects such as images on the wall behind the sofa (i.e. as in 402), birds flying through the door (i.e. as in 404), a deer peeking out from the book shelf, and a decoration in the form of a windmill placed on the coffee table (i.e. as in 406).

For the images on the wall, the AR technology requires information about not only surfaces of the wall but also objects and surfaces in the room such as lamp shape, which are occluding the images to render the virtual objects correctly. For the flying birds, the AR technology requires information about all the objects and surfaces around the room for rendering the birds with realistic physics to avoid the objects and surfaces or bounce off them if the birds collide. For the deer, the AR technology requires information about the surfaces such as the floor or coffee table to compute where to place the deer. For the windmill, the system may identify that is an object separate from the table and may determine that it is movable, whereas corners of shelves or corners of the wall may be determined to be stationary. Such a distinction may be used in determinations as to which portions of the scene are used or updated in each of various operations.

The virtual objects may be placed in a previous AR experience session. When new AR experience sessions start in the living room, the AR technology requires the virtual objects being accurately displayed at the locations previously placed and realistically visible from different viewpoints. For example, the windmill should be displayed as standing on the books rather than drifting above the table at a different location without the books. Such drifting may happen if the locations of the users of the new AR experience sessions are not accurately localized in the living room. As another example, if a user is viewing the windmill from a viewpoint different from the viewpoint when the windmill was placed, the AR technology requires corresponding sides of the windmill being displayed.

A scene may be presented to the user via a system that includes multiple components, including a user interface that can stimulate one or more user senses, such as sight, sound, and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or may be distributed across multiple interconnected devices. In some embodiments, some or all of these components may be integrated into a wearable device.

Figure 3:
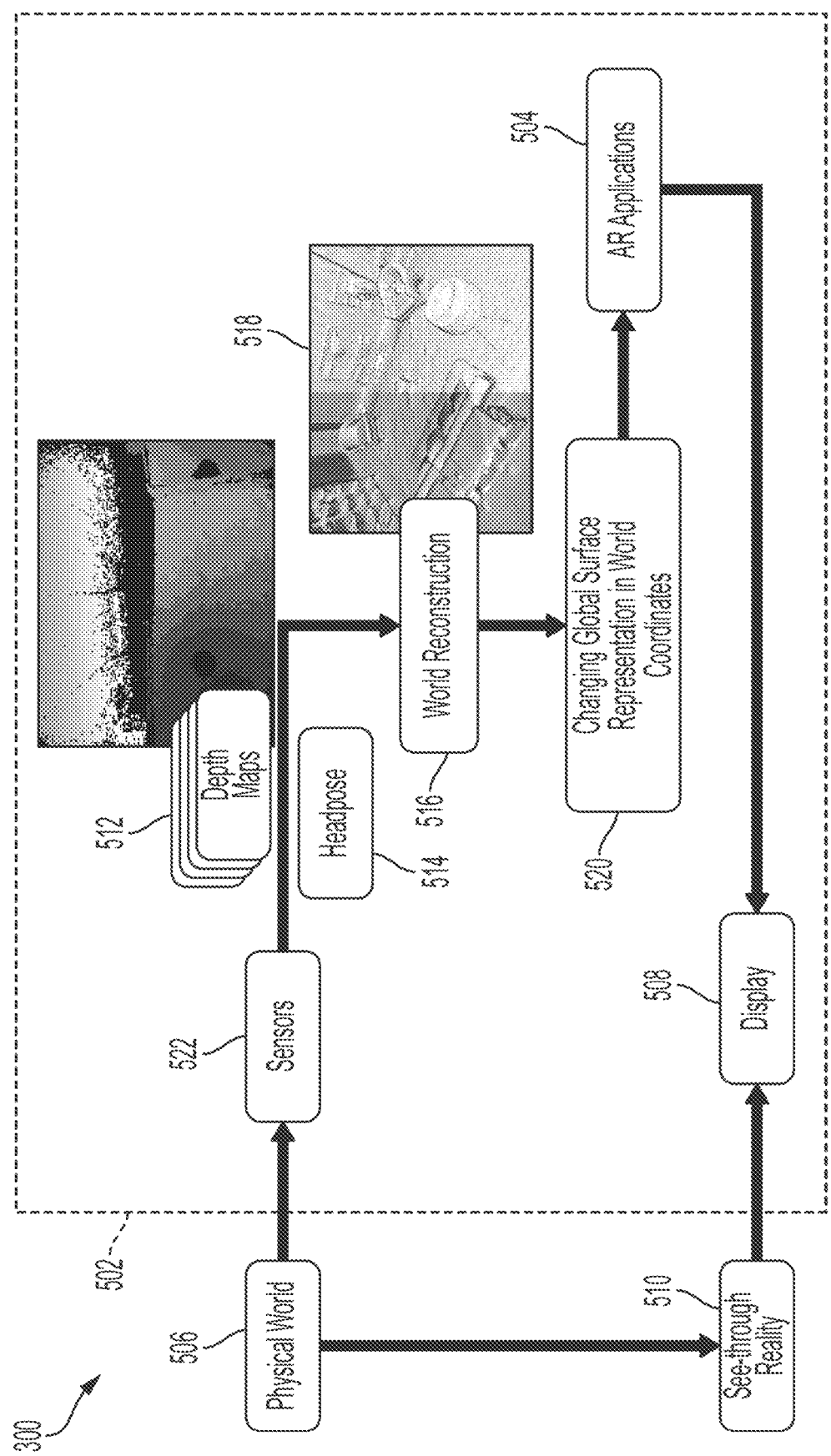
FIG. 3 is a schematic diagram illustrating data flow for a single user in an AR system configured to provide an experience to the user of AR content interacting with a physical world, according to some embodiments.

FIG. 3 is a schematic diagram 300 that depicts an AR system 502 configured to provide an experience of AR contents interacting with a physical world 506, according to some embodiments. The AR system 502 may include a display 508. In the illustrated embodiment, the display 508 may be worn by the user as part of a headset such that a user may wear the display over their eyes like a pair of goggles or glasses. At least a portion of the display may be transparent such that a user may observe a see-through reality 510. The see-through reality 510 may correspond to portions of the physical world 506 that are within a present viewpoint of the AR system 502, which may correspond to the viewpoint of the user in the case that the user is wearing a headset incorporating both the display and sensors of the AR system to acquire information about the physical world.

AR contents may also be presented on the display 508, overlaid on the see-through reality 510. To provide accurate interactions between AR contents and the see-through reality 510 on the display 508, the AR system 502 may include sensors 522 configured to capture information about the physical world 506.

The sensors 522 may include one or more depth sensors that output depth maps 512. Each depth map 512 may have multiple pixels, each of which may represent a distance to a surface in the physical world 506 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire monocular or stereoscopic information that may be processed to represent the physical world in other ways. For example, the images may be processed in world reconstruction component 516 to create a mesh, representing connected portions of objects in the physical world. Metadata about such objects, including for example, color and surface texture, may similarly be acquired with the sensors and stored as part of the world reconstruction.

The system may also acquire information about the headpose of the user with respect to the physical world. In some embodiments, a headpose tracking component of the system may be used to compute headposes in real time. The headpose tracking component may represent a headpose of a user in a coordinate frame with six degrees of freedom including, for example, translation in three perpendicular axes (e.g., forward/backward, up/down, left/right) and rotation about the three perpendicular axes (e.g., pitch, yaw, and roll). In some embodiments, sensors 522 may include inertial measurement units that may be used to compute and/or determine a headpose 514. A headpose 514 for a depth map may indicate a present viewpoint of a sensor capturing the depth map with six degrees of freedom, for example, but the headpose 514 may be used for other purposes, such as to relate image information to a particular portion of the physical world or to relate the position of the display worn on the user's head to the physical world.

In some embodiments, the headpose information may be derived in other ways than from an IMU, such as from analyzing objects in an image captured with a camera worn on the user's head. For example, the headpose tracking component may compute relative position and orientation of an AR device to physical objects based on visual information captured by cameras and inertial information captured by IMUs. The headpose tracking component may then compute a pose of the AR device by, for example, comparing the computed relative position and orientation of the AR device to the physical objects with features of the physical objects. In some embodiments, that comparison may be made by identifying features in images captured with one or more of the sensors 522 that are stable over time such that changes of the position of these features in images captured over time can be associated with a change in headpose of the user.

The inventors have realized and appreciated techniques for operating XR systems to provide XR scenes for a more immersive user experience such as estimating headpose at a frequency of 1 kHz, with low usage of computational resources in connection with an XR device, that may be configured with, for example, four video graphic array (VGA) cameras operating at 30 Hz, one inertial measurement unit (IMU) operating at 1 kHz, compute power of a single advanced RISC machine (ARM) core, memory less than 1 GB, and network bandwidth less than 100 Mbp. These techniques relate to reducing processing required to generate and maintain maps and estimate headpose as well as to providing and consuming data with low computational overhead. The XR system may calculate its pose based on the matched visual features. U.S. patent application Ser. No. 16/221,065, published as application 2019/0188474, describes hybrid tracking and is hereby incorporated herein by reference in its entirety.

In some embodiments, the AR device may construct a map from the features, such as points and/or lines recognized in successive images in a series of image frames captured as a user moves throughout the physical world with the AR device. Though each image frame may be taken from a different pose as the user moves, the system may adjust the orientation of the features of each successive image frame to match the orientation of the initial image frame by matching features of the successive image frames to previously captured image frames. Translations of the successive image frames so that points and lines representing the same features will match corresponding feature points and feature lines from previously collected image frames, can be used to align each successive image frame to match the orientation of previously processed image frames. The frames in the resulting map may have a common orientation established when the first image frame was added to the map. This map, with sets of feature points and lines in a common frame of reference, may be used to determine the user's pose within the physical world by matching features from current image frames to the map. In some embodiments, this map may be called a tracking map.

In addition to enabling tracking of the user's pose within the environment, this map may enable other components of the system, such as world reconstruction component 516, to determine the location of physical objects with respect to the user. The world reconstruction component 516 may receive the depth maps 512 and headposes 514, and any other data from the sensors, and integrate that data into a reconstruction 518. The reconstruction 518 may be more complete and less noisy than the sensor data. The world reconstruction component 516 may update the reconstruction 518 using spatial and temporal averaging of the sensor data from multiple viewpoints over time.

The reconstruction 518 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 518, portions of the physical world are presented as a global surface; on the right side of the reconstruction 518, portions of the physical world are presented as meshes.

In some embodiments, the map maintained by headpose component 514 may be sparse relative to other maps that might be maintained of the physical world. Rather than providing information about locations, and possibly other characteristics, of surfaces, the sparse map may indicate locations of interest, which may be reflected as points and/or lines in the images, that arise from visually distinctive structures, such as corners or edges. In some embodiments, the map may include image frames as captured by the sensors 522. These frames may be reduced to features, which may represent the locations of interest. In conjunction with each frame, information about a pose of a user from which the frame was acquired may also be stored as part of the map. In some embodiments, every image acquired by the sensor may or may not be stored. In some embodiments, the system may process images as they are collected by sensors and select subsets of the image frames for further computation. The selection may be based on one or more criteria that limits the addition of information yet ensures that the map contains useful information. The system may add a new image frame to the map, for example, based on overlap with a prior image frame already added to the map or based on the image frame containing a sufficient number of features determined as likely to represent stationary objects. In some embodiments, the selected image frames, or groups of features from selected image frames may serve as key frames for the map, which are used to provide spatial information.

In some embodiments, the amount of data that is processed when constructing maps may be reduced, such as by constructing sparse maps with a collection of mapped points and keyframes and/or dividing the maps into blocks to enable updates by blocks. A mapped point and/or line may be associated with a point and/or line of interest in the environment. A keyframe may include selected information from camera-captured data. U.S. patent application Ser. No. 16/520,582 (published as application 2020/0034624) describes determining and/or evaluating localization maps and is hereby incorporated herein by reference in its entirety.

The AR system 502 may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction of the physical world, which may serve as an abstract layer for the map and provide spatial information. The reconstruction may be more complete and less noisy than the original sensor data by using spatial and temporal averaging (i.e. averaging data from multiple viewpoints over time), or any other suitable method.

In the illustrated embodiment in FIG. 3, a map represents the portion of the physical world in which a user of a single, wearable device is present. In that scenario, headpose associated with frames in the map may be represented as a local headpose, indicating orientation relative to an initial orientation for a single device at the start of a session. For example, the headpose may be tracked relative to an initial headpose when the device was turned on or otherwise operated to scan an environment to build a representation of that environment.

In combination with content characterizing that portion of the physical world, the map may include metadata. The metadata, for example, may indicate time of capture of the sensor information used to form the map. Metadata alternatively or additionally may indicate location of the sensors at the time of capture of information used to form the map. Location may be expressed directly, such as with information from a GPS chip, or indirectly, such as with a wireless (e.g. Wi-Fi) signature indicating strength of signals received from one or more wireless access points while the sensor data was being collected and/or with identifiers, such as BSSID's, of wireless access points to which the user device connected while the sensor data was collected.

The reconstruction 518 may be used for AR functions, such as producing a surface representation of the physical world for occlusion processing or physics-based processing. This surface representation may change as the user moves or objects in the physical world change. Aspects of the reconstruction 518 may be used, for example, by a component 520 that produces a changing global surface representation in world coordinates, which may be used by other components.

The AR content may be generated based on this information, such as by AR applications 504. An AR application 504 may be a game program, for example, that performs one or more functions based on information about the physical world, such as visual occlusion, physics-based interactions, and environment reasoning. It may perform these functions by querying data in different formats from the reconstruction 518 produced by the world reconstruction component 516. In some embodiments, component 520 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user.

The AR applications 504 may use this information to generate and update the AR contents. The virtual portion of the AR contents may be presented on the display 508 in combination with the see-through reality 510, creating a realistic user experience.

Figure 4:
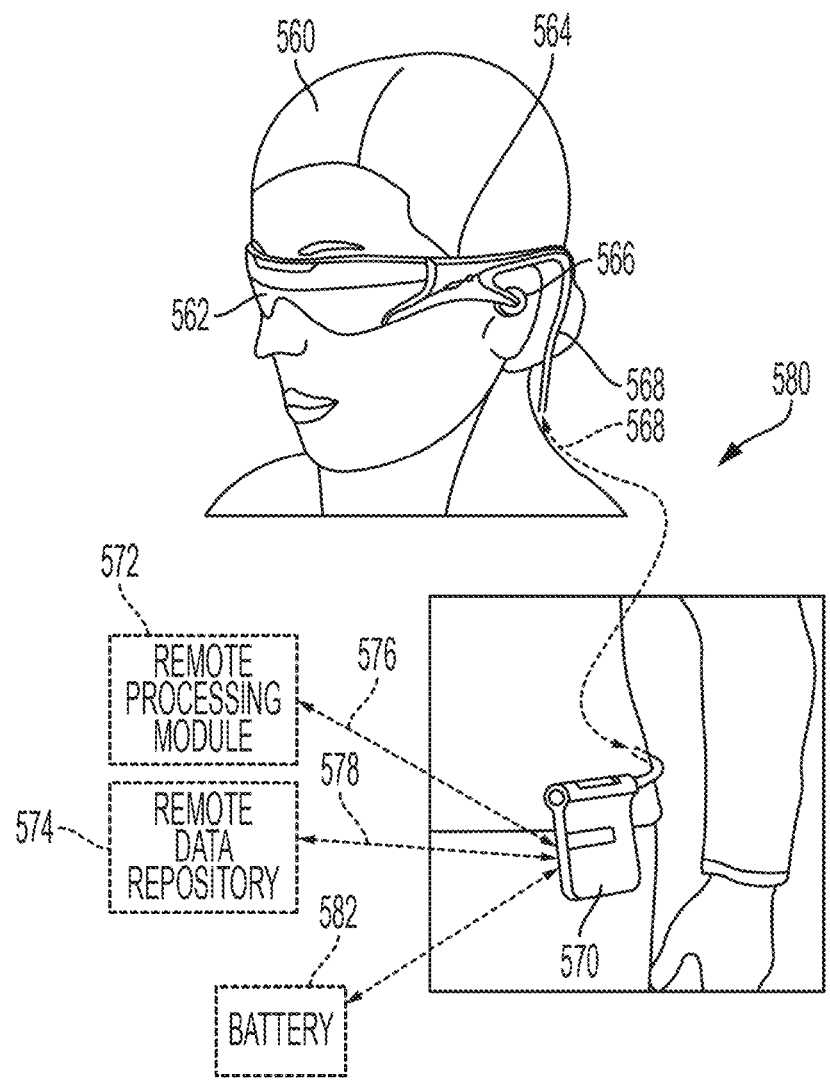
FIG. 4 is a schematic diagram illustrating an exemplary AR display system, displaying virtual content for a single user, according to some embodiments.

In some embodiments, an AR experience may be provided to a user through an XR device, which may be a wearable display device, which may be part of a system that may include remote processing and or remote data storage and/or, in some embodiments, other wearable display devices worn by other users. FIG. 4 illustrates an example of system 580 (hereinafter referred to as "system 580") including a single wearable device for simplicity of illustration. The system 580 includes a head mounted display device 562 (hereinafter referred to as "display device 562"), and various mechanical and electronic modules and systems to support the functioning of the display device 562. The display device 562 may be coupled to a frame 564, which is wearable by a display system user or viewer 560 (hereinafter referred to as "user 560") and configured to position the display device 562 in front of the eyes of the user 560. According to various embodiments, the display device 562 may be a sequential display. The display device 562 may be monocular or binocular. In some embodiments, the display device 562 may be an example of the display 508 in FIG. 3.

In some embodiments, a speaker 566 is coupled to the frame 564 and positioned proximate an ear canal of the user 560. In some embodiments, another speaker, not shown, is positioned adjacent another ear canal of the user 560 to provide for stereo/shapeable sound control. The display device 562 is operatively coupled, such as by a wired lead or wireless connectivity 568, to a local data processing module 570 which may be mounted in a variety of configurations, such as fixedly attached to the frame 564, fixedly attached to a helmet or hat worn by the user 560, embedded in headphones, or otherwise removably attached to the user 560 (e.g., in a backpack-style configuration, in a belt-coupling style configuration).

The local data processing module 570 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 564) or otherwise attached to the user 560, such as image capture devices (such as cameras), microphones, inertial measurement units, accelerometers, compasses, GPS units, radio devices, and/or gyros; and/or b) acquired and/or processed using remote processing module 572 and/or remote data repository 574, possibly for passage to the display device 562 after such processing or retrieval.

In some embodiments, the wearable device may communicate with remote components. The local data processing module 570 may be operatively coupled by communication links 576, 578, such as via a wired or wireless communication links, to the remote processing module 572 and remote data repository 574, respectively, such that these remote modules 572, 574 are operatively coupled to each other and available as resources to the local data processing module 570. In further embodiments, in addition or as alternative to remote data repository 574, the wearable device can access cloud based remote data repositories, and/or services. In some embodiments, the headpose tracking component described above may be at least partially implemented in the local data processing module 570. In some embodiments, the world reconstruction component 516 in FIG. 3 may be at least partially implemented in the local data processing module 570. For example, the local data processing module 570 may be configured to execute computer executable instructions to generate the map and/or the physical world representations based at least in part on at least a portion of the data.

In some embodiments, processing may be distributed across local and remote processors. For example, local processing may be used to construct a map on a user device (e.g. tracking map) based on sensor data collected with sensors on that user's device. Such a map may be used by applications on that user's device. Additionally, previously created maps (e.g., canonical maps) may be stored in remote data repository 574. Where a suitable stored or persistent map is available, it may be used instead of or in addition to the tracking map created locally on the device. In some embodiments, a tracking map may be localized to the stored map, such that a correspondence is established between a tracking map, which might be oriented relative to a position of the wearable device at the time a user turned the system on, and the canonical map, which may be oriented relative to one or more persistent features. In some embodiments, the persistent map might be loaded on the user device to allow the user device to render virtual content without a delay associated with scanning a location to build a tracking map of the user's full environment from sensor data acquired during the scan. In some embodiments, the user device may access a remote persistent map (e.g., stored on a cloud) without the need to download the persistent map on the user device.

In some embodiments, spatial information may be communicated from the wearable device to remote services, such as a cloud service that is configured to localize a device to stored maps maintained on the cloud service. According to one embodiment, the localization processing can take place in the cloud matching the device location to existing maps, such as canonical maps, and return transforms that link virtual content to the wearable device location. In such embodiments, the system can avoid communicating maps from remote resources to the wearable device. Other embodiments can be configured for both device-based and cloud-based localization, for example, to enable functionality where network connectivity is not available or a user opts not to enable could-based localization.

Alternatively or additionally, the tracking map may be merged with previously stored maps to extend or improve the quality of those maps. The processing to determine whether a suitable previously created environment map is available and/or to merge a tracking map with one or more stored environment maps may be done in local data processing module 570 or remote processing module 572.

In some embodiments, the local data processing module 570 may include one or more processors (e.g., a graphics processing unit (GPU)) configured to analyze and process data and/or image information. In some embodiments, the local data processing module 570 may include a single processor (e.g., a single-core or multi-core ARM processor), which would limit the local data processing module 570's compute budget but enable a more miniature device. In some embodiments, the world reconstruction component 516 may use a compute budget less than a single Advanced RISC Machine (ARM) core to generate physical world representations in real-time on a non-predefined space such that the remaining compute budget of the single ARM core can be accessed for other uses such as, for example, extracting meshes.

In some embodiments, the remote data repository 574 may include a digital data storage facility, which may be available through the Internet or other networking configuration in a "cloud" resource configuration. In some embodiments, all data is stored and all computations are performed in the local data processing module 570, allowing fully autonomous use from a remote module. In some embodiments, all data is stored and all or most computations are performed in the remote data repository 574, allowing for a smaller device. A world reconstruction, for example, may be stored in whole or in part in this repository 574.

In embodiments in which data is stored remotely, and is accessible over a network, data may be shared by multiple users of an augmented reality system. For example, user devices may upload their tracking maps to augment a database of environment maps. In some embodiments, the tracking map upload occurs at the end of a user session with a wearable device. In some embodiments, the tracking map uploads may occur continuously, semi-continuously, intermittently, at a pre-defined time, after a pre-defined period from the previous upload, or when triggered by an event. A tracking map uploaded by any user device may be used to expand or improve a previously stored map, whether based on data from that user device or any other user device. Likewise, a persistent map downloaded to a user device may be based on data from that user device or any other user device. In this way, high quality environment maps may be readily available to users to improve their experiences with the AR system.

In further embodiments, persistent map downloads can be limited and/or avoided based on localization executed on remote resources (e.g., in the cloud). In such configurations, a wearable device or other XR device communicates to the cloud service feature information coupled with pose information (e.g., positioning information for the device at the time the features represented in the feature information were sensed). One or more components of the cloud service may match the feature information to respective stored maps (e.g., canonical maps) and generates transforms between a tracking map maintained by the XR device and the coordinate system of the canonical map. Each XR device that has its tracking map localized with respect to the canonical map may accurately render virtual content in locations specified with respect to the canonical map based on its own tracking.

In some embodiments, the local data processing module 570 is operatively coupled to a battery 582. In some embodiments, the battery 582 is a removable power source, such as over the counter batteries. In other embodiments, the battery 582 is a lithium-ion battery. In some embodiments, the battery 582 includes both an internal lithium-ion battery chargeable by the user 560 during non-operation times of the system 580 and removable batteries such that the user 560 may operate the system 580 for longer periods of time without having to be tethered to a power source to charge the lithium-ion battery or having to shut the system 580 off to replace batteries.

Figure 5A:
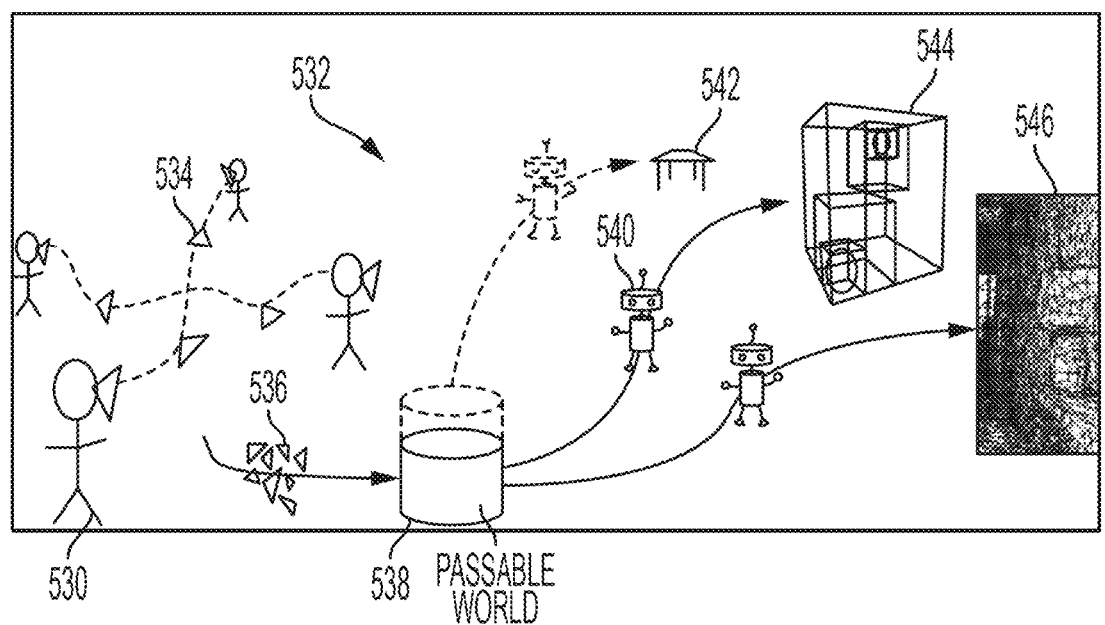
FIG. 5A is a schematic diagram illustrating a user wearing an AR display system rendering AR content as the user moves through a physical world environment, according to some embodiments.

FIG. 5A illustrates a user 530 wearing an AR display system rendering AR content as the user 530 moves through a physical world environment 532 (hereinafter referred to as "environment 532"). The information captured by the AR system along the movement path of the user may be processed into one or more tracking maps. The user 530 positions the AR display system at positions 534, and the AR display system records ambient information of a passable world (e.g., a digital representation of the real objects in the physical world that can be stored and updated with changes to the real objects in the physical world) relative to the positions 534. That information may be stored as poses in combination with images, features, directional audio inputs, or other desired data. The positions 534 are aggregated to data inputs 536, for example, as part of a tracking map, and processed at least by a passable world module 538, which may be implemented, for example, by processing on a remote processing module 572 of FIG. 4. In some embodiments, the passable world module 538 may include the headpose component 514 and the world reconstruction component 516, such that the processed information may indicate the location of objects in the physical world in combination with other information about physical objects used in rendering virtual content.

The passable world module 538 determines, at least in part, where and how AR content 540 can be placed in the physical world as determined from the data inputs 536. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 542 (e.g., a table) from a reconstruction (e.g., the reconstruction 518) to determine the shape and position of the AR content 540. As an example, the fixed element may be a table and the virtual content may be positioned such that it appears to be on that table. In some embodiments, the AR content may be placed within structures in a field of view 544, which may be a present field of view or an estimated future field of view. In some embodiments, the AR content may be persisted relative to a model 546 of the physical world (e.g. a mesh).

As depicted, the fixed element 542 serves as a proxy (e.g. digital copy) for any fixed element within the physical world which may be stored in the passable world module 538 so that the user 530 can perceive content on the fixed element 542 without the system having to map to the fixed element 542 each time the user 530 sees it. The fixed element 542 may, therefore, be a mesh model from a previous modeling session or determined from a separate user but nonetheless stored by the passable world module 538 for future reference by a plurality of users. Therefore, the passable world module 538 may recognize the environment 532 from a previously mapped environment and display AR content without a device of the user 530 mapping all or part of the environment 532 first, saving computation process and cycles and avoiding latency of any rendered AR content.

The mesh model 546 of the physical world may be created by the AR display system and appropriate surfaces and metrics for interacting and displaying the AR content 540 can be stored by the passable world module 538 for future retrieval by the user 530 or other users without the need to completely or partially recreate the model. In some embodiments, the data inputs 536 are inputs such as geolocation, user identification, and current activity to indicate to the passable world module 538 which fixed element 542 of one or more fixed elements are available, which AR content 540 has last been placed on the fixed element 542, and whether to display that same content (such AR content being "persistent" content regardless of user viewing a particular passable world model).

Even in embodiments in which objects are considered to be fixed (e.g. a kitchen table), the passable world module 538 may update those objects in a model of the physical world from time to time to account for the possibility of changes in the physical world. The model of fixed objects may be updated with a very low frequency. Other objects in the physical world may be moving or otherwise not regarded as fixed (e.g. kitchen chairs). To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

Figure 5B:
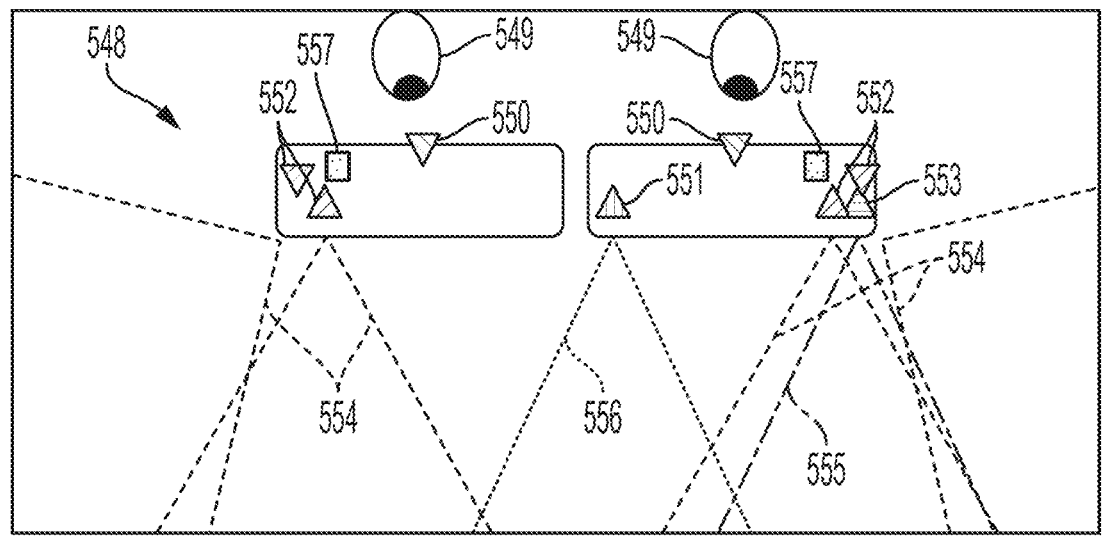
FIG. 5B is a schematic diagram illustrating a viewing optics assembly and attendant components, according to some embodiments.

FIG. 5B is a schematic illustration of a viewing optics assembly 548 and attendant components. In some embodiments, two eye tracking cameras 550, directed toward user eyes 549, detect metrics of the user eyes 549, such as eye shape, eyelid occlusion, pupil direction and glint on the user eyes 549.

In some embodiments, one of the sensors may be a depth sensor 551, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some embodiments, world cameras 552 record a greater-than-peripheral view to map and/or otherwise create a model of the environment 532 and detect inputs that may affect AR content. In some embodiments, the world camera 552 and/or camera 553 may be grayscale and/or color image sensors, which may output grayscale and/or color image frames at fixed time intervals. Camera 553 may further capture physical world images within a field of view of the user at a specific time. Pixels of a frame-based image sensor may be sampled repetitively even if their values are unchanged. Each of the world cameras 552, the camera 553 and the depth sensor 551 have respective fields of view of 554, 555, and 556 to collect data from and record a physical world scene, such as the physical world environment 532 depicted in FIG. 34A.

Inertial measurement units 557 may determine movement and orientation of the viewing optics assembly 548. In some embodiments, inertial measurement units 557 may provide an output indicating a direction of gravity. In some embodiments, each component is operatively coupled to at least one other component. For example, the depth sensor 551 is operatively coupled to the eye tracking cameras 550 as a confirmation of measured accommodation against actual distance the user eyes 549 are looking at.

It should be appreciated that a viewing optics assembly 548 may include some of the components illustrated in FIG. 34B and may include components instead of or in addition to the components illustrated. In some embodiments, for example, a viewing optics assembly 548 may include two world camera 552 instead of four. Alternatively or additionally, cameras 552 and 553 need not capture a visible light image of their full field of view. A viewing optics assembly 548 may include other types of components. In some embodiments, a viewing optics assembly 548 may include one or more dynamic vision sensor (DVS), whose pixels may respond asynchronously to relative changes in light intensity exceeding a threshold.

In some embodiments, a viewing optics assembly 548 may not include the depth sensor 551 based on time of flight information. In some embodiments, for example, a viewing optics assembly 548 may include one or more plenoptic cameras, whose pixels may capture light intensity and an angle of the incoming light, from which depth information can be determined. For example, a plenoptic camera may include an image sensor overlaid with a transmissive diffraction mask (TDM).

Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 551.

It also should be appreciated that the configuration of the components in FIG. 5B is provided as an example. A viewing optics assembly 548 may include components with any suitable configuration, which may be set to provide the user with the largest field of view practical for a particular set of components. For example, if a viewing optics assembly 548 has one world camera 552, the world camera may be placed in a center region of the viewing optics assembly instead of at a side.

Information from the sensors in viewing optics assembly 548 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified such that the virtual content is perceived by a user as realistically interacting with the physical world (e.g. clip content to account for occlusions), when viewed through the user interface.

The location on the viewing optics assembly 548 at which content is displayed to create the impression of an object at a particular location may depend on the physics of the viewing optics assembly. Additionally, the pose of the user's head with respect to the physical world and the direction in which the user's eyes are looking may impact where in the physical world content displayed at a particular location on the viewing optics assembly content will appear. Sensors as described above may collect this information, and or supply information from which this information may be calculated, such that a processor receiving sensor inputs may compute where objects should be rendered on the viewing optics assembly 548 to create a desired appearance for the user.

Regardless of how content is presented to a user, a model of the physical world may be used so that characteristics of the virtual objects, which can be impacted by physical objects, including the shape, position, motion, and visibility of the virtual object, can be correctly computed. In some embodiments, the model may include the reconstruction of a physical world, for example, the reconstruction 518.

That model may be created from data collected from sensors on a wearable device of the user. Though, in some embodiments, the model may be created from data collected by multiple users, which may be aggregated in a computing device remote from all of the users (and which may be "in the cloud").

Figure 6A:
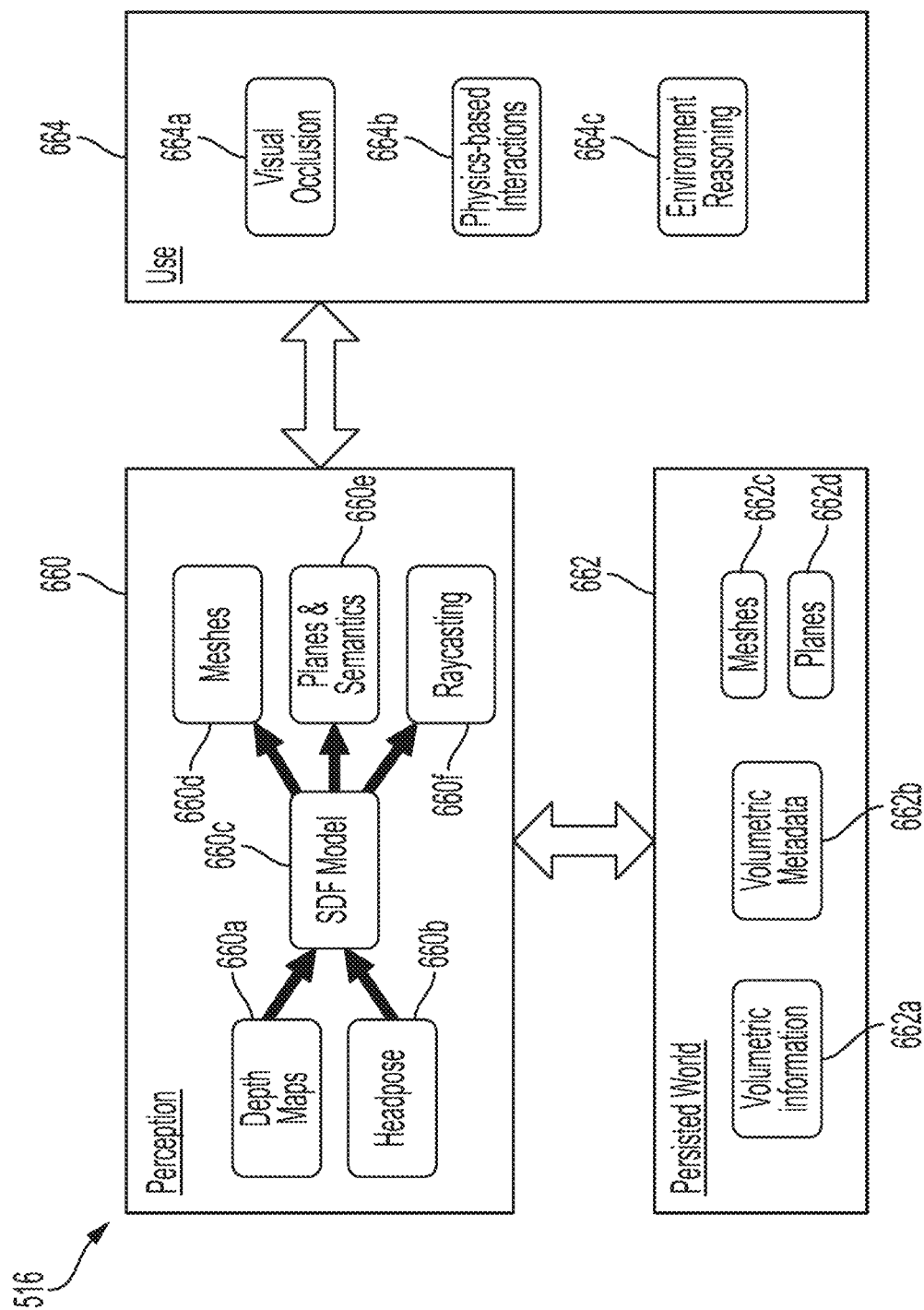
FIG. 6A is a schematic diagram illustrating an AR system using a world reconstruction system, according to some embodiments.

The model may be created, at least in part, by a world reconstruction system such as, for example, the world reconstruction component 516 of FIG. 3 depicted in more detail in FIG. 6A. The world reconstruction component 516 may include a perception module 660 that may generate, update, and store representations for a portion of the physical world. In some embodiments, the perception module 660 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

In addition to generating information for a persisted world representation, the perception module 660 may identify and output indications of changes in a region around a user of an AR system. Indications of such changes may trigger updates to volumetric data stored as part of the persisted world, or trigger other functions, such as triggering components 604 that generate AR content to update the AR content.

In some embodiments, the perception module 660 may identify changes based on a signed distance function (SDF) model. The perception module 660 may be configured to receive sensor data such as, for example, depth maps 660a and headposes 660b, and then fuse the sensor data into a SDF model 660c. Depth maps 660a may provide SDF information directly, and images may be processed to arrive at SDF information. The SDF information represents distance from the sensors used to capture that information. As those sensors may be part of a wearable unit, the SDF information may represent the physical world from the perspective of the wearable unit and therefore the perspective of the user. The headposes 660b may enable the SDF information to be related to a voxel in the physical world.

In some embodiments, the perception module 660 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may operate reliably over a range of distances, creating the observation range of the sensor, which may be from a few centimeters or tens of centimeters to a few meters.

The world reconstruction component 516 may include additional modules that may interact with the perception module 660. In some embodiments, a persisted world module 662 may receive representations for the physical world based on data acquired by the perception module 660. The persisted world module 662 also may include various formats of representations of the physical world. For example, the module may include volumetric information 662a. For example, volumetric metadata 662b such as voxels may be stored as well as meshes 662c and planes 662d. In some embodiments, other information, such as depth maps could be saved.

In some embodiments, representations of the physical world, such as those illustrated in FIG. 6A may provide relatively dense information about the physical world in comparison to sparse maps, such as a tracking map based on feature points and/or lines as described above.

In some embodiments, the perception module 660 may include modules that generate representations for the physical world in various formats including, for example, meshes 660d, planes and semantics 660e. The representations for the physical world may be stored across local and remote storage mediums. The representations for the physical world may be described in different coordinate frames depending on, for example, the location of the storage medium. For example, a representation for the physical world stored in the device may be described in a coordinate frame local to the device. The representation for the physical world may have a counterpart stored in a cloud. The counterpart in the cloud may be described in a coordinate frame shared by all devices in an XR system.

In some embodiments, these modules may generate representations based on data within the perception range of one or more sensors at the time the representation is generated as well as data captured at prior times and information in the persisted world module 662. In some embodiments, these components may operate on depth information captured with a depth sensor. However, the AR system may include vision sensors and may generate such representations by analyzing monocular or binocular vision information.

In some embodiments, these modules may operate on regions of the physical world. Those modules may be triggered to update a subregion of the physical world, when the perception module 660 detects a change in the physical world in that subregion. Such a change, for example, may be detected by detecting a new surface in the SDF model 660c or other criteria, such as changing the value of a sufficient number of voxels representing the subregion.

The world reconstruction component 516 may include components 664 that may receive representations of the physical world from the perception module 660. Components 664 may include visual occlusion 664a, physics-based interactions 664b, and/or environment reasoning 664c. Information about the physical world may be pulled by these components according to, for example, a use request from an application. In some embodiments, information may be pushed to the use components, such as via an indication of a change in a pre-identified region or a change of the physical world representation within the perception range. The components 664, may include, for example, game programs and other components that perform processing for visual occlusion, physics-based interactions, and environment reasoning.

Responding to the queries from the components 664, the perception module 660 may send representations for the physical world in one or more formats. For example, when the component 664 indicates that the use is for visual occlusion or physics-based interactions, the perception module 660 may send a representation of surfaces. When the component 664 indicates that the use is for environmental reasoning, the perception module 660 may send meshes, planes and semantics of the physical world.

In some embodiments, the perception module 660 may include components that format information to provide the component 664. An example of such a component may be raycasting component 660f. A use component (e.g., component 664), for example, may query for information about the physical world from a particular point of view. Raycasting component 660f may select from one or more representations of the physical world data within a field of view from that point of view.

In some embodiments, components of a passable world model may be distributed, with some portions executing locally on an XR device and some portions executing remotely, such as on a network connected server, or otherwise in the cloud. The allocation of the processing and storage of information between the local XR device and the cloud may impact functionality and user experience of an XR system. For example, reducing processing on a local device by allocating processing to the cloud may enable longer battery life and reduce heat generated on the local device. But, allocating too much processing to the cloud may create undesirable latency that causes an unacceptable user experience.

Figure 6B:
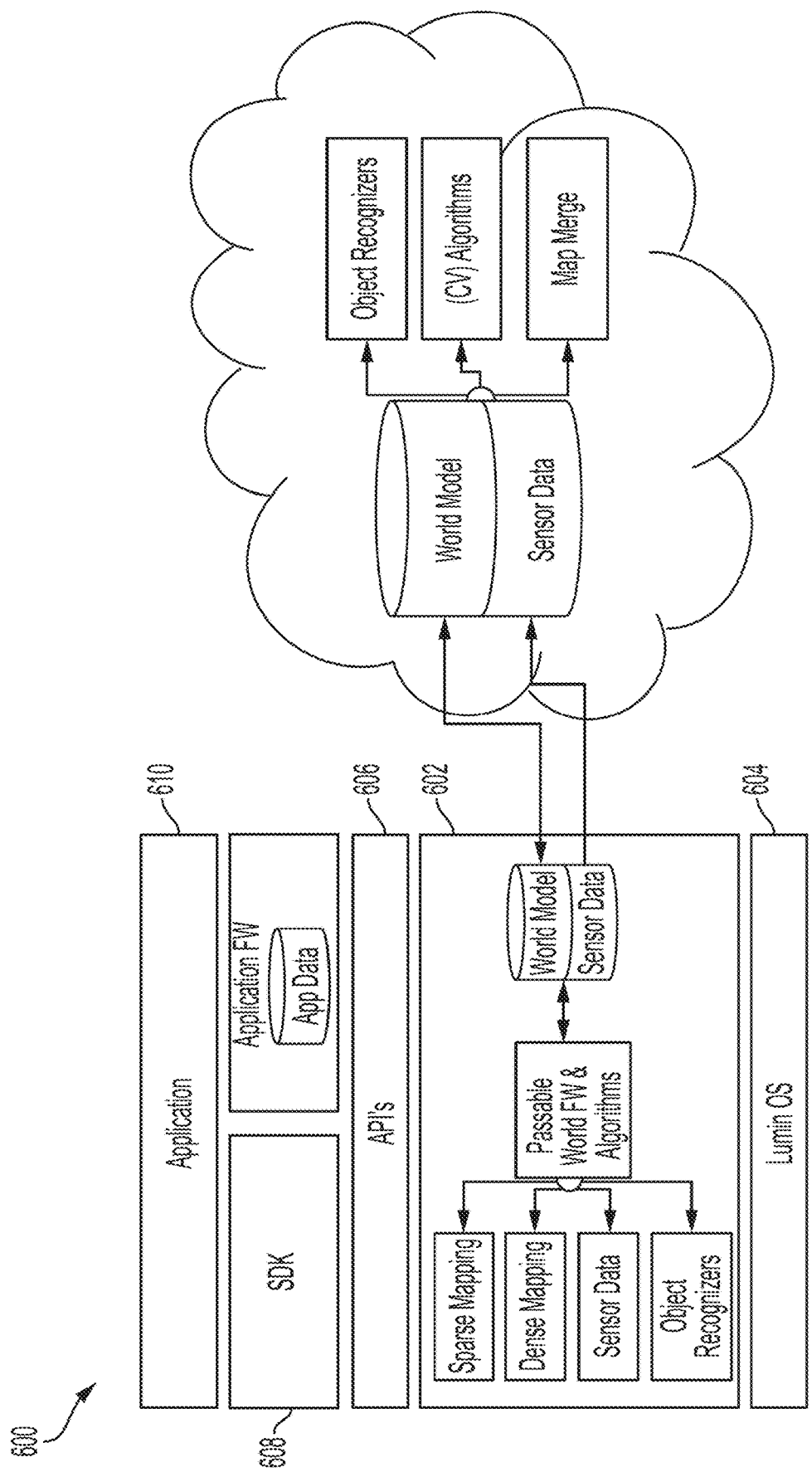
FIG. 6B is a schematic diagram illustrating components of an AR system that maintain a model of a passable world, according to some embodiments.

FIG. 6B depicts a distributed component architecture 600 configured for spatial computing, according to some embodiments. The distributed component architecture 600 may include a passable world component 602 (e.g., PW 538 in FIG. 5A), a Lumin OS 604, API's 606, SDK 608, and Application 610. The Lumin OS 604 may include a Linux-based kernel with custom drivers compatible with an XR device. The API's 606 may include application programming interfaces that grant XR applications (e.g., Applications 610) access to the spatial computing features of an XR device. The SDK 608 may include a software development kit that allows the creation of XR applications.

One or more components in the architecture 600 may create and maintain a model of a passable world. In this example, sensor data is collected on a local device. Processing of that sensor data may be performed in part locally on the XR device and partially in the cloud. PW 538 may include environment maps created based, at least in part, on data captured by AR devices worn by multiple users. During sessions of an AR experience, individual AR devices (such as wearable devices described above in connection with FIG. 4 may create tracking maps, which is one type of map.

In some embodiments, the device may include components that construct both sparse maps and dense maps. A tracking map may serve as a sparse map. The dense map may include surface information, which may be represented by a mesh or depth information. Alternatively or additionally, a dense map may include higher level information derived from surface or depth information, such as the location and/or characteristics of planes and/or other objects.

The sparse map and/or dense map may be persisted for re-use by the same device and/or sharing with other devices. Such persistence may be achieved by storing information in the cloud. The AR device may send the tracking map to a cloud to, for example, merge with environment maps selected from persisted maps previously stored in the cloud. In some embodiments, the selected persisted maps may be sent from the cloud to the AR device for merging. In some embodiments, the persisted maps may be oriented with respect to one or more persistent coordinate frames. Such maps may serve as canonical maps, as they can be used by any of multiple devices. In some embodiments, a model of a passable world may comprise or be created from one or more canonical maps. Devices, even though they perform some operations based on a coordinate frame local to the device, may nonetheless use the canonical map by determining a transformation between their coordinate frame local to the device and the canonical map.

A canonical map may originate as a tracking map (TM). The tracking map, for example, may be persisted such that the frame of reference of the tracking map becomes a persisted coordinate frame. Thereafter, devices that access the canonical map may, once determining a transformation between their local coordinate system and a coordinate system of the canonical map, use the information in the canonical map to determine locations of objects represented in the canonical map in the physical world around the device.

Figure 7:
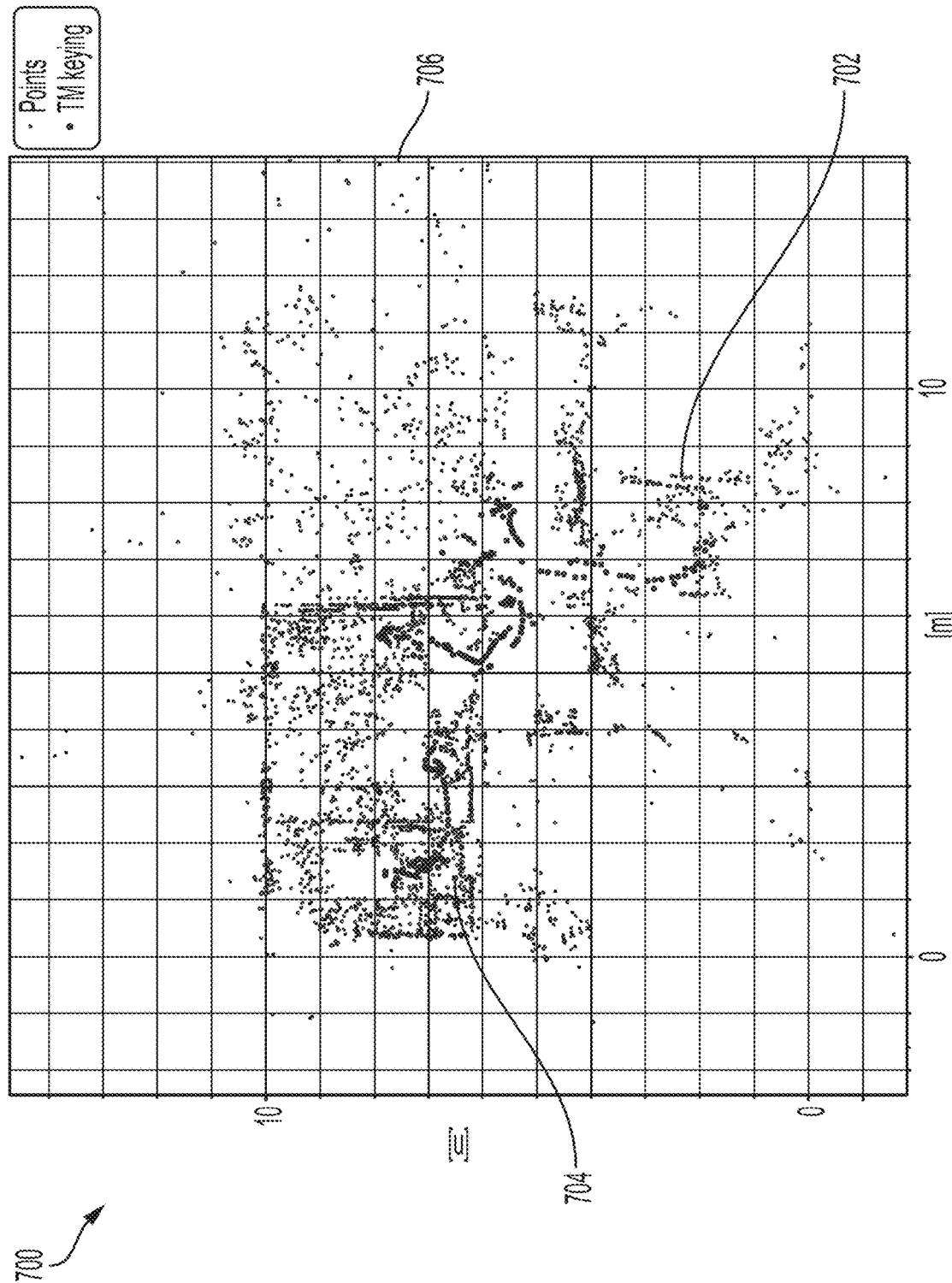
FIG. 7 is a schematic illustration of a tracking map formed by a device traversing a path through a physical world, according to some embodiments.

Accordingly, canonical maps, tracking maps, or other maps, may have similar formats, differing, for example, in where they are used or stored. FIG. 7 depicts an exemplary tracking map 700, according to some embodiments. In this example, the tracking map represents features of interest as points. In other embodiments, lines may be used instead of or in addition to points. The tracking map 700 may provide a floor plan 706 of physical objects in a corresponding physical world, represented by points 702. In some embodiments, a map point 702 may represent a feature of a physical object that may include multiple features. For example, each corner of a table may be a feature that is represented by a point on a map. The features may be derived from processing images, such as may be acquired with the sensors of a wearable device in an augmented reality system. The features, for example, may be derived by processing an image frame output by a sensor to identify features based on large gradients in the image or other suitable criteria. Further processing may limit the number of features in each frame. For example, processing may select features that likely represent persistent objects. One or more heuristics may be applied for this selection.

The tracking map 700 may include data on points 702 collected by a device. For each image frame with data points added to a tracking map, a pose may be stored. The pose may represent the orientation from which the image frame was captured, such that the feature points within each image frame may be spatially correlated to the tracking map. The pose may be determined by positioning information, such as may be derived from the sensors, such as an IMU sensor, on the wearable device. Alternatively or additionally, the pose may be determined by matching a subset of features in the image frame to features already in the tracking map. A transformation between matching subsets of features may be computed, which indicates the relative pose between the image frame and the tacking map.

Not all of the feature points and image frames collected by a device may be retained as part of the tracking map, as much of the information collected with the sensors is likely to be redundant. In some embodiments, a relatively small subset of features from an image frame may be processed. Those features may be distinctive, such as may result from a sharp corner or edge. Additionally, features from only certain frames may be added to the map. Those frames may be selected based on one or more criteria, such as degree of overlap with image frames already in the map, the number of new features they contain or a quality metric for the features in the frame. Image frames not added to the tracking map may be discarded or may be used to revise the location of features. As a further alternative, data from multiple image frames, represented as a set of features may be retained, but features from only a subset of those frames may be designated as key frames, which are used for further processing.

The key frames may be processed to produce keyrigs 704. The key frames may be processed to produce three dimensional sets of feature points and saved as keyrigs 704. Such processing may entail, for example, comparing image frames derived simultaneously from two cameras to stereoscopically determine the 3D position of feature points. Metadata may be associated with these keyframes and/or keyrigs, such as poses. Keyrigs may subsequently be used when localizing a device to the map based on a newly acquired image from the device.

Environment maps may have any of multiple formats depending on, for example, the storage locations of an environment map including, for example, local storage of AR devices and remote storage. For example, a map in remote storage may have higher resolution than a map in local storage on a wearable device where memory is limited. To send a higher resolution map from remote storage to local storage, the map may be down sampled or otherwise converted to an appropriate format, such as by reducing the number of poses per area of the physical world stored in the map and/or the number of feature points stored for each pose. In some embodiments, a slice or portion of a high resolution map from remote storage may be sent to local storage, where the slice or portion is not down sampled.

A database of environment maps may be updated as new tracking maps are created. To determine which of a potentially very large number of environment maps in a database is to be updated, updating may include efficiently selecting one or more environment maps stored in the database relevant to the new tracking map. The selected one or more environment maps may be ranked by relevance and one or more of the highest ranking maps may be selected for processing to merge higher ranked selected environment maps with the new tracking map to create one or more updated environment maps. When a new tracking map represents a portion of the physical world for which there is no preexisting environment map to update, that tracking map may be stored in the database as a new environment map.

Remote Localization

Various embodiments may utilize remote resources to facilitate persistent and consistent cross reality experiences between individual and/or groups of users. Benefits of operation of an XR device with canonical maps as described herein can be achieved without downloading a set of canonical maps. The benefit, for example, may be achieved by sending feature and pose information to a remote service that maintains a set of canonical maps. A device seeking to use a canonical map to position virtual content in locations specified relative to the canonical map may receive from the remote service one or more transformations between the features and the canonical maps. Those transformations may be used on the device, which maintains information about the positions of those features in the physical world, to position virtual content in locations specified with respect to one or more canonical maps or to otherwise identify locations in the physical world that are specified with respect to the canonical map.

In some embodiments, spatial information is captured by an XR device and communicated to a remote service, such as a cloud based service, which uses the spatial information to localize the XR device to a canonical map used by applications or other components of an XR system to specify the location of virtual content with respect to the physical world. Once localized, transforms that link a tracking map maintained by the device to the canonical map can be communicated to the device.

In some embodiments, a camera and/or a portable electronic device comprising a camera may be configured to capture and/or determine information about features (e.g. a combination of points and/or lines) and send the information to a remote service, such as a cloud based device. The remote service may use the information to determine a pose of the camera. The pose of the camera may be determined, for example, using the methods and techniques described herein. In some examples, the pose may include a rotation matrix and/or a translation matrix. In some examples, the pose of the camera may be represented with respect to any of the maps described herein.

The transforms may be used, in conjunction with the tracking map, to determine a position in which to render virtual content specified with respect to the canonical map, or otherwise identify locations in the physical world that are specified with respect to the canonical map.

In some embodiments, the results returned to the device from the localization service may be one or more transformations that relate the uploaded features to portions of a matching canonical map. Those transformations may be used within the XR device, in conjunction with its tracking map, for identifying locations of virtual content or otherwise identifying locations in the physical world. In embodiments in which persistent spatial information, such as PCFs as described herein, are used to specify locations with respect to a canonical map, the localization service may download to the device transformations between the features and one or more PCFs after a successful localization.

In some embodiments, the localization service may further return to the device a pose of the camera. In some embodiments, the result returned to the device from the localization service may relate the pose of the camera in relation to a canonical map.

As a result, network bandwidth consumed by communications between an XR device and a remote service for performing localization may be low. The system may therefore support frequent localization, enabling each device interacting with the system to quickly obtain information for positioning virtual content or performing other location-based functions. As a device moves within the physical environment, it may repeat requests for updated localization information. Additionally, a device may frequently obtain updates to the localization information, such as when the canonical maps change, such as through merging of additional tracking maps to expand the map or increase their accuracy.

Figure 8:
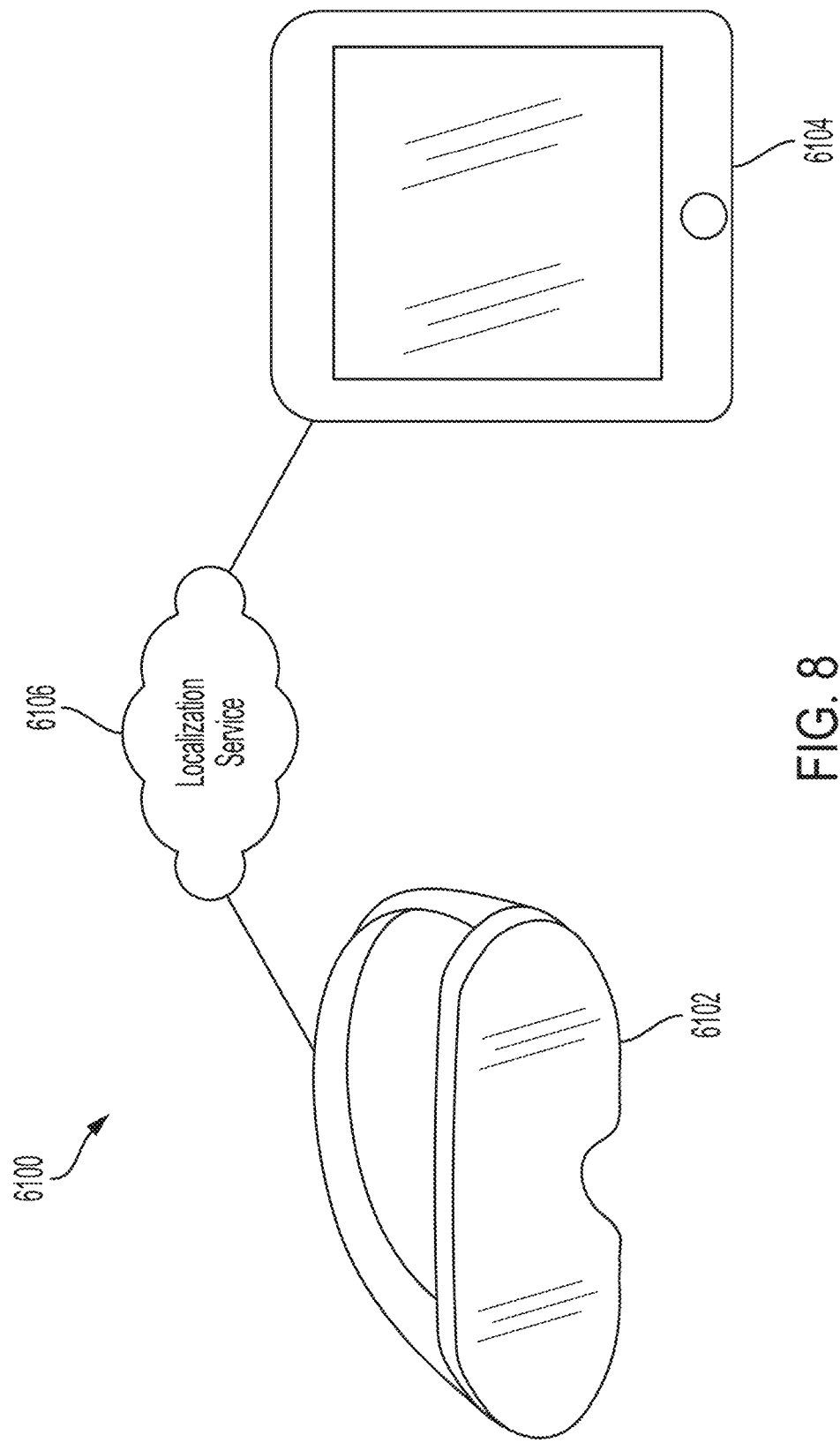
FIG. 8 is a schematic diagram of an example XR system in which any of multiple devices may access a localization service, according to some embodiments.

FIG. 8 is a schematic diagram of an XR system 6100. The user devices that display cross reality content during user sessions can come in a variety of forms. For example, a user device can be a wearable XR device (e.g., 6102) or a handheld mobile device (e.g., 6104). As discussed above, these devices can be configured with software, such as applications or other components, and/or hardwired to generate local position information (e.g., a tracking map) that can be used to render virtual content on their respective displays.

Virtual content positioning information may be specified with respect to global location information, which may be formatted as a canonical map containing one or more persistent coordinate frames (PCFs), for example. A PCF may be a collection of features in a map that may be used when localizing with respect to that map. A PCF may be selected, for example, based on processing that identifies that set of features as readily recognizable and likely to be persistent across user sessions. According to some embodiments, for example the embodiment shown in FIG. 8, the system 6100 is configured with cloud-based services that support the functioning and display of the virtual content on the user device for which a location is specified relative to a PCF in a canonical map.

In one example, localization functions are provided as a cloud-based service 6106. Cloud-based service 6106 may be implemented on any of multiple computing devices, from which computing resources may be allocated to one or more services executing in the cloud. Those computing devices may be interconnected with each other and accessibly to devices, such as a wearable XR device 6102 and hand held device 6104. Such connections may be provided over one or more networks.

In some embodiments, the cloud-based service 6106 is configured to accept descriptor information from respective user devices and "localize" the device to a matching canonical map or maps. For example, the cloud-based localization service matches descriptor information received to descriptor information for respective canonical map(s). The canonical maps may be created using techniques as described above that create canonical maps by merging maps provided by one or more devices that have image sensors or other sensors that acquire information about a physical world.

However, it is not a requirement that the canonical maps be created by the devices that access them, as such maps may be created by a map developer, for example, who may publish the maps by making them available to localization service 6106.

Figure 9:
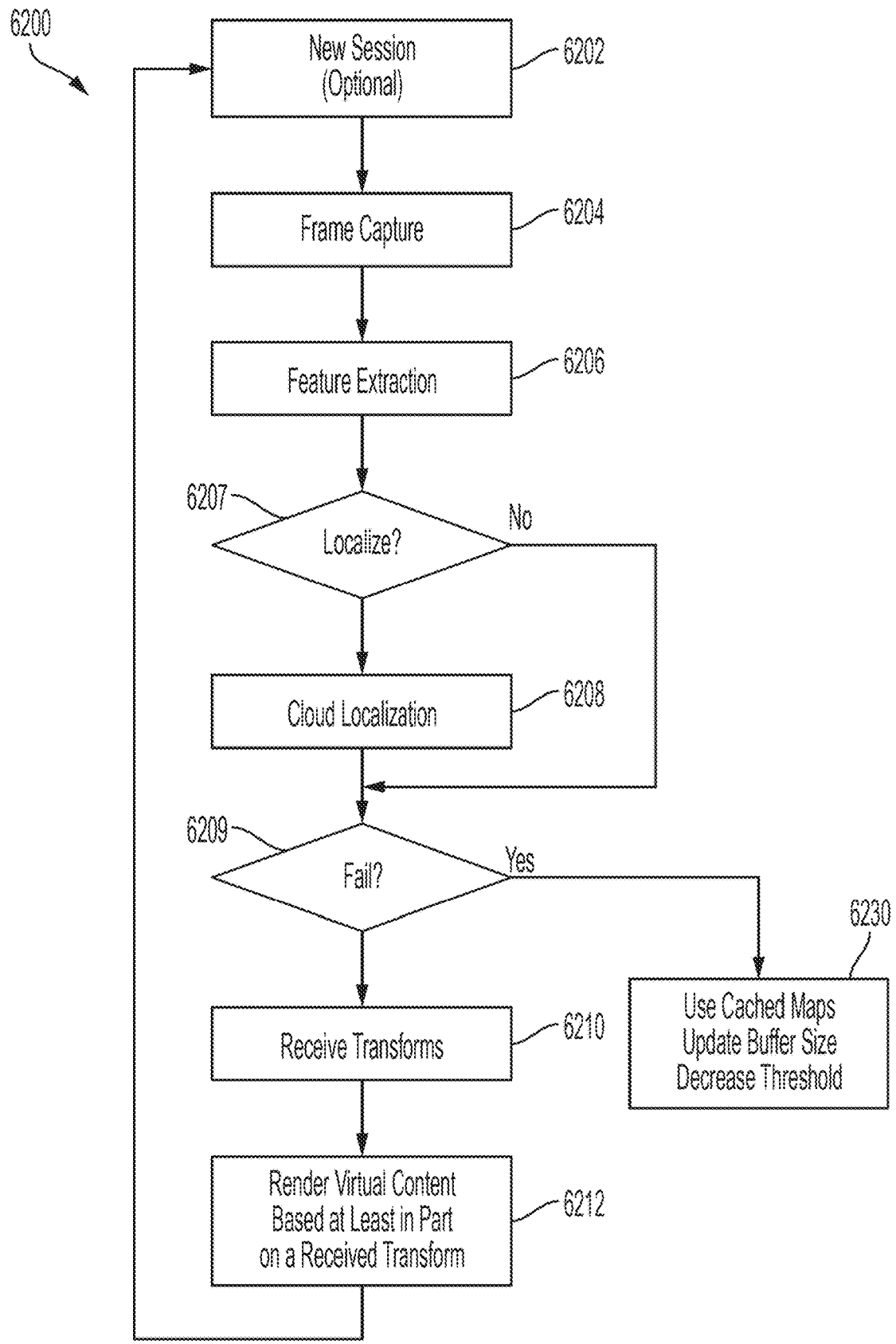
FIG. 9 is an example process flow for operation of a portable device as part of an XR system that provides cloud-based localization, according to some embodiments.

FIG. 9 is an example process flow that can be executed by a device to use a cloud-based service to localize the device's position with canonical map(s) and receive transform information specifying one or more transformations between the device local coordinate system and the coordinate system of a canonical map.

According to some embodiments, process 6200 can begin at 6202 with a new session. Starting a new session on the device may initiate capture of image information to build a tracking map for the device. Additionally, the device may send a message, registering with a server of a localization service, prompting the server to create a session for that device.

Once the new session is established, process 6200 may continue at 6204 with capture of new frames of the device's environment. Each frame can be processed to select features from the captured frame at 6206. Features may be of one or more types, such as feature points and/or feature lines.

Feature extraction at 6206 may include appending pose information to the extracted features at 6206. The pose information may be a pose in the device's local coordinate system. In some embodiments, the pose may be relative to a reference point in the tracking map, which may be the origin of a tracking map of the device. Regardless of the format, the pose information may be appended to each feature or each set of features, such that the localization service may use the pose information for computing a transformation that can be returned to the device upon matching the features to features in a stored map.

The process 6200 may continue to decision block 6207 where a decision is made whether to request localization. In some embodiments, localization accuracy is enhanced by performing localization for each of multiple image frames. A localization is considered successful only when there is a sufficient correspondence between the results computed for a sufficient number of the multiple image frames. Accordingly, a localization request may be sent only when sufficient data has been captured to achieve a successful localization.

One or more criteria may be applied to determine whether to request localization. The criteria may include passage of time, such that a device may request localization after some threshold amount of time. For example, if localization has not been attempted within a threshold amount of time, the process may continue from decision block 6207 to act 6208 where localization is requested from the cloud. That threshold amount of time may be between ten and thirty seconds, such as twenty-five seconds, for example. Alternatively or additionally, localization may be triggered by motion of a device. A device executing the process 6200 may track its motion using an IMU and/or its tracking map, and initiate localization upon detecting motion exceeding a threshold distance from the location where the device last requested localization. The threshold distance may be between one and ten meters, such as between three and five meters, for example.

Regardless of how the localization is triggered, when triggered, the process 6200 may proceed to act 6208 where the device sends a request to the localization service, including data used by the localization service to perform localization. In some embodiments, data from multiple image frames may be provided for a localization attempt. The localization service, for example, may not deem localization successful unless features in multiple image frames yield consistent localization results. In some embodiments, process 6200 may include saving sets of feature and appended pose information into a buffer. The buffer may, for example, be a circular buffer, storing sets of features extracted from the most recently captured frames. Accordingly, the localization request may be sent with a number of sets of features accumulated in the buffer.

The device may transfer the contents of the buffer to the localization service as part of a localization request. Other information may be transmitted in conjunction with the feature points and appended pose information. For example, in some embodiments, geographic information may be transmitted, which may aid in selecting a map against which to attempt localization. The geographic information may include, for example, GPS coordinates or a wireless signature associated with the devices tracking map or current persistent pose.

In response to the request sent at 6208, a cloud localization service may process the sets of features to localize the device into a canonical map or other persistent map maintained by the service. For example, t the cloud-based localization service may generate a transform based on the pose of feature sets sent from the device relative to matching features of the canonical maps. The localization service may return the transform to the device as the localization result. This result may be received at block 6210.

Regardless of how the transforms are formatted, at act 6212 the device may use these transforms to compute the location at which to render virtual content for which a location has been specified by an application or other component of the XR system relative to any of the PCFs. This information may alternatively or additionally be used on the device to perform any location based operation in which a location is specified based on the PCFs.

In some scenarios, the localization service may be unable to match features sent from a device to any stored canonical map or may not be able to match a sufficient number of the sets of features communicated with the request for the localization service to deem a successful localization occurred. In such a scenario, rather than returning transformations to the device as described above in connection with act 6210, the localization service may indicate to the device that localization failed. In such a scenario, the process 6200 may branch at decision block 6209 to act 6230, where the device may take one or more actions for failure processing. These actions may include increasing the size of the buffer holding feature sets sent for localization. For example, if the localization service does not deem a successful localization unless three sets of features match, the buffer size may be increased from five to six, increasing the chances that three of the transmitted sets of features can be matched to a canonical map maintained by the localization service.

In some embodiments, canonical maps maintained by the localization service may contain PCFs that have been previously identified and stored. Each PCF may be represented by multiple features, which, as for each image frame processed at 6206, may include a mix of feature points and feature lines. Accordingly, the localization service may identify a canonical map with a sets of features that match sets of features sent with the localization request and may compute a transformation between the coordinate frame represented by the poses sent with the request for localization and the one or more PCFs.

In the illustrated embodiment, a localization result may be expressed as a transformation that aligns the coordinate frame of extracted sets of features with respect to the selected map. This transformation may be returned to user device where it may be applied, as either a forward or inverse transformation, to relate locations specified with respect to the shared map to the coordinate frame used by the user device, or vice versa. The transformation, for example, may allow the device to render virtual content for its user in a location with respect to the physical world that is specified in a coordinate frame of the map to which the device localized.

Pose Estimation using 2D/3D Point and Line Correspondence

Figure 10:
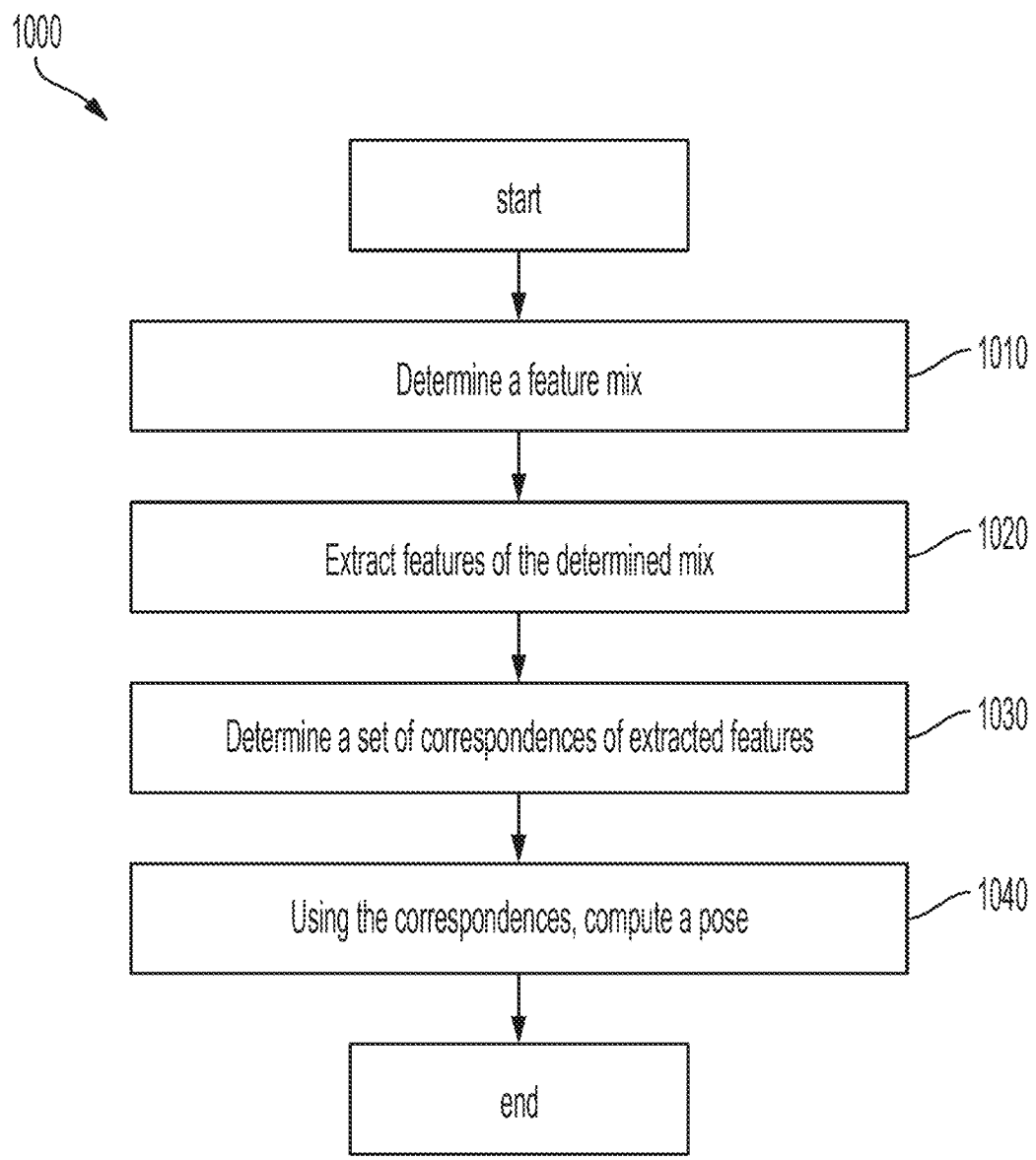
FIG. 10 is a flowchart of an exemplary process for localization in a system configured to compute a pose using features with a mix of feature types, according to some embodiments.

A pose of a set of features relative to other image information may be computed in many scenarios, including in an XR system to localize a device with respect to a map. FIG. 10 illustrates a method 1000 that may be implemented to compute such a pose. In this example, method 1000 computes a pose for any mix of feature types. The features, for example, may be all feature points or all feature lines or a combination of feature points and feature lines. Method 1000, for example, may be performed as part of the processing illustrated in FIG. 9 in which the computed pose is used to localize a device with respect to a map.

Processing for method 1000 may begin once an image frame is captured for processing. At block 1010, a mix of feature types may be determined. In some embodiments, the features extracted may be points and/or lines. In some embodiments, the device may be configured to select a certain mix of feature types. The device, for example, may be programmed to select a set percentage of the features as points and the remaining features as lines. Alternatively, or additionally, pre-configuration may be based on ensuring at least a certain number of points and a certain number of lines in the set of features from the image.

Such a selection may be guided by one or more metrics, indicating, for example, the likelihood that a feature would be recognized in a subsequent image of the same scene. Such a metric may be based, for example, on the characteristics of the physical structure giving rise to the feature and/or the location of such a structure within the physical environment. A corner of a window or a picture frame mounted on a wall, for example, may yield feature points with high scores. As another example, a corner of a room or an edge of a step may yield feature lines with high scores. Such metrics may be used to select the best features in an image or may be used to select images for which further processing is performed, with further processing being performed only for images with a number exceeding a threshold of features with a high score for example.

Figure 11:
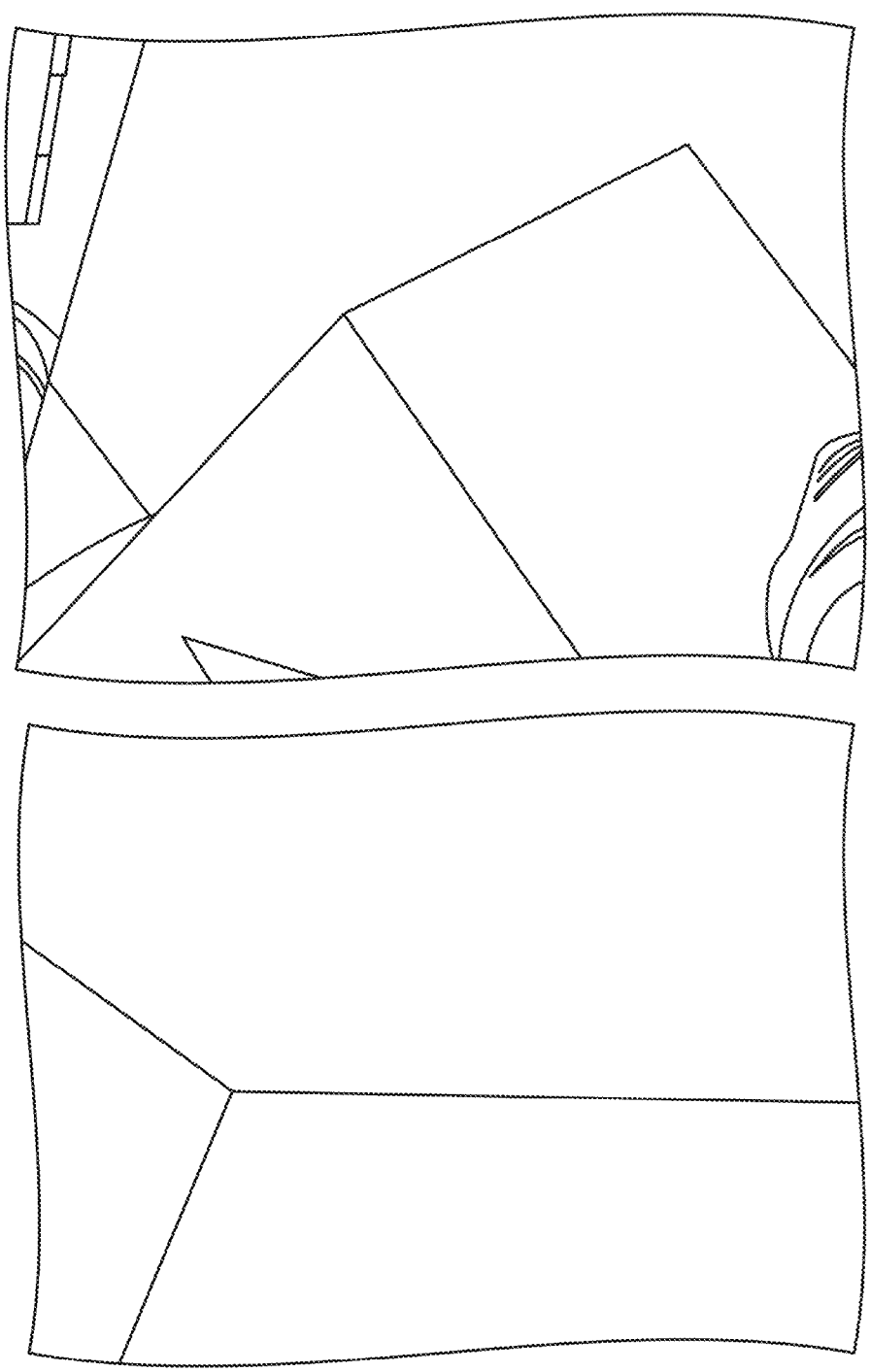
FIG. 11 is a sketch of an exemplary environment for which point-based localization is likely to fail, according to some embodiments.

In some embodiments, selection of features may be done in such a way that the same number or same mix of points and lines is selected for all images. Image frames that do not supply the specified mix of features might be discarded, for example. In other scenarios, the selection may be dynamic based on the visual characteristics of the physical environment. The selection may be guided, for example, based on the magnitude of metrics assigned to detected features. For example, in a small room with monochrome walls and few furnishings, there may be few physical structures that give rise to feature points with large metrics. FIG. 11, for example, illustrates an environment in which a localization attempt based on feature points is likely to fail. A similar result may occur in an environment with structures that give rise to numerous similar feature points. In those environments, the mix of selected features may include more lines than points. Conversely, in a large or outdoor space, there may be many structures that give rise to feature points, with few straight edges, such that the mix of features will be biased towards points.

At block 1020, features of the determined mix may be extracted from an image frame to be processed. It should be appreciated that blocks 1010 and 1020 need not be performed in the order illustrated, as the processing may be dynamic such that processing to select features and determine a mix may occur concurrently. Techniques that process an image to identify points and/or lines may be applied in block 1020 to extract features. Moreover, one or more criteria may be applied to limit the number of features extracted. Criteria may include a total number of features or a quality metric for the features included in the set of extracted features.

Processing may then proceed to block 1030 at which correspondences between the extracted features from an image and other image information, such as a previously stored map are determined. Correspondences may be determined, for example, based on visual similarity and/or descriptor information associated with the features. These correspondences may be used to generate a set of constraints on a transformation that defines the pose of the extracted features with respect to the features from the other image information. In the localization example, these correspondences are between the selected set of features in an image taken with a camera on a device and a stored map.

Figure 12:
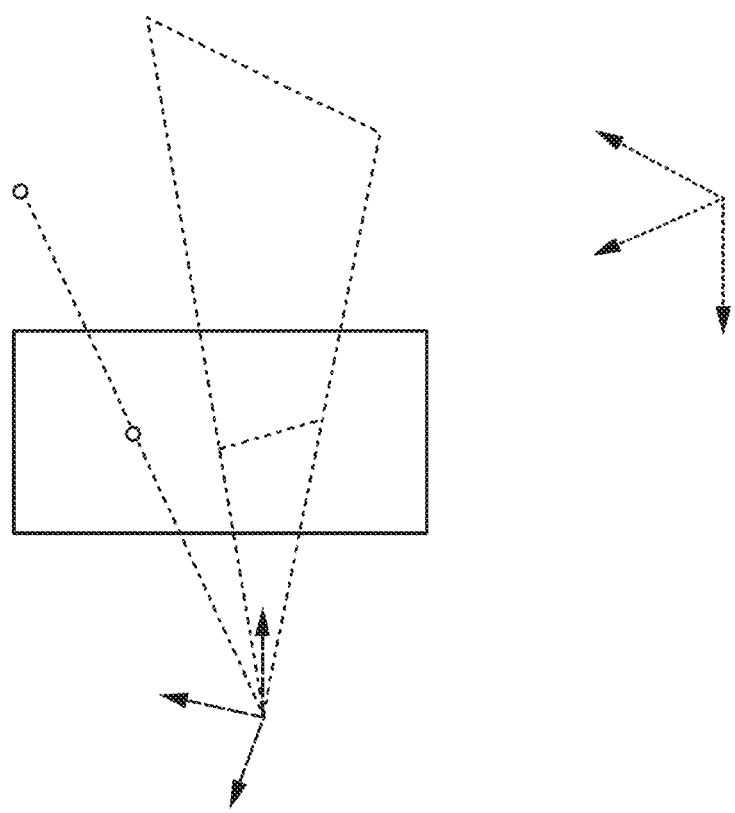
FIG. 12 is an exemplary schematic of 2D-3D point correspondence and 2D-3D line correspondence, according to some embodiments.

In some embodiments, the image used as the input for pose estimate is a two-dimensional image. Accordingly, the image features are 2D. The other image information may represent features in three-dimensions. For example, a key-rig as described above may have three dimensional features built up from multiple two dimensional images. Even though of different dimensions, correspondences may nonetheless be determined. FIG. 12, for example, illustrates that correspondences may be determined by projecting the 3D features into a 2D plane of the image from which the 2D features were extracted.

Regardless of the manner in which the set of features is extracted, processing proceeds to block 1040, where a pose is computed. This pose, for example, may serve as the result of localization attempt in an XR system, as described above.

According to some embodiments, any or all of the steps of the method 1000 may be performed on devices described herein, and/or on remote services such as those described herein.

In some embodiments, the processing at block 1040 may be selected based on the mix of feature types extracted from the image frame. In other embodiments, the processing may be universal, such that the same software may be executed, for example, for an arbitrary mix of points and lines.

Estimating the pose of a camera using 2D/3D point or line correspondences, called the PnPL problem, is a fundamental problem in computer vision with many applications, such as Simultaneous Localization and Mapping (SLAM), Structure from Motion (SfM) and Augmented Reality. A PnPL algorithm as described herein may be complete, robust and efficient. Here a "complete" algorithm can mean that the algorithm can handle all potential inputs and may be applied in any scenario regardless of mix of feature types, such that the same processing may be applied in any scenario.

According to some embodiments, universal processing may be achieved by programming a system to compute a pose from a set of correspondences by converting a least-squares problem into a minimal problem.

Conventional methods of solving the PnPL problem do not provide for a complete algorithm that is also as accurate and efficient as the individual, accustomed solutions to each problem. The inventors have recognized that by solving multiple problems using one algorithm, the effort in algorithm implementation may be significantly reduced.

According to some embodiments, a method of localization may include using a complete, accurate and efficient solution for the PnPL problem. According to some embodiments, the method can also be able to solve the PnP and the PnL problems as specific cases of the PnPL problem. In some embodiments, the method may be able to solve a plurality of multiple types of problems including minimal problems (e.g. P3L, P3P, and/or PnL) and/or least-squares problems (e.g. PnL, PnP, PnPL). For example, the method may be capable of solving any of the P3L, P3P, PnL, PnP and PnPL problems. Although there are custom solutions for each problem in the literature, it is too laborious to implement specific solutions for each problem in practice.

Figure 13:
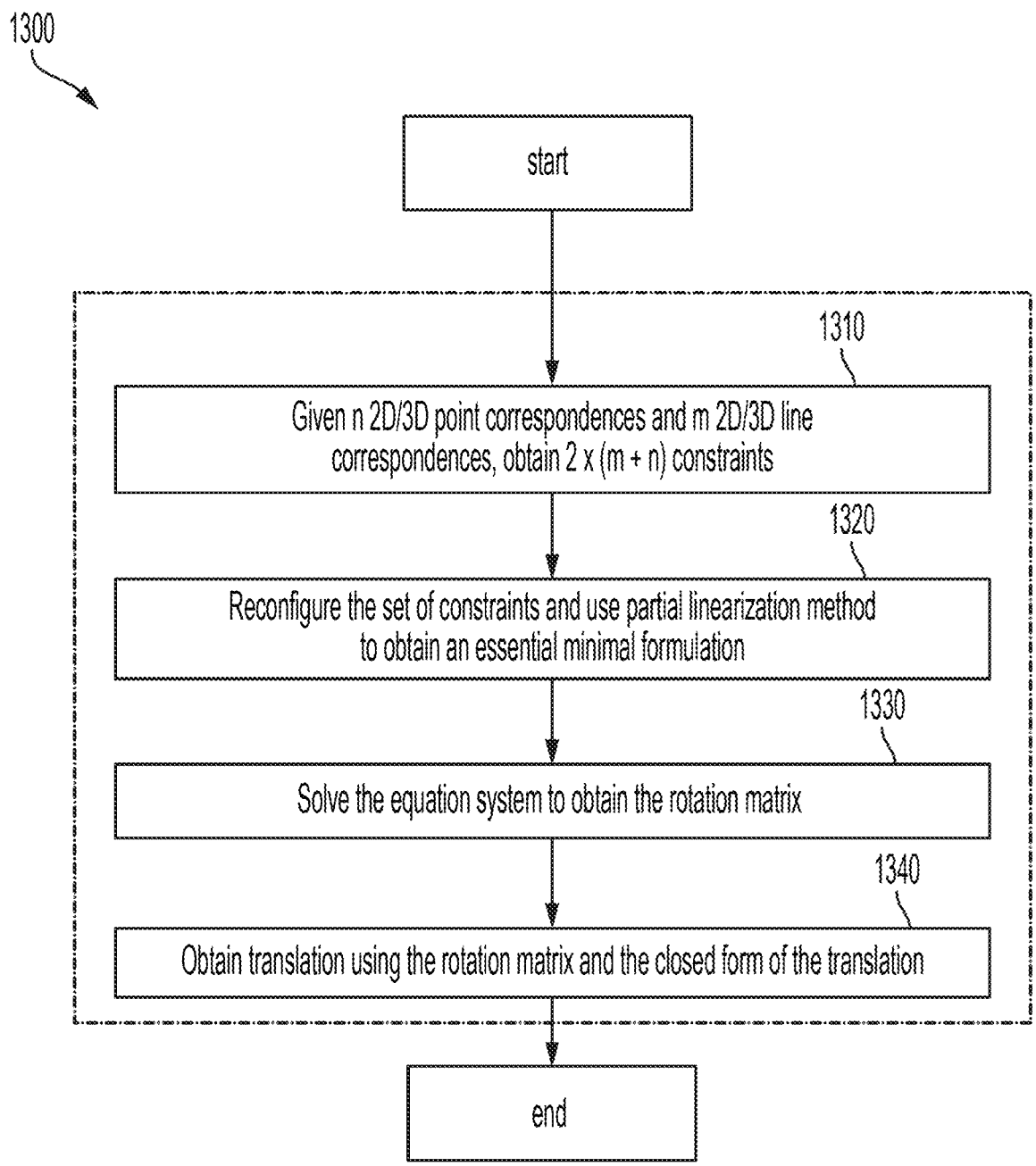
FIG. 13 is a flow chart illustrating a method of efficient localization, according to some embodiments.
Figure 14B:
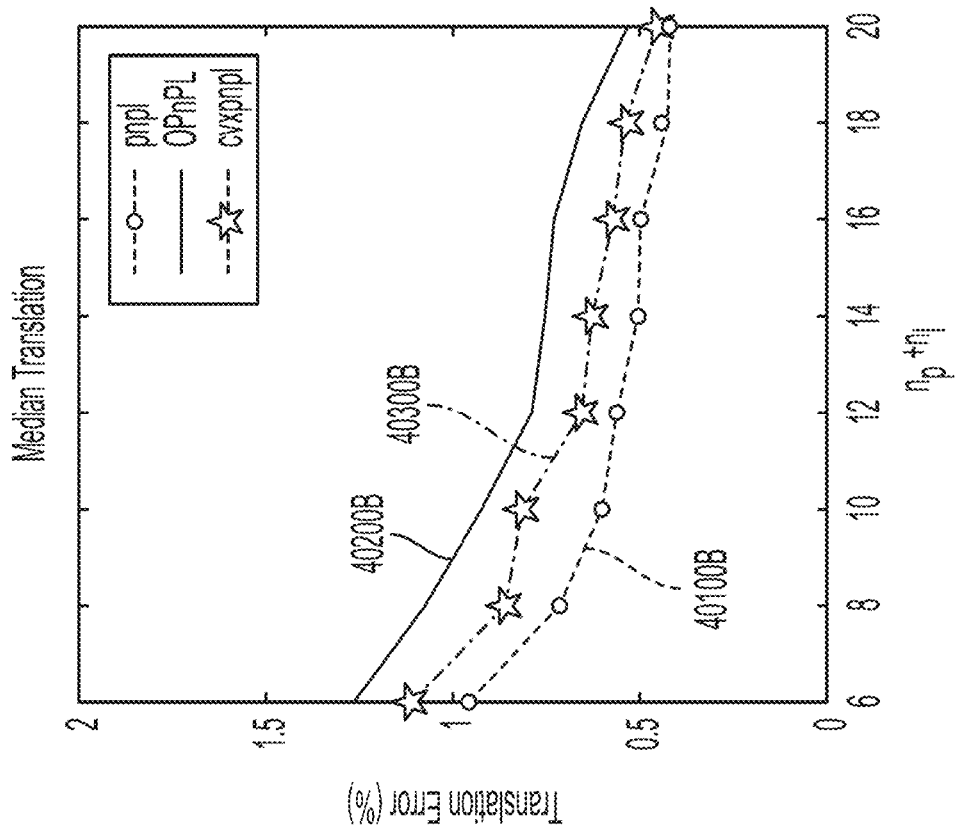
FIG. 14B shows median translation errors of different PnPL algorithms, according to some embodiments.
Figure 14A:
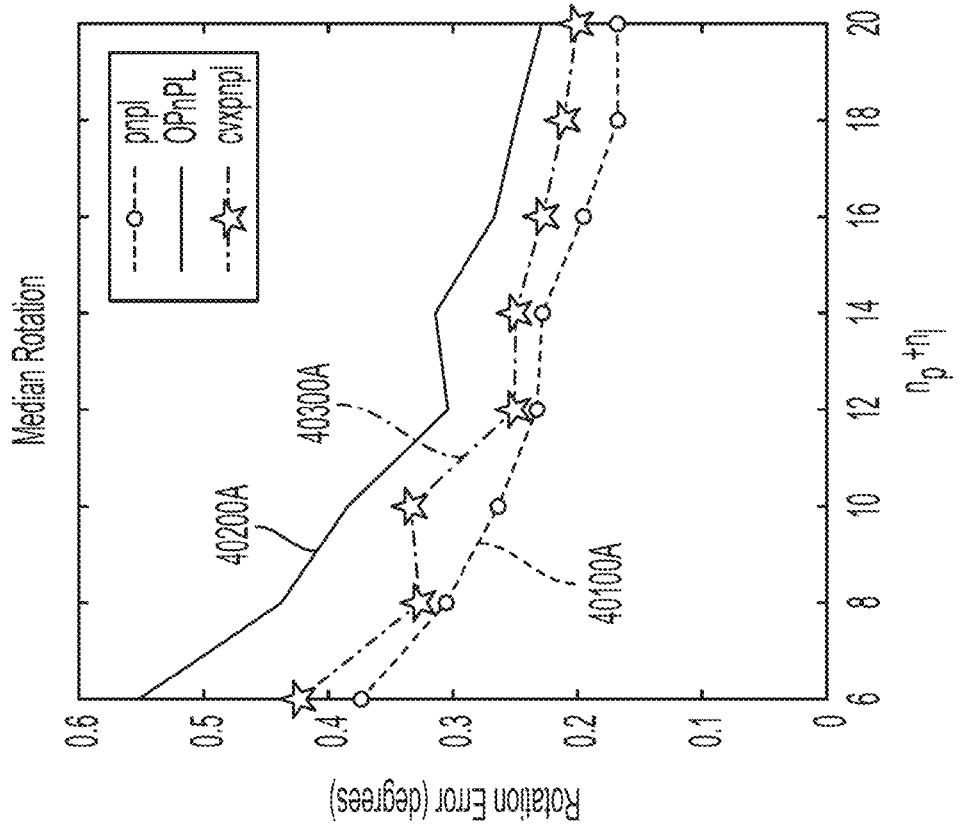
FIG. 14A shows median rotation errors of different PnPL algorithms, according to some embodiments.
Figure 14D:
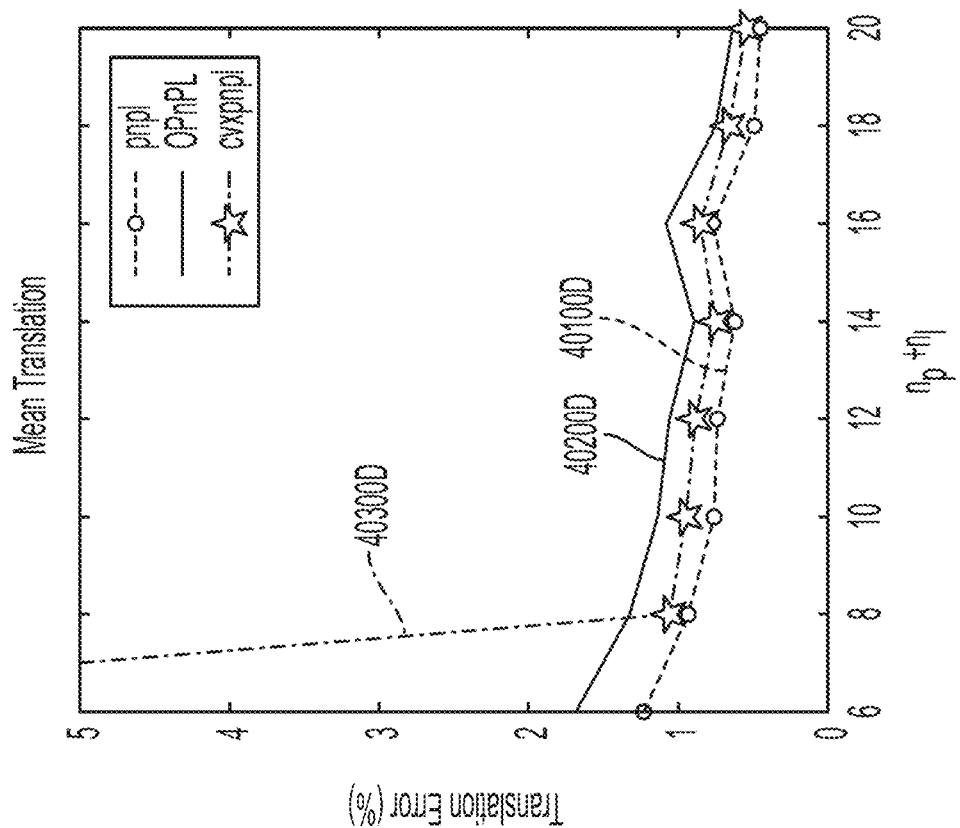
FIG. 14D shows mean translation errors of different PnPL algorithms, according to some embodiments.
Figure 14C:
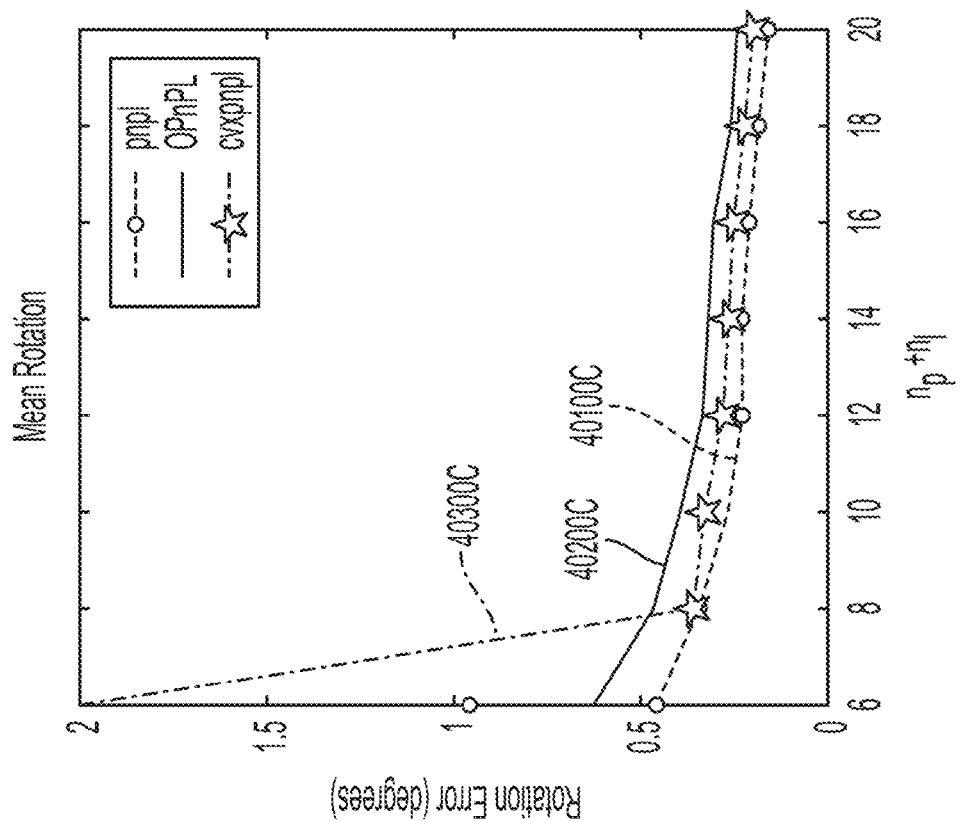
FIG. 14C shows mean rotation errors of different PnPL algorithms, according to some embodiments.

FIG. 13 is an example of processing that may be universal and may result in conversion of a problem, conventionally solved as a least-squares problem, into a minimal problem. FIG. 13 is a flow chart illustrating a method 1300 of efficient pose estimation, according to some embodiments. The method 1300 may be performed, for example, on the correspondences determined in block 1030 in FIG. 10, for example. The method may start with, given a number n of 2D/3D point correspondences and m 2D/3D line correspondences, obtaining 2×(m+n) constraints (Act 1310).

The method 1300 may include reconfiguring (Act 1320) the set of constraints and using partial linearization method to obtain an equation system. The method further includes solving the equation system to obtain the rotation matrix (Act 1330) and obtaining t, a translation vector, using the rotation matrix and the closed form of t (Act 1340). The rotation matrix and translation vector may together define the pose. According to some embodiments, any or all of the steps of the method 1300 may be performed on devices described herein, and/or on remote services such as those described herein.

A Unified Solution for Pose Estimation using 2D/3D Point and Line Correspondence According to some embodiments, solving the PnPL problem can mean estimating the camera pose (i.e. R and t) using N 2D/3D point correspondences (i.e. $\{p_i \leftrightarrow P_i\}_{i=1}^N$) and M 2D/3D line correspondences (i.e. $\{l_i \leftrightarrow L_i\}_{i=1}^M$). $P_i = [x_i, y_i, z_i]^T$ may represent a 3D point and $p_i = [u_i, v_i]^T$ may represent the corresponding 2D pixel in the image. Similarly, $L_i$ may represent a 3D line and $l_i$ may represent the corresponding 2D line. 23D points (such as $q_i^1$ and $Q_i^2$) can be used to represent 3D line $L_i$, and 2 pixels (such as $q_i^1$ and $q_i^2$) can be used to represent corresponding 2D line $l_i$. To simplify the notation, the normalized pixel coordinate may be used.

In an exemplary embodiment of the method of 1300, the following notation may be used. The PnPL problem may include estimation of the camera pose (i.e. R and t) using N 2D/3D point correspondences $\{p_i \leftrightarrow P_i\}_{i=1}^N$ and M 2D/3D line correspondences $\{l_i \leftrightarrow L_i\}_{i=1}^M$. $P_i = [x_i, y_i, z_i]^T$ may represent a 3D point and $p_i = [u_i, v_i]^T$ may represent the corresponding 2D pixel in the image. Similarly, $L_i$ can represent a 3D line and $l_i$ can represent the corresponding 2D line. 23D points $Q_i^1$ and $Q_i^2$ may be used to represent $L_i$, and 2 pixels $q_i^1$ and $q_i^2$ may be used to represent $l_i$. To simplify the notation, we use the normalized pixel coordinate.

According to some embodiments, obtaining 2×(m+n) constraints in Act 1310 given a number n of 2D/3D point correspondences and m 2D/3D line correspondences may include using the point correspondences, wherein the $i^{th}$ 2D/3D point correspondence $P_i \leftrightarrow P_i$ provides the following 2 constraints on $R = [r_1; r_2; r_3]$ where $r_i$, i=1, 2, 3 are the 3 rows of R and $t = [t_1; t_2; t_3]$ shown in (1).

$$u_i = \frac{r_1 P_i + t_1}{r_3 P_i + t_3},$$

$$v_i = \frac{r_2 P_i + t_2}{r_3 P_i + t_3}. \qquad \text{EQ. (1)}$$

According to some embodiments, obtaining 2×(m+n) constraints in Act 1310 of method 1300 further includes multiplying the denominators in (1) to both sides of the equations, to yield the following:

$r_1 P_i + t_1 - u_i(r_3 P_i + t_3) = 0$, $r_2 P_i + t_2 - v_i(r_3 P_i + t_3) = 0$. \qquad EQ. (2)

One can then define $l = [a; b; c]^T$ where $a^2 + b^2 = 1$. For the ith 2D/3D line correspondence $l_i \leftrightarrow L_i$, one will have the following 2 constraints:

$l_i \cdot (RQ_i^1 + t_i) = 0$, $l_i \cdot (RQ_i^2 + t_i) = 0$, \qquad EQ. (3)

where · represents the dot product. The equations provided in (2) and (3) can be written in the same form as $aRb + ct = 0$, \qquad EQ. (4)

where a may be a 1×3 matrix and b may be a 3×1 vector. It is obvious that $a=c=1^T$ and $b=Q_i^j$, $j=1, 2$ for the constraints from line in (3). For the first equation in (2), we have $$a=[1\ 0\ -u_i],$$

$$b=P_i$$

$$c=[1\ 0\ -u_i]. \quad \text{(5)}$$

Similarly, we can show that the second equation in (2) has the same form as (4) by replacing $u_i$ in (5) with $v_i$. Given n 2D/3D point correspondences and m 2D/3D lines correspondences, M=2×(n+m) constraints may be obtained (4).

According to some embodiments, reconfiguring the set of constraints in Act 1320 of method 1300 may include generating a quadratic system using the constraints, a representation of R using Cayley-Gibbs-Rodriguez parametrization, and the close-form of t.

M=2×(n+m) constraints as (4) are obtained given n 2D/3D point correspondences and m 2D/3D lines correspondences. For the $i^{th}$ constraint, the following may be defined:

$$\delta_i = a_i R b_i \quad \text{EQ. (6)}$$

Here $\delta_i$ may be a scalar. Stacking the M constraints, a linear equation system with respect to t can be obtained as $$\Delta + Ct = 0, \quad \text{EQ. (7)}$$

where $\Delta=[\delta_1; \ldots; \delta_M]$ and $C=[c_1; \ldots; c_M]$.

As (7) is linear with respective to t, the closed-form of t can be written as $$t = -(C^T C)^{-1} C^T \Delta \quad \text{EQ. (8)}$$

According to some embodiments, equation (8) may be solved by adopting QR, SVD, or Cholesky. In some embodiments, the linear system of equation (8) may be solved using the normal equation. According to some embodiments, the representation of R using Cayley-Gibbs-Rodriguez parametrization may be calculated by back-substituting t into (7), to get the following $$\Delta + K\Delta = (I+K)\Delta = 0, \quad \text{EQ. (9)}$$

where $K = -C(C^T C)^{-1} C^T$

A solution for R may then be determined. Cayley-Gibbs-Rodriguez (CGR) parametrization, a 3-dimensional vector S, may be used to represent R as the following $$R = \frac{\bar{R}}{1+s^T s}, \quad \text{EQ. (10)}$$

$$\bar{R} = ((1-s^T s)I_3 + 2[s]_x + 2ss^T) =$$

$$\begin{bmatrix} s_1^2 - s_2^2 - s_3^2 + 1 & 2s_1 s_2 - 2s_3 & 2s_2 + 2s_1 s_3 \\ 2s_3 + 2s_1 s_2 & -s_1^2 + s_2^2 - s_3^2 + 1 & 2s_2 s_3 - 2s_1 \\ 2s_1 s_3 - 2s_2 & 2s_1 + 2s_2 s_3 & -s_1^2 - s_2^2 + s_3^2 + 1 \end{bmatrix},$$

$$[s]_x = \begin{bmatrix} 0 & -s_3 & s_2 \\ s_3 & 0 & -s_1 \\ -s_2 & s_1 & 0 \end{bmatrix}.$$

By substituting (10) into (9) and expanding (6), the resultant system is the following $$A\vartheta = 0, \vartheta = [s_1^2, s_2^2, s_1 s_2, s_1 s_3, s_2 s_3, s_1 s_2, s_3, 1]^T \quad \text{EQ. (11)}$$

The rank of A cannot be larger than 9 no matter how many correspondences we have. Therefore, we do not solve for S by the Direct Linear Transformation (DLT), as $\vartheta$ has 9 terms. We write R as $$R = \begin{bmatrix} r_{11} & r_{12} & r_{13} \\ r_{21} & r_{22} & r_{23} \\ r_{31} & r_{32} & r_{33} \end{bmatrix} \quad \text{EQ. (12)}$$

For (9), if we expand the elements $\delta_i$ of $\Delta$ in (6), we can get $$(I \pm K) B r = 0, \quad \text{EQ. (13)}$$

where $r=[r_{11}\ r_{12}\ r_{13}\ r_{21}\ r_{22}\ r_{23}\ r_{31}\ r_{32}\ r_{33}]^T$ and the ith row of B is the coefficient of $\delta_i$ with respect to r with the form as $a_i \otimes b_i^T$ where $\otimes$ is the Kronecker product.

Let us define $$H = (I+K)B \quad \text{EQ. (14)}$$

where H is a N×9 matrix. Without being bound by the specific theoretical basis for the calculation, we have the following lemma.

Lemma 1 the Rank of H is Smaller than 9 for Data without Noise.

Proof: Equation (13) is a homogeneous linear system. r with 9 elements is a non-trivial solution of (13). Thus H should be singular, otherwise this homogeneous system only has zero (or trivial) solution. This contradicts to the fact that r is the solution of (13).

Theorem 1 the Rank of A in (11) is Smaller than 9 for Data without Noise.

Proof: Using the CGR representation in (10), r in (13) and $\vartheta$ in (11) can be related by $$r = \frac{M\vartheta}{1+s^T s}, \quad \text{EQ. (15)}$$

$$M = \begin{bmatrix} 1 & -1 & -1 & 0 & 0 & 0 & 0 & 0 & 0 & 1 \\ 0 & 0 & 0 & 2 & 0 & 0 & 0 & 0 & -2 & 0 \\ 0 & 0 & 0 & 0 & 2 & 0 & 0 & 2 & 0 & 0 \\ 0 & 0 & 0 & 2 & 0 & 0 & 0 & 0 & 2 & 0 \\ -1 & 1 & -1 & 0 & 0 & 0 & 0 & 0 & 0 & 1 \\ 0 & 0 & 0 & 0 & 2 & -2 & 0 & 0 & 0 & 0 \\ 0 & 0 & 0 & 0 & 2 & 0 & 0 & -2 & 0 & 0 \\ 0 & 0 & 0 & 0 & 2 & 2 & 0 & 0 & 0 & 0 \\ -1 & -1 & 1 & 0 & 0 & 0 & 0 & 0 & 0 & 1 \end{bmatrix}$$

where

Substituting (15) into (13) and eliminating the non-zero denominator $1+s^T S$, we have A (I+K)BM Using the definition of H in (14), we can rewrite A=HM. According to the algebraic theory, we have rank(A)≤min(rank(H), rank(M)). As rank (H)<9, we have rank (A)<9.

According to some embodiments, rank approximation may be used to denoise. The matrix A may be rank deficient. In some embodiments, generally, for $$\frac{M}{2} = 3, 4, 5$$

and >5, the rank of matrix A may be 3, 5, 7 and 8, respectively. When the data are with noise, matrix A can be polluted and the rank may become full. The polluted matrix can be represented as $\hat{A}=A+\zeta$. In some embodiments, reducing the effect of the noise, may include using a matrix $\tilde{A}$ with the rank that the coefficient matrix A should be to replace Â. For example, this may be achieved using Q or SVD, and/or the like. For example, if the SVD of Â is Â=USB and the rank is k, then Ã=UŠB, where Š is the first k singular value of S. This step can reduce the impact of the noise. To simplify the notation, A will still be used to represent this matrix.

According to some embodiments, using partial linearization method to obtain an equation system in Act 1320 of method 1300 may include using partial linearization method to convert the PnPL problem into an Essential Minimal Formulation (EMF) and generating an equation system. In some embodiments the partial linearization method may include splitting $\theta$ into two parts, where a first part $\theta$ may include 3 monomials, and a remaining part $\theta_7$ may have 7 monomials, such that they may be written as $\theta_3=[s_1^2, s_2^2, s_3^2]^T$ and $\theta_7=[s_1s_2, s_1s_3, s_2s_3, s_1, s_2, s_3, 1]^T$. Partial linearization may also include, according to some embodiments, dividing matrix A in (11) into $A_3$ and $A_7$ based on the division of $\theta$, accordingly and rewriting (11) as $$A_3\theta_3 = -A_7\theta_7 \quad (16)$$

and the three elements in $\theta_3$ may be treated as individual unknowns, and the remaining monomials in $\theta_7$ may be treated as knowns. Then, we can have a close-form solution for $\theta_3$ with respect to $\theta_7$ as $$\theta_3 = -(A_3^T A_3)^{-1} A_3^T A_7 \theta_7 \quad \text{EQ. (17)}$$

$(A_3^T A_3)^{-1} A_3^T A_7$ is a 3×7 matrix. Let $C_7$ be defined as $C_7 = -(A_3^T A_3)^{-1} A_3^T A_7$. As described herein, the rank of A is at least 3 for any feasible number of correspondences N≥3. Therefore, the above algorithm can be used for any number of correspondences.

Equation (17) may be rewritten as $$C\theta = 0, C = [I_3, C_7]. \quad \text{EQ. (18)}$$

It includes 3 second-order polynomial equations with the 3 unknowns in s. Each of the equation has the form as $$f_i \propto c_{i1}s_1^2 + c_{i2}s_2^2 + c_{i3}s_3^2 + c_{i4}s_1s_2 + c_{i5}s_1s_3 + c_{i6}s_2s_3 + c_{i7}s_1 + c_{i8}s_2 + c_{i9}s_3 + c_{i10} = 0, \; i=1,2,3 \quad \text{EQ. (19)}$$

According to some embodiments, solving the equation system to obtain the rotation matrix (Act 1330) may include obtaining the rotation matrix by solving the equation system where equations are of form (19). According to some embodiments, obtaining t using the rotation matrix and the closed form of t (Act 1340) may include obtaining t from (8) after solving for s.

Example Results

FIGS. 14-17 are diagrams of experimental results of embodiments of the method of efficient localization compared to other known PnPL solvers. FIGS. 14A-14D show mean and median rotation and translation errors of different PnPL solvers, including OPnPL and evxpnpl, described in "Accurate and linear time pose estimation from points and lines: European Conference on Computer Vision", Alexander Vakhitov, Jan Funke, and Francesc Moreno Noguer, Springer, 2016 and "CvxPnPL: A unified convex solution to the absolute pose estimation problem from point and line correspondences" by Agostinho, Sérgio, João Gomes, and Alessio Del Bue, 2019 respectively, and are both hereby incorporated by reference herein in its entirety.

FIG. 14 A shows median rotation errors of different PnPL algorithms in degrees. FIG. 14 B shows median translation errors of different PnPL algorithms in percentages. FIG. 14 C shows mean rotation errors of different PnPL algorithms in degrees. FIG. 14 D shows mean translation errors of different PnPL algorithms in percentages. In FIGS. 14 A-D, the pnpl curves 40100A-D show the error in rotation and translation using the method described herein, according to some embodiments. The OPnPL curves 40200A-D and the cvxpnpl curves 40300A-D show error in percentage and degrees that is consistently higher than those of pnpl curve 40100.

FIG. 15A is a diagram of computational time of different PnPL algorithms. FIG. 15 B is a diagram of computational time of different PnPL algorithms. The computational time of solving a PnPL problem using a method described herein in represented by 50100A-B and the OPnPL curves 50200A-B and the cvxpnpl curves 50300A-B show consistently higher computational times than a method including embodiments of an algorithm described herein.

Figure 16B:
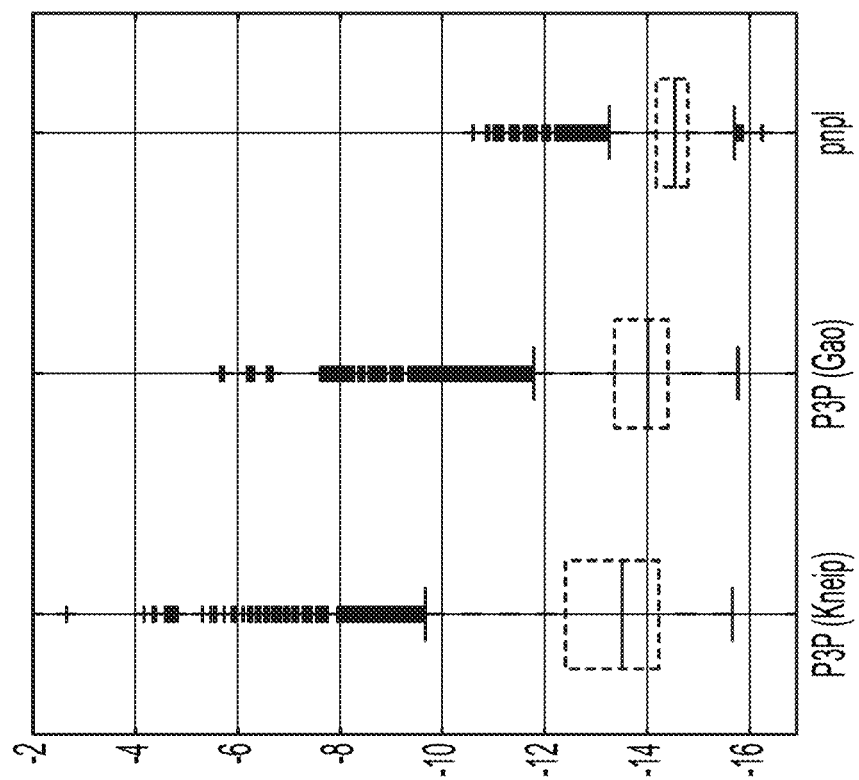
FIG. 16B shows a box plot of a PnPL solution, according to some embodiments described herein, for a PnP problem compared to a P3P and UPnP solution.
Figure 16A:
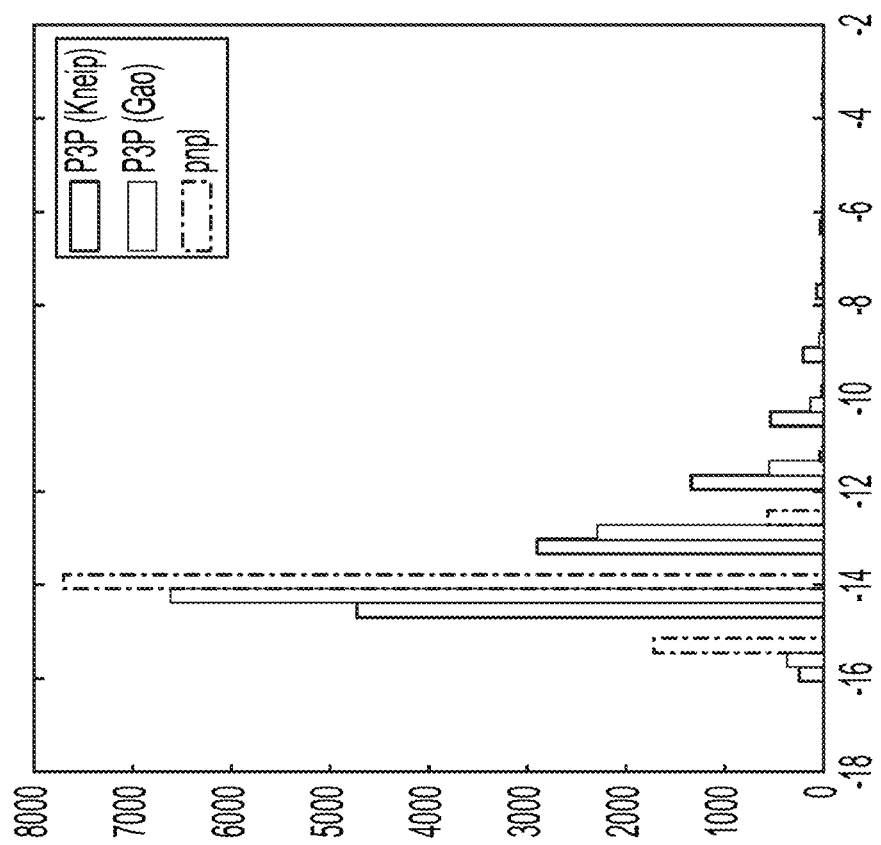
FIG. 16A shows the number of instances of errors of a certain range versus the log error of a PnPL solution, according to some embodiments described herein, for a PnP problem compared to a P3P and UPnP solution.

FIG. 16A shows the number of instances of errors of a certain range versus the log error of a PnPL solution, according to some embodiments described herein, for a PnP problem compared to a P3P and UPnP solution, according to some embodiments.

FIG. 16B shows a box plot of a PnPL solution, according to some embodiments described herein, for a PnP problem compared to a P3P and UPnP solution.

Figure 16D:
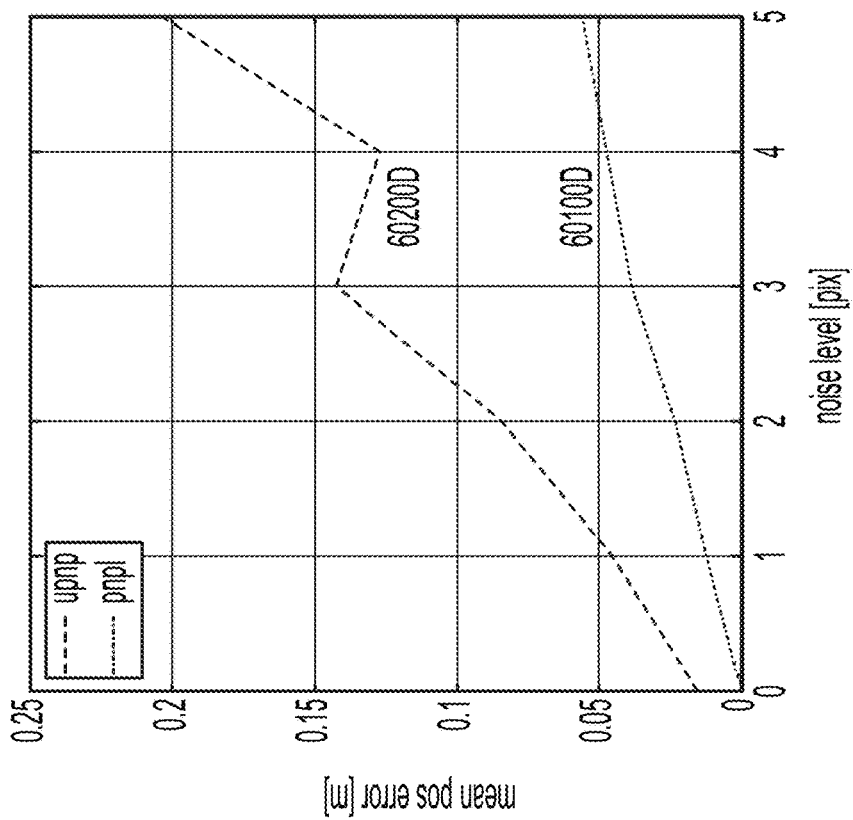
FIG. 16D shows the mean positional error in meters of a PnPL solution, according to some embodiments described herein, for a PnP problem compared to a P3P and UPnP solution.
Figure 16C:
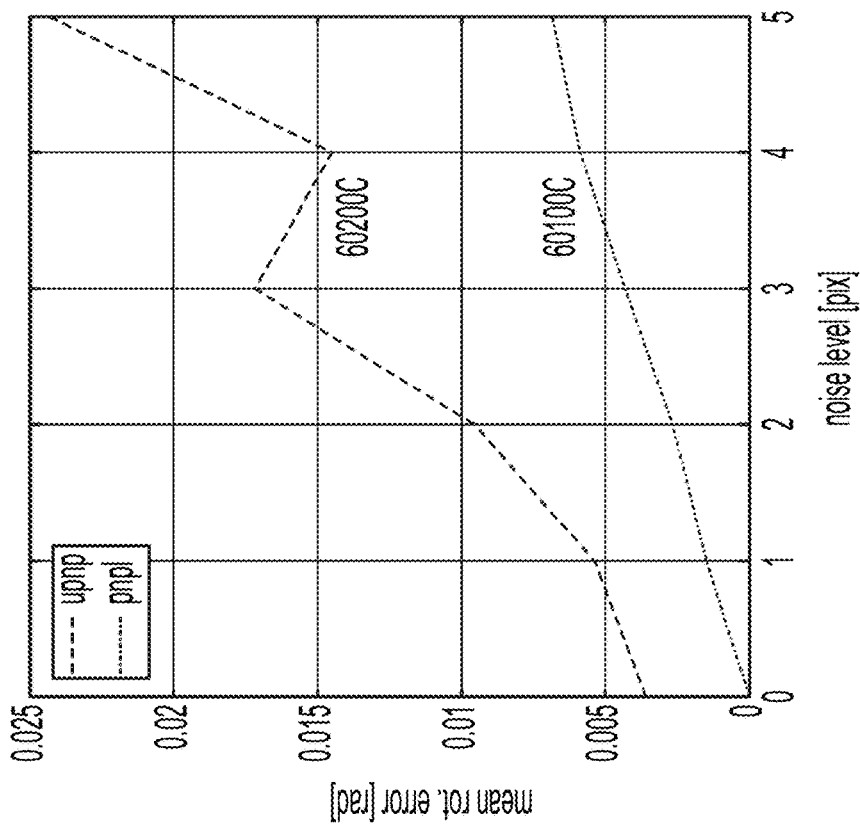
FIG. 16C shows the mean rotational error in radians of a PnPL solution, according to some embodiments described herein, for a PnP problem compared to a P3P and UPnP solution.
Figure 17A:
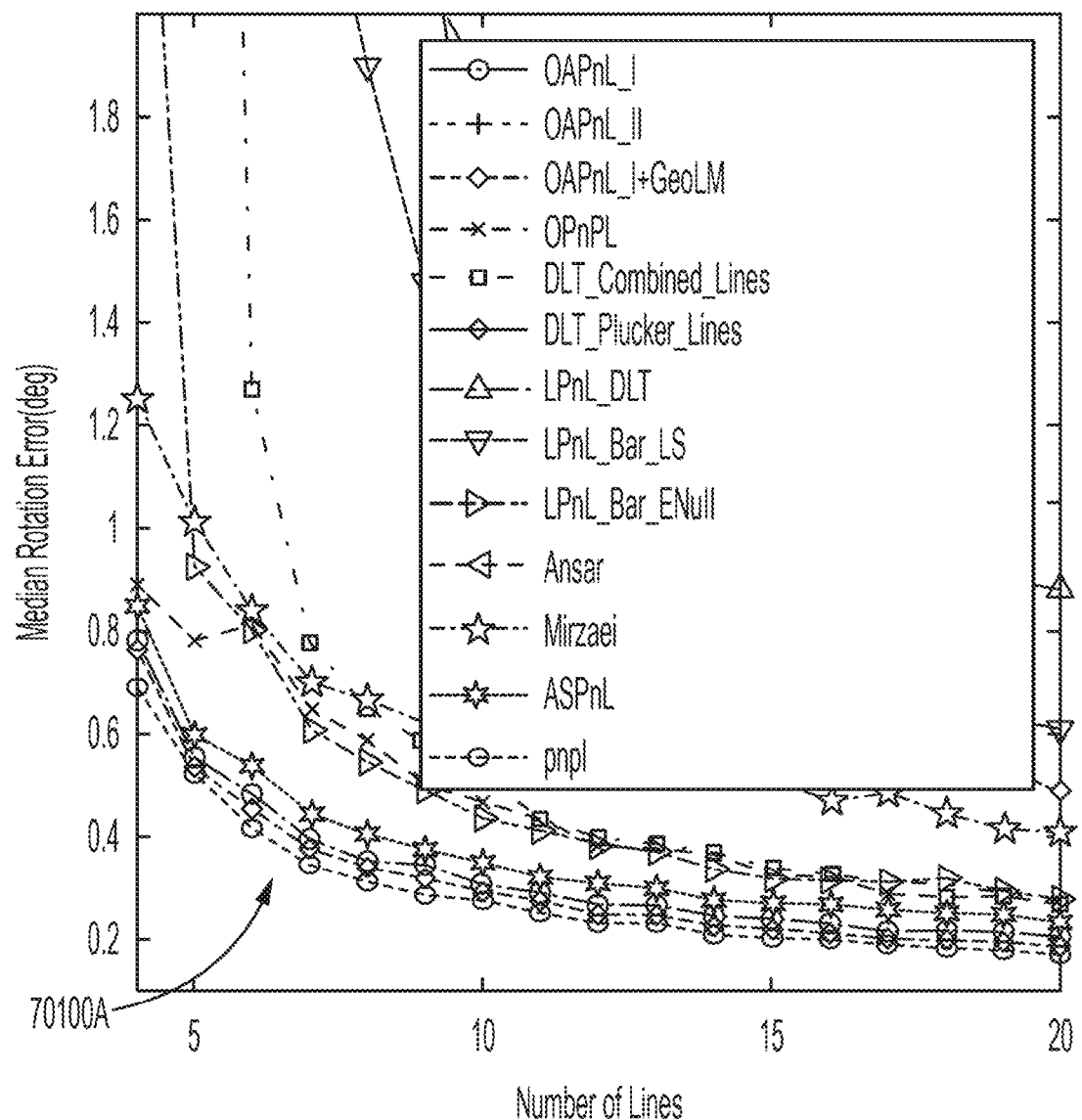
FIG. 17A shows median rotation errors of different PnL algorithms, according to some embodiments.
Figure 17B:
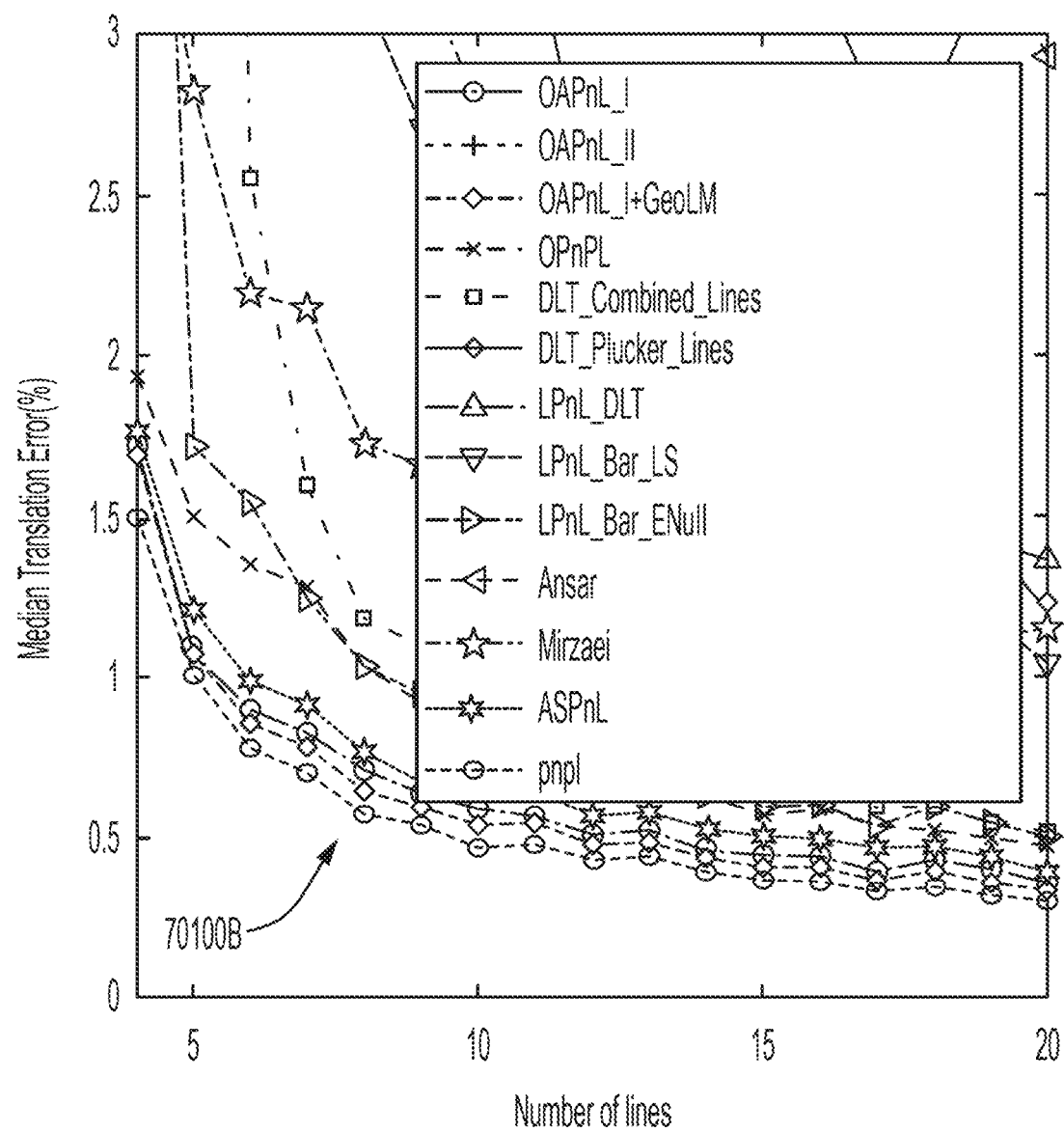
FIG. 17B shows median translation errors of different PnL algorithms, according to some embodiments.
Figure 17C:
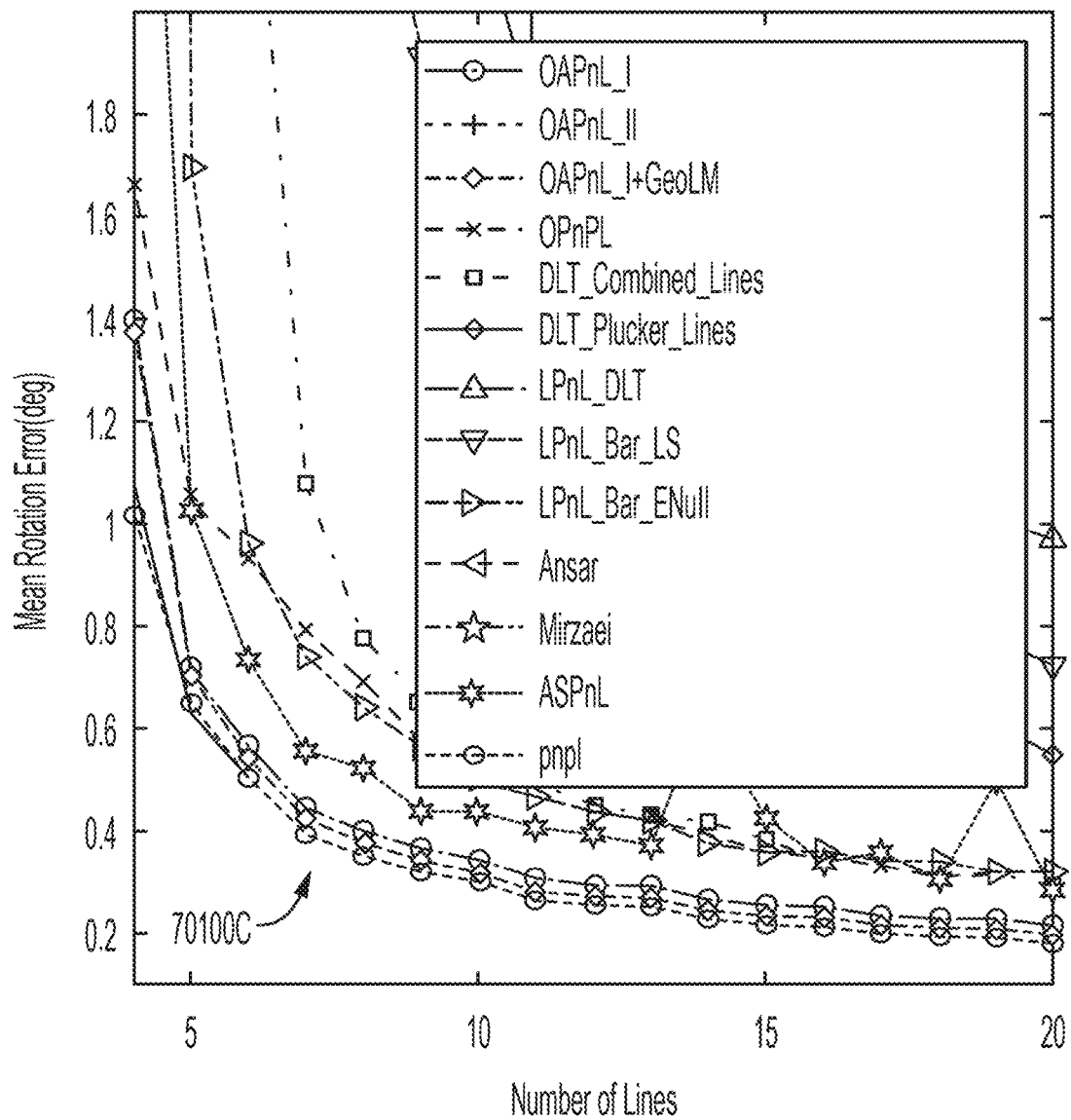
FIG. 17C shows mean rotation errors of different PnL algorithms, according to some embodiments.
Figure 17D:
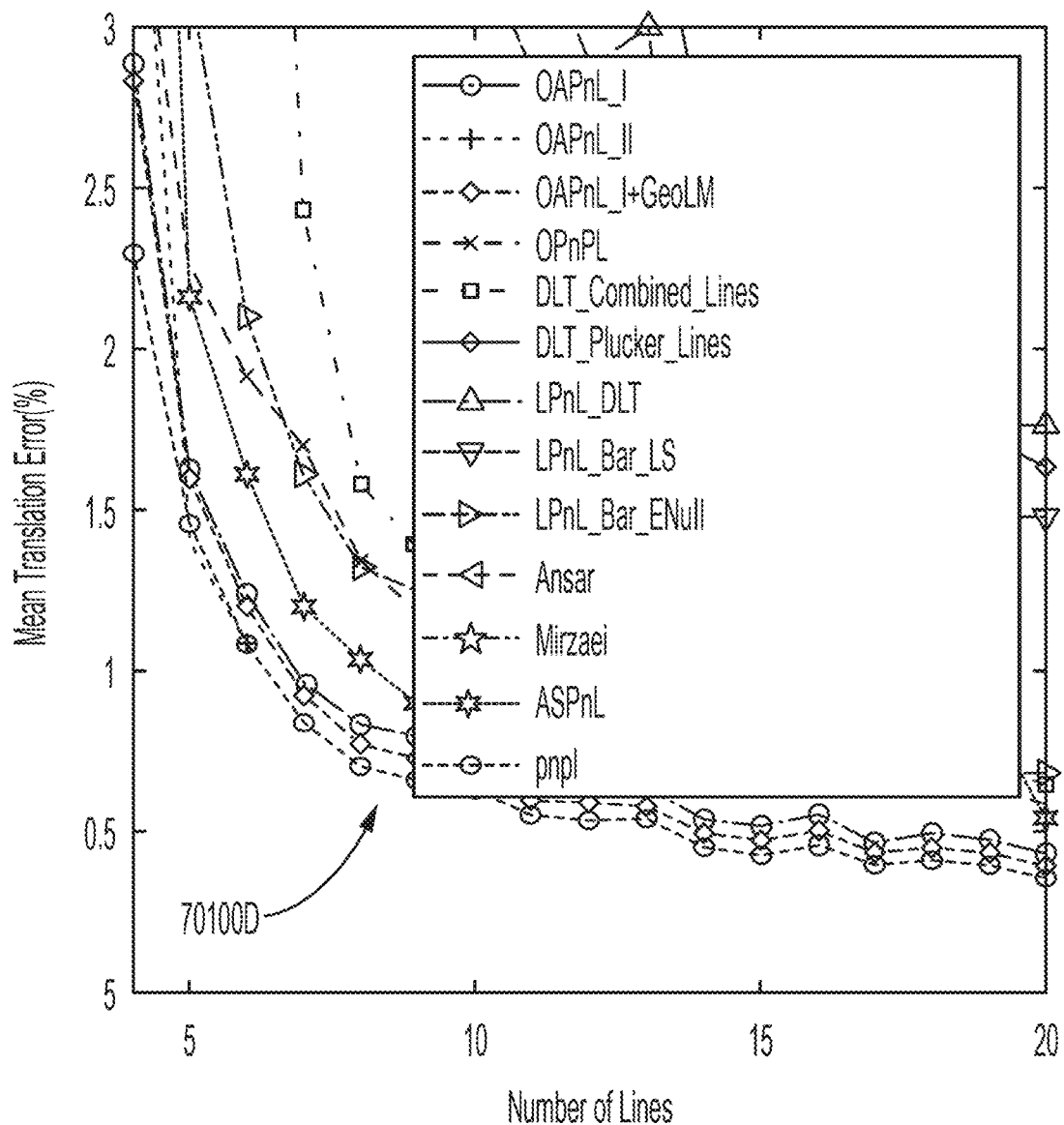
FIG. 17D shows mean translation errors of different PnL algorithms, according to some embodiments.

FIG. 16C shows the mean rotational error in radians of a PnPL solution, according to some embodiments described herein, for a PnP problem compared to a P3P and UPnP solution. The PnPL solution, according to some embodiment described herein, for a PnP problem has error 60100C, which can be seen to be less than the error for the UPnP solution 60200C.

FIG. 16D shows the mean positional error in meters of a PnPL solution, according to some embodiments described herein, for a PnP problem compared to a P3P and UPnP solution. The PnPL solution, according to some embodiment described herein, for a PnP problem has error 60100D, which can be seen to be less than the error for the UPnP solution 60200D.

FIGS. 17A-D shows mean and median rotation and translation errors of different PnL algorithms including OAPnL, DLT, LPnL, Ansar, Mirzaei, OPnPL, and ASPnL. OAPnL is described in "A Robust and Efficient Algorithm for the PnL problem Using Algebraic Distance to Approximate the Reprojection Distance," by Zhou, Lipu, et al., 2019, and is hereby incorporated by reference herein in its entirety. DLT is described in "Absolute pose estimation from line correspondences using direct linear transformation. Computer Vision and Image Understanding" by Pibyl, B., Zemk, P., and Adk, M., 2017, and is hereby incorporated by reference herein in its entirety. LPnL is described in "Pose estimation from line correspondences: A complete analysis and a series of solutions" by Xu, C., Zhang, L., Cheng, L., and Koch, R., 2017, and is hereby incorporated by reference herein in its entirety. Ansar is described in "Linear pose estimation from points or lines" by Ansar, A., and Daniilidis, K., 2003 and is hereby incorporated by reference herein in its entirety. Mirzaei is described in "Globally optimal pose estimation from line correspondences" by Mirzaei, F. M., and Roumeliotis, S. I., 2011, and is hereby incorporated by reference herein in its entirety. As described herein, OPnPL is addressed in "Accurate and linear time pose estimation from points and lines: European Conference on Computer Vision". As described herein, aspects of ASPnL are described in "Pose estimation from line correspondences: A complete analysis and a series of solutions".

FIG. 17 A shows median rotation errors of the different PnL algorithms in degrees. FIG. 17 B shows median translation errors of the different PnL algorithms in percentages. FIG. 17 C shows mean rotation errors of the different PnL algorithms in degrees. FIG. 17 D shows mean translation errors of the different PnL algorithms in percentages. Curve 70100A-D shows the median and mean rotation and translation error of a PnPL solution using the method described herein.

Pose Estimation Using Feature Lines

Figure 18:
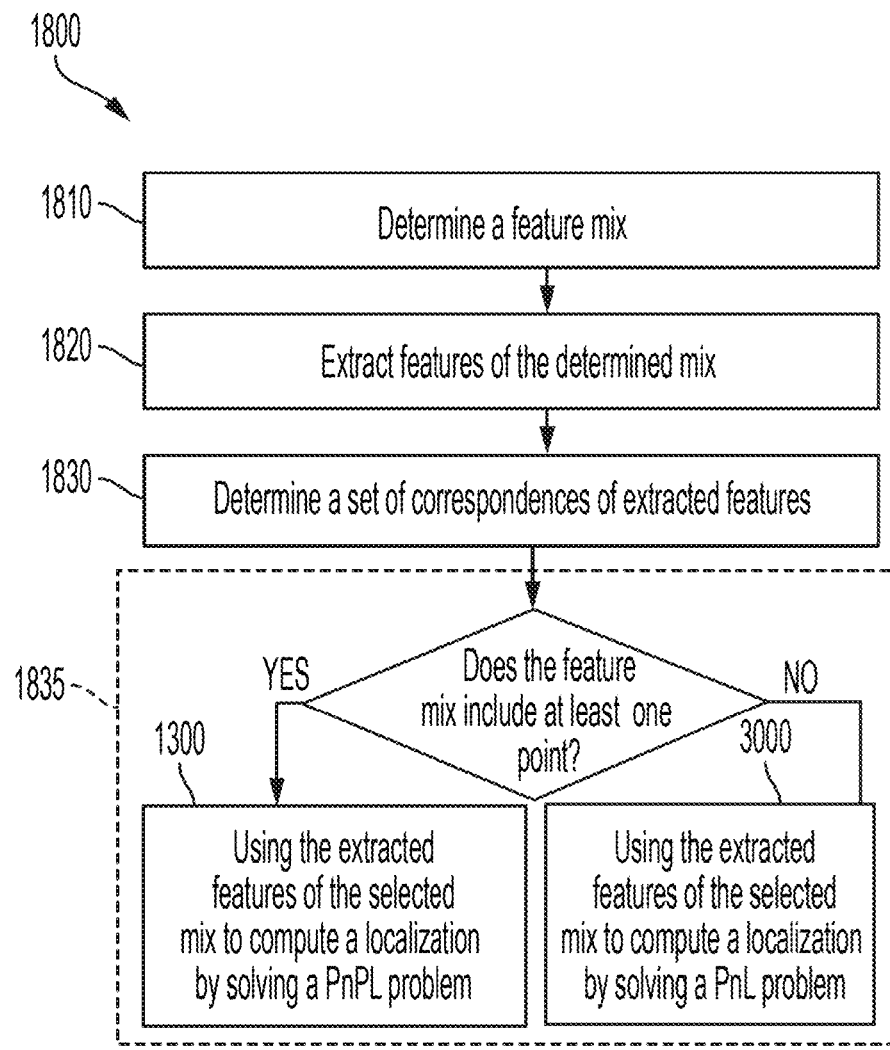
FIG. 18 is a flowchart of an alternative embodiment of an exemplary process for localization in a system configured to compute a pose using features with a mix of feature types.

In some embodiments, instead of, or in addition to a universal approach an efficient process may be applied to compute a pose when only lines are selected as features. FIG. 18 illustrates a method 1800 that may be an alternative to method 1000 in FIG. 10. As in method 1000, method 1800 may begin with determining a feature mix and extracting features with that mix at blocks 1810 and 1820. In processing at block 1810, the feature mix may include only lines. For example, only lines may be selected in an environment as illustrated in FIG. 11.

Similarly, at block 1830, correspondences may be determined as described above. From these correspondences, a pose may be computed at subprocess 1835. In this example, processing may branch dependent on whether the features include at least one point. If so, pose may be estimated with a technique that may solve for pose based on a set of features including at least one point. The universal algorithm as described above, may be applied, at box 1830.

Conversely, if the set of features includes only lines, processing may be performed by an algorithm that delivers accurate and efficient results in that case. In this example, processing branches to block 3000. Block 3000 may solve the Perspective-n-Line (PnL) problem, as described below. As lines are often present, and may serve as readily recognizable features, in environments in which pose estimation may be desired, providing a solution specifically for a feature set using only lines may provide an efficiency or accuracy advantage for devices operating in such environments.

According to some embodiments, any or all of the steps of the method 1800 may be performed on devices described herein, and/or on remote services such as those described herein.

As described herein, a special case of the PnPL problem includes the Perspective-n-Line (PnL) problem wherein the pose of a camera can be estimated from a number of 2D/3D line correspondences. The PnL problem can be described as the line counterpart of the PnP problem such as is described in "A direct least-squares (dls) method for pnp" by Hesch, J. A., Roumeliotis, S. I., International Conference on Computer Vision, "Upnp: An optimal o (n) solution to the absolute pose problem with universal applicability. In: European Conference on Computer Vision." by Kneip, L., Li, H., Seo, Y., "Revisiting the pnp problem: A fast, general and optimal solution" In: Proceedings of the IEEE by Kuang, Y., Sugimoto, S., Astrom, K., Okutomi, M. and are all hereby incorporated by reference herein in its entirety.

The PnL problem is a fundamental problem in computer vision and robotics with many applications, including Simultaneous Localization and Mapping (SLAM), Structure from Motion (SfM) and Augmented Reality (AR). Generally, the camera pose can be determined from a number of N 2D-3D line correspondences, where N>3. In the case that the number N of line correspondences is 3, the problem may be called the minimal problem, also known as the P3L problem. In the case that the number N of correspondences is larger than 3, the problem may be known as a least-squares problem. The minimal problem (e.g. where N=3) and the least-squares problem (e.g. where N>3) are generally solved in different ways. Both solutions to the minimal and least-squares problems play important roles in various robotics and computer vision tasks. Due to their importance, many efforts have been made to solve both problems.

Conventional methods and algorithms that have been proposed for the PnL problem generally solve the minimal problem (P3L problem) and least-squares problem using different algorithms. For example, in conventional systems, the minimal problem is formulated as an equation system, while the least-squares problem is formulated as a minimization problem. Other least-squares solutions that may in theory handle the minimal case by upgrading a minimal problem to a least-squares problem result in an inefficient minimal solution and are impractical for use in real-time applications, as the minimal solution is required to run many times in the RANSAC framework (e.g. as described in "Random sample consensus: a paradigm for model fitting with applications to image analysis and automated cartography" by Fischler, M. A., Bolles, R. C., hereby incorporated in its entirety).

Other conventional systems that address the least squares problem as a minimal solution also are inefficient for use in real-time applications. While the solution to the minimal problem generally leads to an eighth order polynomial equation, described as General Minimal Formulation (GMF) herein, the least-squares solution requires solving more complicated equation systems.

By addressing the least squares as a minimal solution, the conventional systems are inefficient in solving the minimal solution by addressing the minimal solution with the more complicated equation system required of the least squares solution. For example, Mirzaei's algorithm (e.g. as described in 'Optimal estimation of vanishing points in a Manhattan world. In: 2011 International Conference on Computer Vision' by Mirzaei, F. M., Roumeliotis, S. I., which is hereby incorporated by reference in its entirety) requires finding the root of three fifth-order polynomial equations and the algorithm described in "A robust and efficient algorithm for the pnl problem using algebraic distance to approximate the reprojection distance" results in 27th-order univariate polynomial equations as described in "Pose estimation from line correspondences: A complete analysis and a series of solutions. IEEE transactions on pattern analysis and machine intelligence," which is hereby incorporated by reference herein in its entirety and 'Camera pose estimation from lines: a fast, robust and general method. Machine Vision and Applications 30(4), 603{614 (2019)' by Wang, P., Xu, G., Cheng, Y., Yu, Q., which is hereby incorporated by reference herein in its entirety, proposed a subset-based solution which needs to solve a fifteenth-order univariate polynomial equation.

As described herein, the minimum (P3L) problem generally requires solving an eighth-order univariate equation and thus has at most 8 solutions, except for in the case of some specific geometric configurations (e.g. as described in "Pose estimation from line correspondences: A complete analysis and a series of solutions. IEEE transactions on pattern analysis and machine intelligence" by Xu, C., Zhang, L., Cheng, L., Koch, R.). One widely adopted strategy for the minimum (P3L) problem is to simplify the problem by some geometrical transformations (e.g. such as described in "Determination of the attitude of 3d objects from a single perspective view. IEEE transactions on pattern analysis and machine intelligence", "Pose determination from line-to-plane correspondences: existence condition and closed-form solutions. IEEE Transactions on Pattern Analysis & Machine Intelligence" Chen, H. H., "Pose estimation from line correspondences: A complete analysis and a series of solutions. IEEE transactions on pattern analysis and machine intelligence", "Camera pose estimation from lines: a fast, robust and general method. Machine Vision and Applications 30" by Wang, P., Xu, G., Cheng, Y., Yu, Q.).

Specifically, aspects of the cited references discuss some specific intermediate coordinate systems to reduce the number of unknowns which results in a univariate equation. The problem of these methods is that the transformation may involve some numerically unstable operations for certain configurations, such as the denominator of the division in equation (4) of "Pose estimation from line correspondences: A complete analysis and a series of solutions. IEEE transactions on pattern analysis and machine intelligence" by Xu, C., Zhang, L., Cheng, L., Koch, R. which may be a tiny value. In aspects of "A stable algebraic camera pose estimation for minimal configurations of 2d/3d point and line correspondences. In: Asian Conference on Computer Vision" by Zhou, L., Ye, J., Kaess, M., the quaternion is used to parameterize the rotation, and introduced an algebraic solution for the P3L problem. Some works focused on specific configurations of the P3L problem, such as three lines forming a Z-shape (e.g. as described in "A new method for pose estimation from line correspondences. Acta Automatica Sinica" 2008, by Li-Juan, Q., Feng, Z., which is hereby incorporated by reference in its entirety) or the planar three line junction problem (e.g. as described in 'The planar three-line junction perspective problem with application to the recognition of polygonal patterns. Pattern recognition 26(11), 1603{1618 (1993)' by Caglioti, V., which is hereby incorporated by reference in its entirety) or the P3L problem with known a vertical direction (e.g. as described in 'Camera pose estimation based on pnl with a known vertical direction. IEEE Robotics and Automation Letters 4(4), 3852{3859 (2019)' by Lecrosnier, L., Boutteau, R., Vasseur, P., Savatier, X., Fraundorfer, F., which is hereby incorporated by reference in its entirety).

Early works on solutions to the least-squares PnL problem mainly focused on error function formulation and the iterative solution. Liu et al. ('Determination of camera location from 2-d to 3-d line and point correspondences. IEEE Transactions on pattern analysis and machine intelligence 12(1), 28{37 (1990)' by Liu, Y., Huang, T. S., Faugeras, O. D., hereby incorporated by reference in its entirety) studied the constraints from 2D-3D point and line correspondences and decoupled the estimation of rotation and translation. Kumar and Hanson ('Robust methods for estimating pose and a sensitivity analysis. CVGIP: Image understanding 60(3), 3131342 (1994)' by Kumar, R., Hanson, A. R., hereby incorporated by reference in its entirety) proposed to jointly optimize rotation and translation in the iterative method. They presented a sampling-based method to get an initial estimation. Latter works (e.g. as described in 'Pose estimation using point and line correspondences. Real-Time Imaging 5(3), 215{230 (1999)' by Dornaika, F., Garcia, C. and Iterative pose computation from line correspondences (1999), which are both hereby incorporate by reference in their entirety) proposed to start the iteration from a pose estimated by a weak perspective or paraperspective camera model. The accuracy of the iterative algorithm depends on the quality of the initial solution and the parameters of the iterative algorithm. There is no guarantee that the iterative method will converge. As most 3D vision problems, linear formulation plays an important role (e.g. as described in 'Multiple view geometry in computer vision. Cambridge university press (2003)' by Hartley, R., Zisserman, A., which is hereby incorporated by reference in its entirety). Direct Linear Transformation (DLT) provides a straightforward way to compute the pose (e.g. as described in 'Multiple view geometry in computer vision. Cambridge university press (2003)' by Hartley, R., Zisserman, A.). This method requires at least 6 line correspondences. Pribyl et al. (e.g. as described in 'Camera pose estimation from lines using pln ucker coordinates. arXiv preprint arXiv:1608.02824 (2016)' by Pribyl, B., Zemcik, P., Cadik, M. introduced a new DLT method based on the plucker coordinates of the 3D line, which needs at least 9 lines. In their later work (e.g. as described in 'Absolute pose estimation from line correspondences using direct linear transformation. Computer Vision and Image Understanding 161, 130{144 (2017)' by Pribyl, B., Zemcik, P., Cadik, M.)], they combined the two DLT method, which shows improved performance and reduces the minimum number of line correspondences to 5. By exploring the similarity between the constraints derived from the PnP and the PnL problem, the EPnP algorithm is extended to solve the PnL problem (e.g. as described in 'Accurate and linear time pose estimation from points and lines. In: European Conference on Computer Vision. pp. 583{599. Springer (2016)' and, "Pose estimation from line correspondences: A complete analysis and a series of solutions. IEEE transactions on pattern analysis and machine intelligence" by Xu, C., Zhang, L., Cheng, L., Koch, R.). The EPnP-based PnL algorithm is applicable for N=4, but is not stable when N is small and needs specific treatment for the planar PnL problem (i.e., all lines are on a plane). Linear formulation ignores the constraints of the unknowns. This results in less accurate result and narrows down its applicability. To solve the above problem, methods based on polynomial formulation were proposed. Ansar et al. ('Linear pose estimation from points or lines. IEEE Transactions on Pattern Analysis and Machine Intelligence 25(5), 578{589 (2003)' by Ansar, A., Daniilidis, K.) adopted a quadratic system to represent the constraints and presented a linearization approach to solve this system. Their algorithm is applicable to N≥4, but it is too slow when N is large. Motivated by the RPnP algorithm, subset-based PnL approaches were proposed in "Pose estimation from line correspondences: A complete analysis and a series of solutions. IEEE transactions on pattern analysis and machine intelligence" by Xu, C., Zhang, L., Cheng, L., Koch, R. and "Camera pose estimation from lines: a fast, robust and general method. Machine Vision and Applications 30". They divide the N line correspondences into N−2 triplets, and each triplet is a P3L problem. Then they minimize the sum of squared polynomials derived from each P3L problem. The subset-based PnL approach will become time-consuming when N is large, as shown in "A robust and efficient algorithm for the pnl problem using algebraic distance to approximate the reprojection distance", which is hereby incorporated by reference in its entirety. Using the Grobner basis technique (e.g. as described in 'Using algebraic geometry, vol. 185. Springer Science & Business Media (2006)' by Cox, D. A., Little, J., O'shea, D., which is hereby incorporated by reference in its entirety), it is able to directly solve a polynomial system. This results in a series of direct minimization methods. In the literature, CGR (e.g. as described in 'Optimal estimation of vanishing points in a manhattan world. In: 2011 International Conference on Computer Vision. pp. 2454{2461. IEEE (2011)' by Mirzaei, F. M., Roumeliotis, S. I. and 'Globally optimal pose estimation from line correspondences. In: 2011 IEEE International Conference on Robotics and Automation. pp. 5581{5588. IEEE (2011)' by Mirzaei, F. M., Roumeliotis, S. I., which are hereby incorporated by reference in its entirety) and quaternions (e.g. as described in 'Accurate and linear time pose estimation from points and lines. In: European Conference on Computer Vision. pp. 583{599. Springer (2016)' by Vakhitov, A., Funke, J., Moreno-Noguer, F., which is hereby incorporated by reference in its entirety) were adopted to parameterize the rotation, which results in a polynomial cost function. Then Grobner basis technique is used to solve the first optimality conditions of the cost function. As the Grobner basis technique may encounter numerical problems (e.g. as described in 'Using algebraic geometry, vol. 185. Springer Science & Business Media (2006)' by Cox, D. A., Little, J., O'shea, D. and 'Fast and stable polynomial equation solving and its application to computer vision. International Journal of Computer Vision 84(3), 237{256 (2009)' by Byrod, M., Josephson, K., Astrom, K., which are hereby incorporated by reference in its entirety), as described in "A robust and efficient algorithm for the pnl problem using algebraic distance to approximate the reprojection distance" Zhou et al. introduced a hidden variable polynomial solver. Although they showed improved accuracy, it is still significantly slower than most of the algorithms based on linear formulation. The PnL problem has some extensions for certain applications. Some applications are with multiple cameras. Lee (e.g. as described in 'A minimal solution for non-perspective pose estimation from line correspondences. In: European Conference on Computer Vision. pp. 170{185. Springer (2016)' by Lee, G. H., which is hereby incorporated by reference in its entirety) proposed a closed-form P3L solution for a multi-camera system. Recently, Hichem (e.g. as described in 'A direct least-squares solution to multi-view absolute and relative pose from 2d-3d perspective line pairs. In: Proceedings of the IEEE International Conference on Computer Vision Workshops (2019)' by Abdellali, H., Frohlich, R., Kato, Z., which is hereby incorporated by reference in its entirety) proposed a direct Least-Squares solution for the PnL problem of a multi-camera system. In some applications, the vertical direction is known from a certain sensor (eg. IMU). This can be used as a prior for the pose estimation (e.g. as described in 'Camera pose estimation based on pnl with a known vertical direction. IEEE Robotics and Automation Letters 4(4), 3852{3859 (2019)' and 'Absolute and relative pose estimation of a multi-view camera system using 2d-3d line pairs and vertical direction. In: 2018 Digital Image Computing: Techniques and Applications (DICTA). pp. 118. IEEE (2018)' by Abdellali, H., Kato, Zm which is hereby incorporated by reference in its entirety). As a PnL solution for a single camera can be extended to a multi-camera system (e.g. as described in 'A direct least-squares solution to multi-view absolute and relative pose from 2d-3d perspective line pairs. In: Proceedings of the IEEE International Conference on Computer Vision Workshops (2019)'), this paper focuses on the PnL problem for a single camera.

A desirable PnL solution is that it is accurate and efficient for any possible inputs. As mentioned above, algorithms based on linear formulation are generally unstable or infeasible for a small N and need specific treatment or even do not work for the planar case. On the other hand, algorithms based on polynomial formulation could achieve better accuracy and are applicable to broader PnL inputs but are more computationally demanding. Moreover, there lacks a unified solution for the minimal and least-squares problems. Therefore, there heretofore existed a significant room for improvement over the state-of-the-art PnL solutions, such as is provided by the techniques herein.

According to some embodiments, a method of localization may include a complete, accurate and efficient solution for the Perspective-n-Line (PnL) problem. In some embodiments, a least-squares problem may be transformed into a General Minimal Formulation (GMF), which can have the same form as the minimal problem, by a novel hidden variable method. In some embodiments, the Gram-Schmidt process may be used to avoid the singular case in the transformation.

Figure 30:
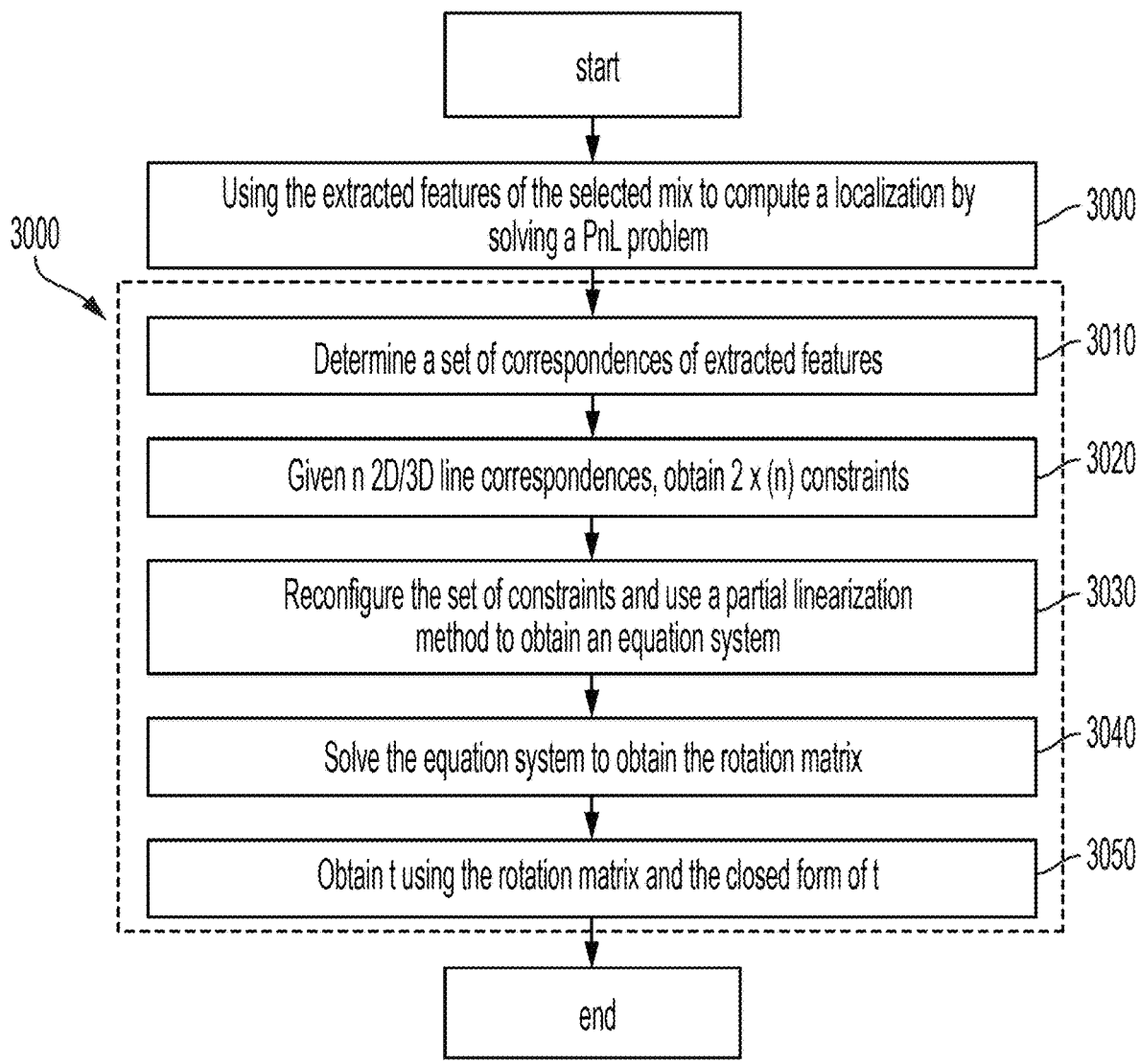
FIG. 30 is a flow chart illustrating a method 3000 of efficient localization, according to some embodiments.

FIG. 30 is a flow chart illustrating a method 3000 of efficient localization, according to some embodiments. The method may start with determining a set of correspondences of extracted features (Act 3010), given a number n of 2D/3D point correspondences and m 2D/3D line correspondences, obtaining 2N constraints (Act 3020). The method 3000 may include reconfiguring (Act 3030) the set of constraints and using partial linearization method to obtain an equation system. The method further includes solving an equation system to obtain the rotation matrix (Act 3040) and obtaining t using the rotation matrix and the closed form of t (Act 3050).

According to some embodiments, any or all of the steps of the method 3000 may be performed on devices described herein, and/or on remote services such as those described herein.

According to some embodiments, the 2N constraints of Act 3020 of method 3000 may include 2 constraints which may be written in the form $l_i(RP_{ij}+t)=0$, j=1, 2 for each of the N line correspondence $l_i \leftrightarrow L_i$. For example, this is described further in conjunction with FIG. 19.

Figure 19:
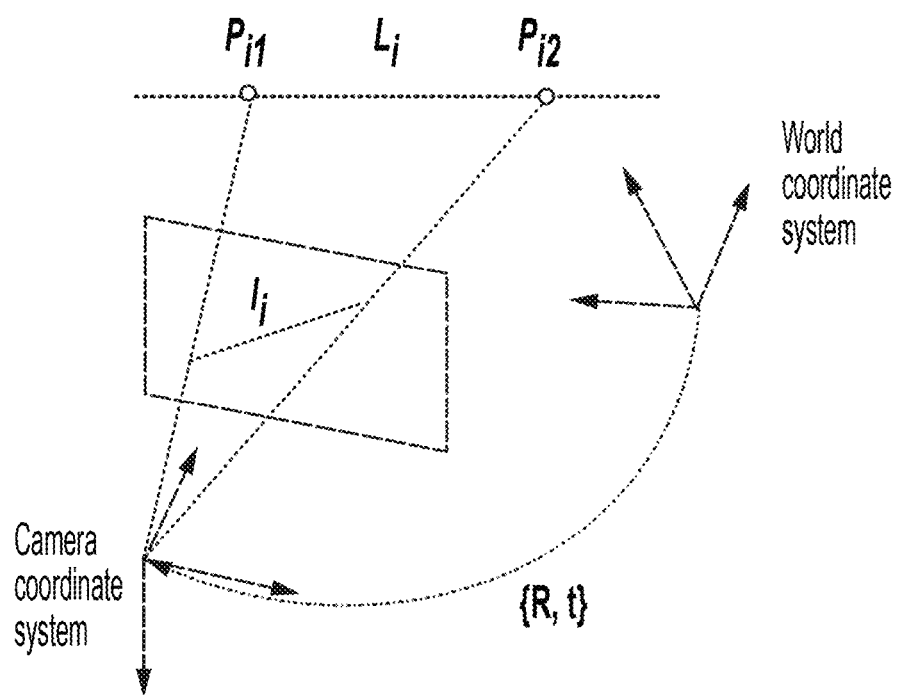
FIG. 19 is a schematic of constraints from li↔Li, according to some embodiments.

FIG. 19 is an exemplary schematic of constraints from li↔Li, according to some embodiments. The PnL problem may include estimating the camera pose including rotation R and translation t from a number N≥3 of 2D-3D line correspondences $\{l_i \leftrightarrow L_i\}_{i=1}^M$. The projection from $P_{ij}$ to the camera can be written as $p_{ij}=K(RP_{ij}+t)$ where $p_{ij}$ is of the homogeneous coordinate. $l_i$ may be defined as a three-dimensional vector, e.g. in the form $l_i=[a_i; b_i; c_i]^T$, where $a_i^2+b_i^2=1$. $p_{ij}$ should be on the 2D line $l_i$. Thus, we have $l_i^T K(RP_{ij}+t)=(K^T l_i)^T(RP_{ij}+t)=0$. As K is known, $K^T l_i$ may be computed first. The notation may be simplified by using $l_i$ to represent $K^T l_i$. By doing so, the two constraints for the $i^{th}$ correspondence can be written as: $l_i(RP_{ij}+t)=0$, j=1, 2. As described herein, the PnL problem may include estimating the camera pose including rotation R and translation t. According to some embodiments, the rotation R and translation t may have a total of 6 degrees of freedom. As discussed herein, each line correspondence $l_i \leftrightarrow L_i$ may yield 2 constraints which may be written as $$l_i(RP_{ij}+t)=0, j=1,2. \quad\quad\quad EQ. (1')$$

There may be 6 degrees of freedom in total for a rotation R and translation t. As each line correspondence $l_i \leftrightarrow L_i$ yields 2 constraints as shown in (1'), at least 3 correspondences are required to determine the pose. N=3 is the minimal case for the PnL problem, and it is called the P3L problem in the literature. Except for some specific configurations (e.g. as described in "Pose estimation from line correspondences: A complete analysis and a series of solutions. IEEE transactions on pattern analysis and machine intelligence"), there are at most 8 solutions for this problem. The rotation estimation is crucial for the P3L problem. Basically, it can be reduced to an eighth-order equation in a that is one of the 3 unknowns of R as (e.g. as described in "A stable algebraic camera pose estimation for minimal configurations of 2d/3d point and line correspondences. In: Asian Conference on Computer Vision", "Pose estimation from line correspondences: A complete analysis and a series of solutions. IEEE transactions on pattern analysis and machine intelligence", and "Pose determination from line-to-plane correspondences: existence condition and closed-form solutions. IEEE Transactions on Pattern Analysis & Machine Intelligence").

$$a_8\sigma^8+a_7\sigma^7+a_6\sigma^6+a_5\sigma^5+a_4\sigma^4+a_3\sigma^3+a_2\sigma^2+a_1\sigma+\sigma_0=0 \quad \text{EQ. (2')}$$

Where equation (2') is the General Minimal Formulation (GMF) for the P3L problem. A least-squares PnL problem can also be reduced into a GMF using methods described herein.

According to some embodiments, reconfiguring the set of constraints in Act 3020 of method 3000 may include generating a quadratic system using the constraints, a representation of R using Cayley-Gibbs-Rodriguez (CGR) parametrization, and the closed form of t. In some embodiments, the CGR may be used to represent R, for example as discussed in "A robust and efficient algorithm for the pnl problem using algebraic distance to approximate the reprojection distance". For example, a three-dimensional vector may be denoted as $s=[S_1, S_2, S_3]$. According to some embodiments, the representation of R using CGR parametrization may be in the form described by the following equations (3'). In (3'), $I_3$ may be the 3×3 identity matrix and $[s]_x$ is the skew matrix of three-dimensional vector s. In (3'), each element of $\overline{R}$ is a quadratic in three-dimensional vector s.

$$R = \frac{\overline{R}}{1+s^Ts}, \quad \text{EQ. (3')}$$

$$\overline{R} = \left((1-s^Ts)I_3 + 2[s]_x + 2ss^T\right) =$$

$$\begin{bmatrix} s_1^2 - s_2^2 - s_3^2 + 1 & 2s_1s_2 - 2s_3 & 2s_2 + 2s_1s_3 \\ 2s_3 + 2s_1s_2 & -s_1^2 + s_2^2 - s_3^2 + 1 & 2s_2s_3 - 2s_1 \\ 2s_1s_3 - 2s_2 & 2s_1 + 2s_2s_3 & -s_1^2 - s_2^2 + s_3^2 + 1 \end{bmatrix},$$

According to some embodiments, the closed-form of t of Act 3020 may be in the form of $\tau=-(B^TB)B^TAr$. In some embodiments the closed-form of t may be derived by first substituting (3') in (1'), multiplying a term $(1+S^TS)$ to both sides to yield $$l_i^T\overline{R}P_{ij}+(1+s^Ts)l_i^Tt=0 \quad \text{EQ. (4')}$$

Secondly, expanding the $l_i^T\overline{R}P_{ij}$ term in (4') to derive a polynomial in s and t as follows:

$$a_{ij}^Tr+(1+s^Ts)l_i^Tt=0, \quad \text{EQ. (5')}$$

$$r=[s_1^2,s_2^2,s_3^2,s_1s_2,s_1s_3,s_2s_3,s_1s_2,s_3,1]^T \quad \text{EQ. (5')}$$

Where $a_{ij}$ is a ten-dimensional vector and $(1+s^Ts)$ is a third order polynomial in s and t.

Equations (5') may be simplified by defining $$\tau=(1+s^Ts)t \quad \text{EQ. (6')}$$

to rewrite (5') as the following:

$$a_{ij}^Tr+l_i^T\tau=0, \quad \text{EQ. (7')}$$

Given N 2D-3D correspondences, we can have 2N equations as (7'). Stacking the 2N equations of (7') can give us:

$$Ar+B\tau=O_{2N+1} \quad \text{EQ. (8')}$$

Where $A=[a_{11}, a_{12}, \ldots a_{N1}, a_{N2}]^T$ and $B=[l_1, l_1, \ldots, l_N, l_N]^T$. We can treat (8') as a linear equation system in r to get a closed-form solution for $$\tau=-(B^TB)B^TAr. \quad \text{EQ. (9')}$$

According to some embodiments, a quadratic system of Act 3020 may be a quadratic system in $s_1$, $s_2$, and $s_3$ and may be in the following form:

$$Kr=O_{2N\times1}, K=A-B(B^TB)^{-1}B^TA \quad \text{EQ. (10')}$$

According to some embodiments, using partial linearization method to obtain an equation system in Act 3020 of method 3000 may include using partial linearization method to convert the PnL problem into a General Minimal Formulation (GMF) and generating an equation system.

In some embodiments the partial linearization method may include the steps of dividing the monomials in r defined in (5') into two groups $r_3=[s_1^2, s_2^2, s_3^2]^T$ and $r=[s_1s_2, s_1s_3, s_2s_3, s_2, s_3, 1]^T$ and dividing the matrix K in (10') into $K_3$ and $K_7$ accordingly and further rewriting (10') as:

$$K_3r_3\pm K_7r_7=O_{2N\times1} \quad \text{EQ. (11')}$$

(11') may then be rewritten as:

$$K_3r_3=-K_7r_7 \quad \text{EQ. (12')}$$

Where the elements of $r_3$ may be treated as individual unknowns. According to some embodiments, the method may require that the matrix $K_3$ for $r_3$ be full rank. According to some embodiments, a close-form solution for $r_3$ with respect to r, may be written as the following:

$$r_3=-(K_3^TK_3)^{-1}K_3^TK_7r_7 \quad \text{EQ. (13')}$$

Where $-(K_3^TK_3)^{-1}K_3^TK_7$ of equation (13') may represent a 3×7 matrix. According to some embodiments, when $K_9$ (K of (10')) is of full rank, $r_3$ may be chosen arbitrarily. According to some embodiments, the matrix $K_9$ (i.e. K of (10')) may be rank deficient for arbitrary numbers of 2D-3D line correspondences for data without noise. In some embodiments, when $K_9$ (i.e. K of (10')) is rank deficient, a certain input may make $K_3$ for a fixed choice of $r_3$ be or approximate rank deficient.

According to some embodiments, $K_3$ may be determined by the Gram-Schmidt process with column pivoting to select 3 independent columns from $K_q$ to generate $K_3$.

$$i = \underset{n}{\mathrm{argmax}}\|k_n\| \quad \text{EQ. (16')}$$

$$j = \underset{n\neq i}{\mathrm{argmax}}\|\bar{k}_n\|, \bar{k}_n = k_n - \frac{k_i \cdot k_n}{k_i \cdot k_i}k_i$$

$$k = \underset{n\neq i,j}{\mathrm{argmax}}\|\bar{k}_n\|, \bar{k}_n = \bar{k}_n - \frac{\bar{k}_i \cdot \bar{k}_n}{\bar{k}_i \cdot \bar{k}_i}\bar{k}_i$$

The equations (16') may be used, wherein the ith, jth, and kth column of K is selected is $K_3$, and the corresponding monomials may form $r_3$. The remaining columns may be selected to form $K_7$ and the corresponding monomials may form $r_7$. According to some embodiments, the equations (16') may be solved using other polynomial solvers.

The notation of (13') may be simplified to $C_7=(K_3^TK_3)^{-1}K_3^TK_7$ and (13') may be rewritten as follows:

$$C_r=O_{3\times1}, C=[I_3,C_7] \quad \text{EQ. (14')}$$

The above equation system includes 3 second-order equations in $s_1$, $s_2$, and $s_3$. Each of the 3 second-order equations may have the following form:

$$f_i \times c_{i1}s_1^2+c_{i2}s_2^2+C_{i3}s_3^2+c_{i4}s_1s_2+c_{i5}s_1s_3+c_{i6}s_2s_3+c_{i7}s_1+c_{i8}s_2+c_{i9}s_3+c_{10}=0, i=1,2,3 \quad \text{EQ. (15')}$$

According to some embodiments, solving the equation system to obtain the rotation matrix (Act 3030) may include obtaining the rotation matrix by solving the equation system where equations are of form (15'). According to some embodiments, the equation system may be solved using the Grobner basis approach. According to some embodiments, the equation system may be solved using methods and approaches described in Kukelova et al. (e.g. as described in "Efficient intersection of three quadrics and applications in computer vision. In: Proceedings of the IEEE Conference on Computer Vision and Pattern Recognition" by Kukelova, Z., Heller, J., Fitzgibbon, A., which is hereby incorporated by reference in its entirety) and may use approaches described by Zhou to improve the stability.

According to some embodiments, a hidden variable method may be used to solve the equation system (14'). In some embodiments, a customized hidden variable method may be used to solve the equation system. For example, customized hidden variable methods are described in "Using algebraic geometry, vol. 185. Springer Science & Business Media (2006)". In some embodiments, the customized hidden variable method may be implemented by treating one known in (15') as a constant. For example, $s_3$ may be treated as a constant while $s_1$ and $s_2$ are treated as unknowns such that equation system (15') may be written in the following manner:

$$f_i = c_{i1}s_1^2 + c_{i2}s_1s_2 + C_{i3}s_2^2 + p_{i1}(s_3)s_1 + p_{i2}(s_3)s_2 + p_{i3}(s_3) = 0,$$
$$i = 0, 1, 2,$$
EQ. (17')

Where $p_{i1}(s_3) = c_{i5}s_3 + c_{i7}$, $p_{i2}(s_3) = c_{i6}s_3 + c_{i8}$ and $p_{i3}(s_3) = c_{i3}s_2^2 + c_{i9}+s_3 + c_{i10}$. An auxiliary variable so may be used to make (15') a homogeneous quadratic equation such that all monomials in (15') have degree 2. This generates the following system:

$$F_i = c_{i1}s_1^2 + 1c_{i2}s_1b_2 + Ci_3s_2^2 + p_{i1}(s_3)s_0s_1 + p_{i2}(s_3)s_0s_2 + p_{i3}(s_3)s_0^2 = 0$$
EQ. (18')

$F_i = f_i$ when $s_0 = 1$ so the determinant J of the Jacobian matrix of $F_0$, $F_1$, and $F_2$ may be written as:

$$J = \det \begin{pmatrix} \frac{\partial F_0}{\partial s_0} & \frac{\partial F_0}{\partial s_1} & \frac{\partial F_0}{\partial s_2} \\ \frac{\partial F_1}{\partial s_0} & \frac{\partial F_1}{\partial s_1} & \frac{\partial F_1}{\partial s_2} \\ \frac{\partial F_2}{\partial s_0} & \frac{\partial F_2}{\partial s_1} & \frac{\partial F_2}{\partial s_2} \end{pmatrix}$$
EQ. (19')

J can be a third-order homogeneous equation in $s_0$, $s_1$, and $s_2$ whose coefficients are polynomials in $s_3$. The partial derivatives of J with respect to $s_0$, $s_1$, and $s_2$ may all be quadratic homogeneous equations in $s_0$, $s_1$, and $s_2$ with the same form as $F_i$, i.e.:

$$G_i = \frac{\partial J}{\partial s_i} = q_{i1}(s_3)c_{i1}s_1^2 + q_{i2}(s_3)c_{i2}s_1s_2 + q_{i3}(s_3)c_{i3}s_2^2 +$$
$$q_{i4}(s_3)s_0s_1 + q_{i5}(s_3)s_0s_2 + q_{i6}(s_3)s_0^2 = 0, i = 1, 2, 3$$
EQ. (20')

$q_{ij}(s_3)$ can be a polynomial in $s_3$. $G_0 = G_1 = G_2 = 0$ at all nontrivial solutions of $F_0 = F_1 = F_2 = 0$ (e.g. as is described in [10]). Therefore, they may be combined to form a new homogeneous system with respect to $s_0$, $s_1$, and $s_2$ as (21').

$$Q(s_3)u = Q_{6 \times 1},$$
EQ. (21')

$Q(s_3)$ may be a 6×6 matrix whose elements are polynomials in $s_3$ and $u = [s_1^2, s_1s_2, s_2^2, s_0s_1, s_0s_2, s_0^2]^T$. Based on linear algebraic theory the homogeneous linear system (21') may have a non-trivial solution if and only if $\det(Q(s_3)) = 0$, where $\det(Q(s_3)) = 0$ is an eighth order polynomial equation in $s_3$, which is of the same form as GMF. There may be at most 8 solutions.

According to some embodiments, after getting $s_3$, $s_3$ can be back substituted into (21') to derive a linear homogeneous equation system with respect to u. According to some embodiments, $s_1$ and $s_2$ may be computed through linear system (21') by back-substituting $s_3$ into (21') and setting $s_1 = 1$.

According to some embodiments, obtaining the rotation matrix (Act 3030) in method 3000 may comprise computing R with (3') once $s_1$, $s_2$, and $s_3$ are obtained. According to some embodiments, τ may be calculated by (6'). According to some embodiments, obtaining (Act 3030) t may include obtaining t using equation (9').

According to some embodiments, an iterative method may be used to refine the solution, for example as described in "A robust and efficient algorithm for the pnl problem using algebraic distance to approximate the reprojection distance", "Pose estimation from line correspondences: A complete analysis and a series of solutions. IEEE transactions on pattern analysis and machine intelligence", and "Camera pose estimation from lines: a fast, robust and general method. Machine Vision and Applications 30"). The solution may be refined by minimizing the cost function (e.g., as described in "A robust and efficient algorithm for the pnl problem using algebraic distance to approximate the reprojection distance"), which is a sixth-ordered polynomial in s and t. In some embodiments, the damped Newton step may be used to refine the solution (e.g. as described in "Revisiting the pnp problem: A fast, general and optimal solution. In: Proceedings of the IEEE International Conference on Computer Vision" by Zheng, Y., Kuang, Y., Sugimoto, S., Astrom, K., Okutomi, M. which is hereby incorporated by reference in its entirety, and "A robust and efficient algorithm for the pnl problem using algebraic distance to approximate the reprojection distance"). Specifically, for the kth step, we compute the Hessian $H_k$ and gradient $g_k$ of the cost function with respect to s and t. Then the solution is $[s_{k+1}, t_{k+1}] = [s_k, t_k] - (H_k + \lambda I_6)^{-1} g_k$. Here λ is adjusted in each step according to the Levenberg/Marquardt algorithm (e.g. as described in "The levenberg-marquardt algorithm: implementation and theory. In: Numerical analysis" by More, J. J., which is hereby incorporated by reference in its entirety) to make the cost reduce at every step. The solution with the minimal cost may be considered as the solution.

According to some embodiments, the PnL solution described herein is applicable to N≥32D/3D line correspondences. In some embodiments, the method of solving a PnL problem may include 4 steps. In some embodiments, the first step may include compressing the 2N constraints (4') into 3 equations (15'). In some embodiments, the equation system 3 equations (15') may be solved by the hidden variable method and recover rotation R and translation t. According to some embodiments, the PnL solution may further be refined by the damped Newton step. FIG. 31 shows an exemplary algorithm 3100 for solving the PnL problem, according to some embodiments.

The computational complexity of step 2 (Act 3120) and step 3 (Act 3130) of algorithm 3100 is O(1) as it is independent of the number of correspondences. The main computational cost of step 1 is to solve the linear least-squares problem (9') and (13'). The main computational cost of step 4 is to calculate the summation of squared distance functions. The computational complexity of these steps increases linearly with respect to N. In summary, the computational complexity of algorithm 3100 is O(N).

According to some embodiments, a component of the algorithm of the solution of the PnL problem described herein is referred to as MinPnL. FIGS. 24-27 show comparisons of the MinPnL algorithm, according to some embodiments, and previous P3L and least-squares PnL algorithms. The compared algorithms for solving the P3L and least-squares PnL algorithms include, for the P3L problem, three recent works AlgP3L (e.g. as described in "A stable algebraic camera pose estimation for minimal configurations of 2d/3d point and line correspondences. In: Asian Conference on Computer Vision"), RP3L (e.g. as described in "Pose estimation from line correspondences: A complete analysis and a series of solutions. IEEE transactions on pattern analysis and machine intelligence") and SRP3L (e.g. as described in 'A novel algebraic solution to the perspective-threeline pose problem. Computer Vision and Image Understanding p. 102711 (2018)' by Wang, P., Xu, G., Cheng, Y., which is hereby incorporated by reference in its entirety) and for the least-squares problem, OAPnL, SRPnL (e.g. as described in 'A novel algebraic solution to the perspective-threeline pose problem. Computer Vision and Image Understanding p. 102711 (2018)', ASPnL (e.g. as described in "Pose estimation from line correspondences: A complete analysis and a series of solutions. IEEE transactions on pattern analysis and machine intelligence"), Ansar (e.g. as described in 'Linear pose estimation from points or lines. IEEE Transactions on Pattern Analysis and Machine Intelligence 25(5), 578{589 (2003)'), Mirzaei (e.g. as described in 'Optimal estimation of vanishing points in a manhattan world. In: 2011 International Conference on Computer Vision"), LPnL DLT (e.g. as described in "Pose estimation from line correspondences: A complete analysis and a series of solutions. IEEE transactions on pattern analysis and machine intelligence"), DLT Combined Lines (e.g. as described in 'Camera pose estimation from lines using pln ucker coordinates. arXiv preprint arXiv:1608.02824 (2016)'), DLT Plucker Lines (e.g. as described in "Absolute pose estimation from line correspondences using direct linear transformation. Computer Vision and Image Understanding"), LPnL Bar LS (e.g. as described in "Pose estimation from line correspondences: A complete analysis and a series of solutions. IEEE transactions on pattern analysis and machine intelligence"), LPnL Bar ENull (e.g. as described in "Pose estimation from line correspondences: A complete analysis and a series of solutions. IEEE transactions on pattern analysis and machine intelligence"), cvxPnPL (e.g. as described in "'Cvxpnpl: A unified convex solution to the absolute pose estimation problem from point and line correspondences'"), OPnPL and EPnPL Planar (e.g. as described in "Accurate and linear time pose estimation from points and lines. In: European Conference on Computer Vision.").

In FIGS. 24-27, the following metrics (e.g. as described in previous works "Absolute pose estimation from line correspondences using direct linear transformation. Computer Vision and Image Understanding" and "A robust and efficient algorithm for the pnl problem using algebraic distance to approximate the reprojection distance") have been used to measure estimation errors. Specifically, assuming $R_{gt}$ and $t_{gt}$ are the ground truth rotation and translation, and $\hat{R}$, $\hat{t}$ the estimated ones, the rotation error may be calculated as the angle (degree) of the axis-angle representation of $R_{gt}^{-1}\hat{R}$ and the translation error A t as $$\|t_{gt}-\hat{t}\|_2/\|t_{gt}\|_2 \times 100\%$$

For FIGS. 24-26, synthetic data has been used to evaluate the performance of different algorithms. The polynomial solver for equation system (15') is first compared as well as the effect of the Gram-Schmidt process, then the MinPnL is compared with the state-of-the-art P3L and Least-squares PnL algorithms.

Synthetic data used for the purposes of the comparisons in FIGS. 24-26 have been generated similar to as described in "A robust and efficient algorithm for the pnl problem using algebraic distance to approximate the reprojection distance", "The planar three-line junction perspective problem with application to the recognition of polygonal patterns. Pattern recognition", "Pose estimation from line correspondences: A complete analysis and a series of solutions. IEEE transactions on pattern analysis and machine intelligence", and "Camera pose estimation from lines: a fast, robust and general method. Machine Vision and Applications 30," which are hereby incorporated by reference herein. Specifically, the camera resolution may be set to 640×480 pixels and the focal length to 800. Euler angles $\alpha$, B, $\lambda$, may be used to generate the rotation matrix. For each trial, the camera is randomly placed within a $[-10\,m;\,10\,m]^3$ cube and the Euler angles are uniformly sampled from $\alpha$, $\lambda \in [0°, 360°]$ and $\beta \in [0°, 180°]$. Then N 2D/3D line correspondences are randomly generated. The endpoints of the 2D lines are first randomly generated, then the 3D endpoints are generated by projecting the 2D endpoints into 3D space. The depths of the 3D endpoints are within [4 m; 10 m]. Then these 3D endpoints are transformed to the world frame.

Histograms and boxplots may be used to compare the estimation errors. The histogram is used to present the major distribution of the errors while the boxplot may be used to better show the large errors. In the boxplot, the central mark of each box indicates the median, and the bottom and top edges indicate the 25th and 75th percentiles, respectively. The whiskers extend to +/−2.7 standard deviation, and errors out of this range are plotted individually using the "+" symbol. The numeric stability of the hidden variable (HV) polynomial solver is compared with the Grobner, E3Q3, and RE3Q3 algorithms (e.g. as described in "A robust and efficient algorithm for the pnl problem using algebraic distance to approximate the reprojection distance") using 10,000 trials.

Figure 20B:
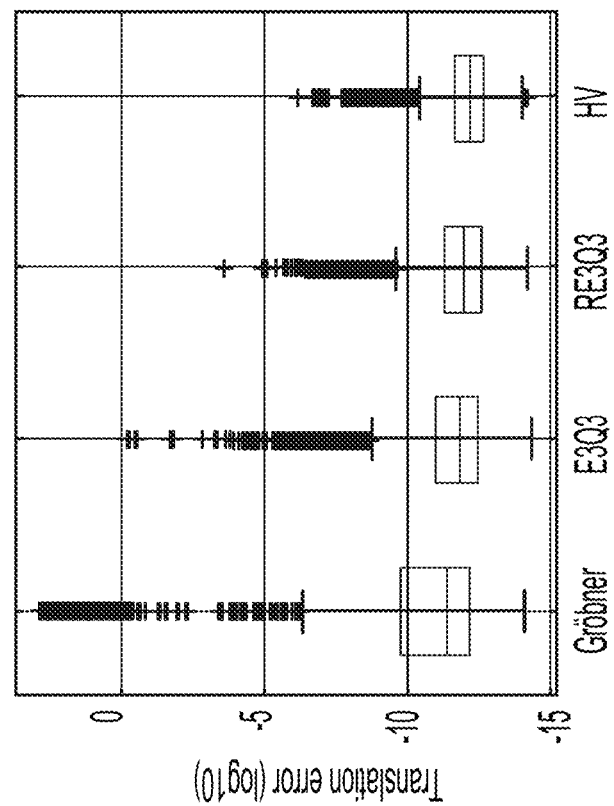
FIG. 20B is a boxplot figure showing translation error of hidden variable (HV) polynomial solver compared to other solvers, according to some embodiments.
Figure 20A:
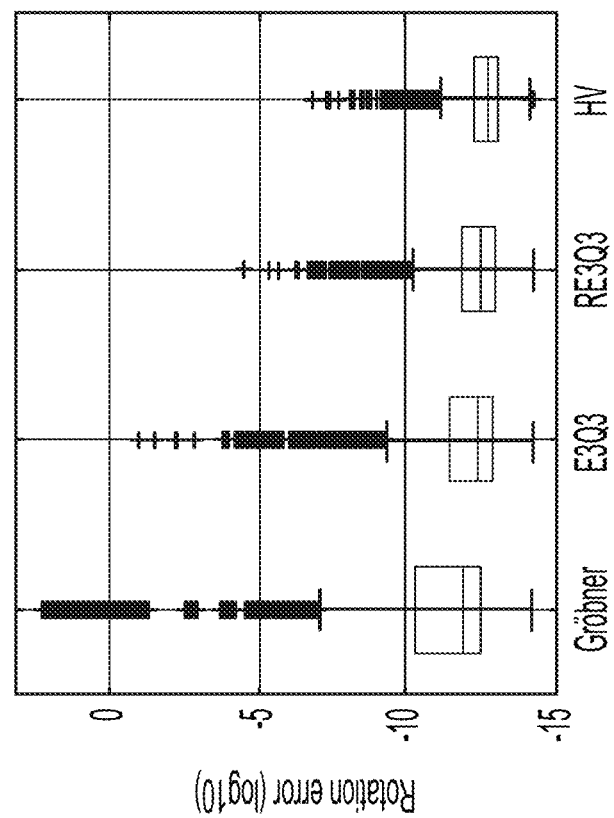
FIG. 20A is a boxplot figure showing rotation error of hidden variable (HV) polynomial solver compared to other solvers, according to some embodiments.
Figure 21A:
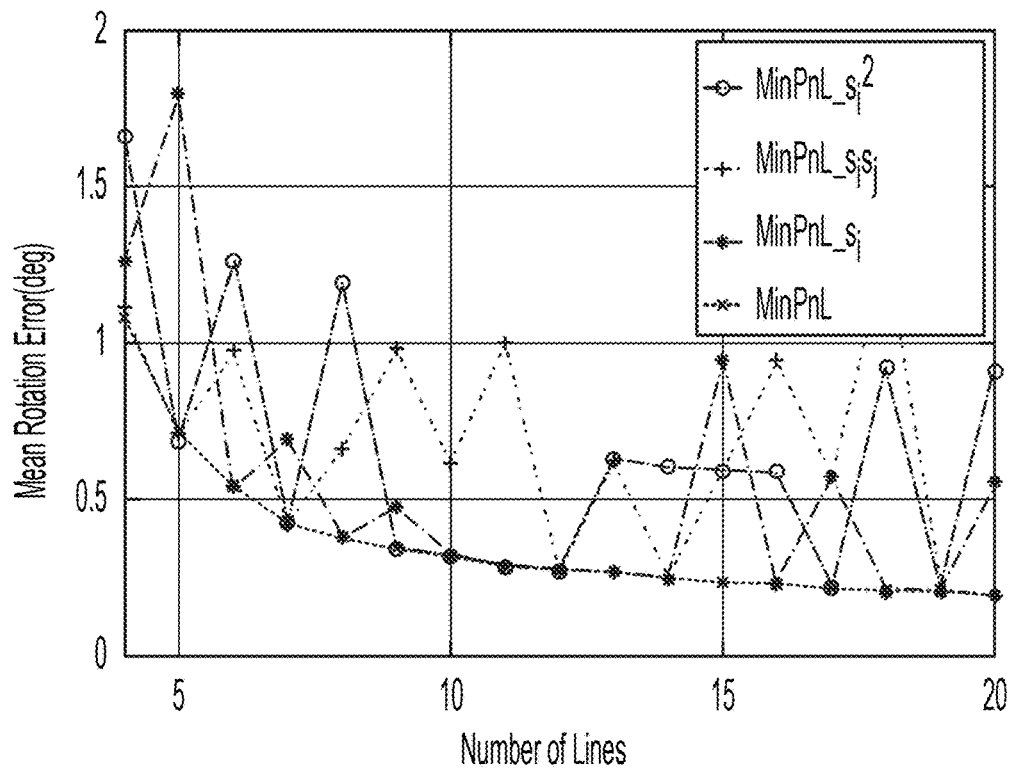
FIG. 21A is a figure showing rotation error compared to other solvers, according to some embodiments.
Figure 21B:
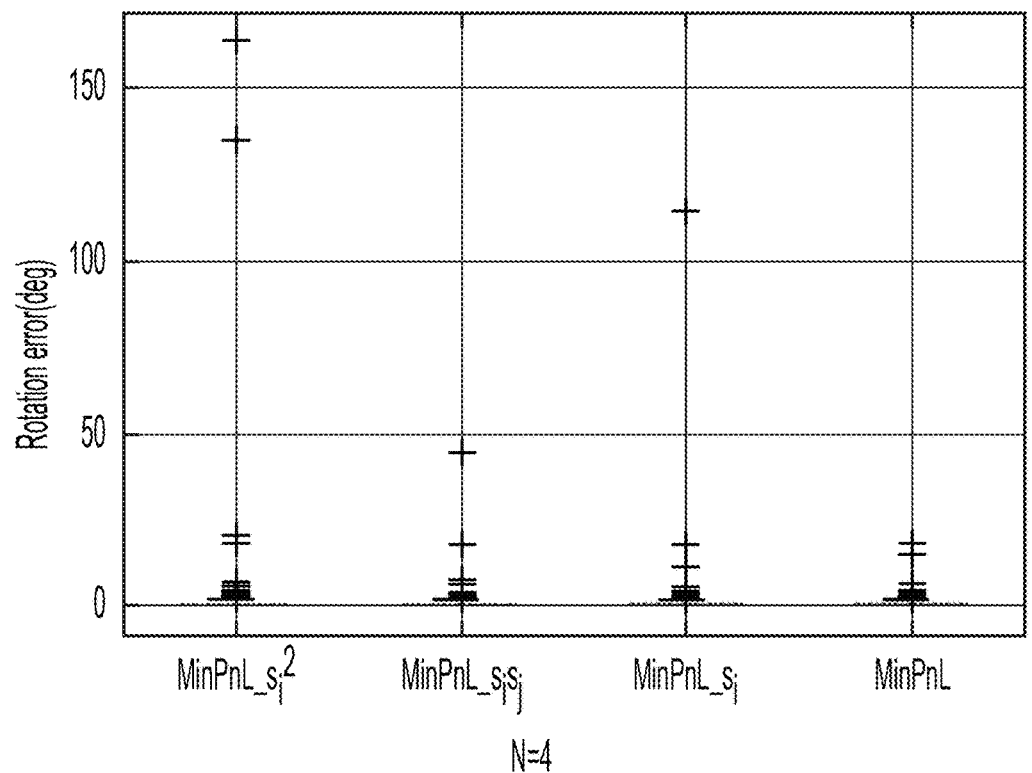
FIG. 21B is a figure showing translation error compared to other solvers, according to some embodiments.

FIGS. 20 A-B show the results. It is clear that the hidden variable solver is more stable than other algorithms. The algorithms described in "Efficient solvers for minimal problems by syzygy-based reduction. In: Proceedings of the IEEE Conference on Computer Vision and Pattern Recognition", "Upnp: An optimal o(n) solution to the absolute pose problem with universal applicability. In: European Conference on Computer Vision" and "A robust and efficient algorithm for the pnl problem using algebraic distance to approximate the reprojection distance" generate large errors. As the Grobner method, E3Q3 and RE3Q3 all involve computing the inverse of a matrix, they may encounter numerical problems, which may result in these large errors.

One critical step of the methods described herein, is to reorganize Kr=0 (10') as $K_3 r_3 = -K_7 r_7$ (13'). There are 84 choices for $r_3$. Different choices may have different impact on the numerical stability. Considering 3 choices of $r_3$, i.e. $[S_1^2, S_2^2, s_3^2]$, $[s_1 s_2, s_1 s_3, s_2 s_3]$ and $[s_1, s_2, s_3]$, named as $MinPn\_s_i^2$, $MinPnL\_s_i s_j$ and $MinPnL\_s_i$, respectively. For this comparison, the number of correspondences N has been increased from 4 to 20 and the standard deviation of the noise has been set to 2 pixels. For each N, 1,000 trails have been conducted to test the performance.

Figure 23B:
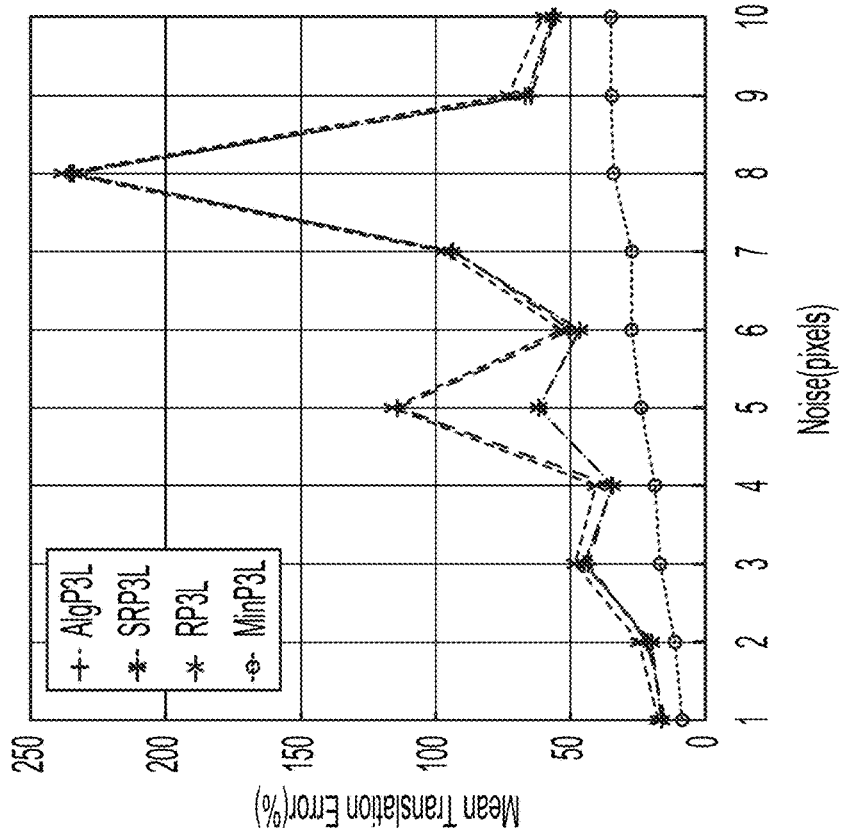
FIG. 23B shows a comparison of mean translational error in degrees between different P3L algorithms, according to some embodiments.
Figure 23A:
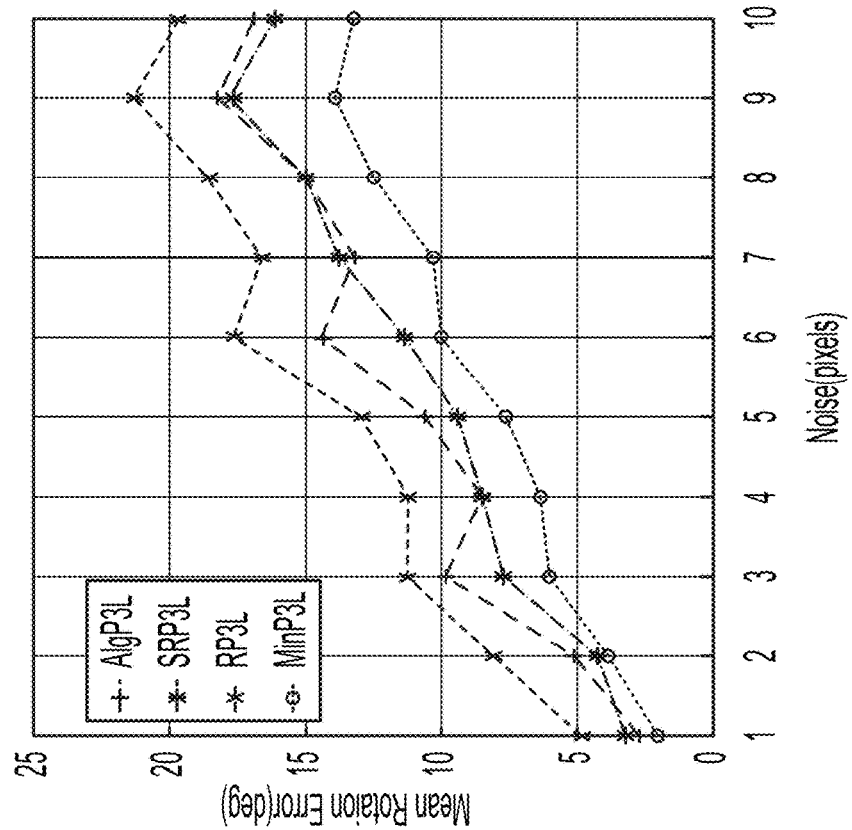
FIG. 23A shows a comparison of mean rotational error in degrees between different P3L algorithms, according to some embodiments.
Figure 24A:
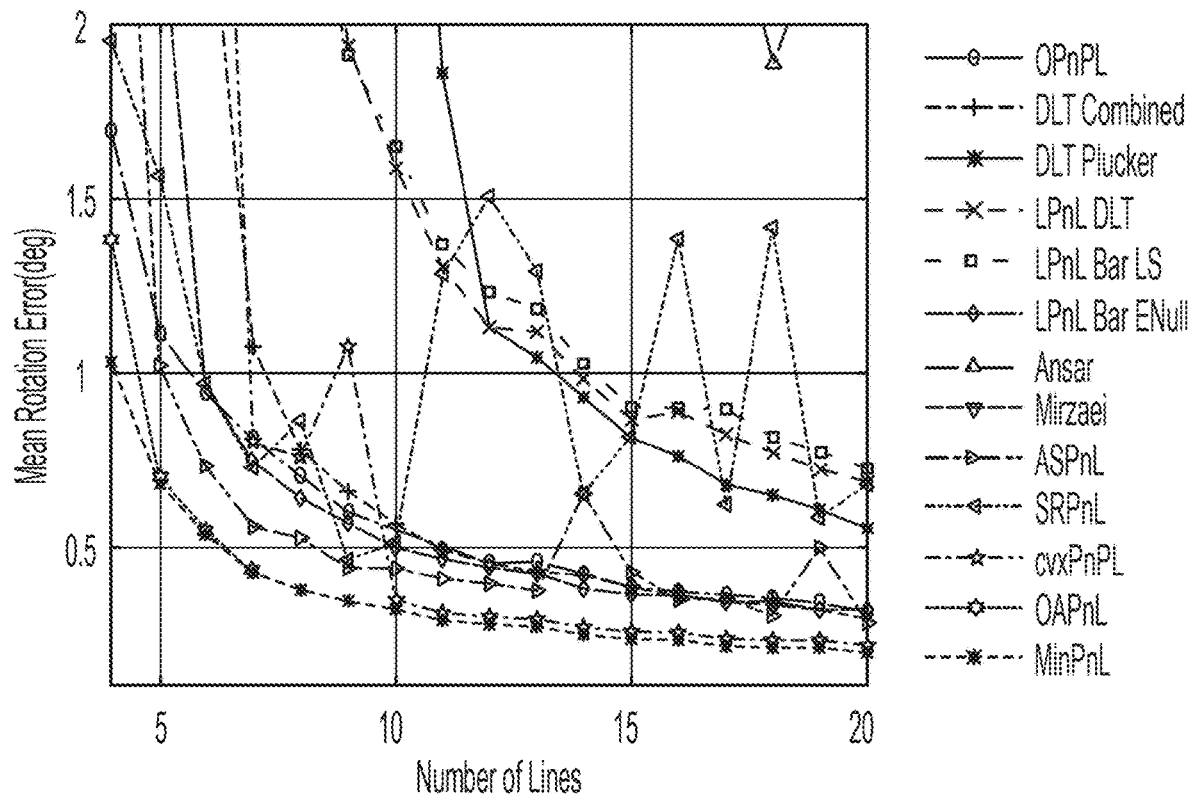
FIG. 24A is a plot showing mean rotation errors of different PnL algorithms, according to some embodiments.
Figure 24B:
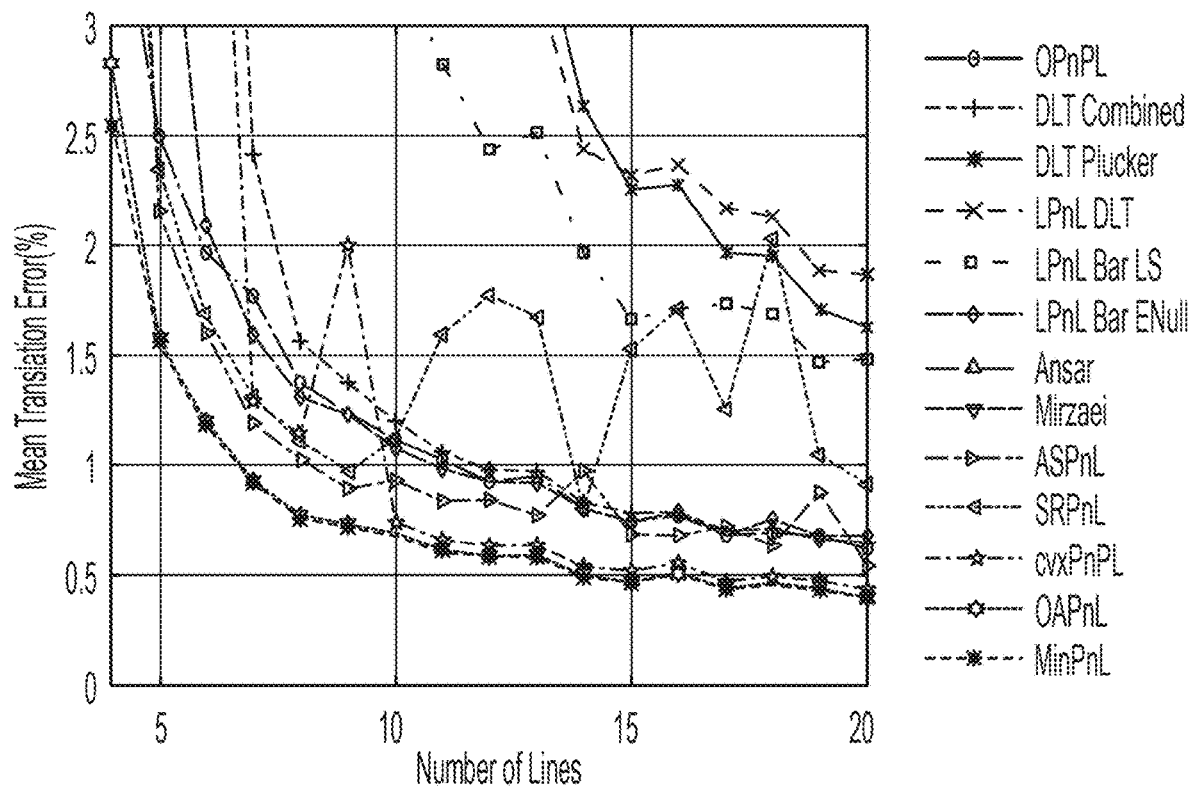
FIG. 24B is a plot showing mean translation errors of different PnL algorithms, according to some embodiments.
Figure 24C:
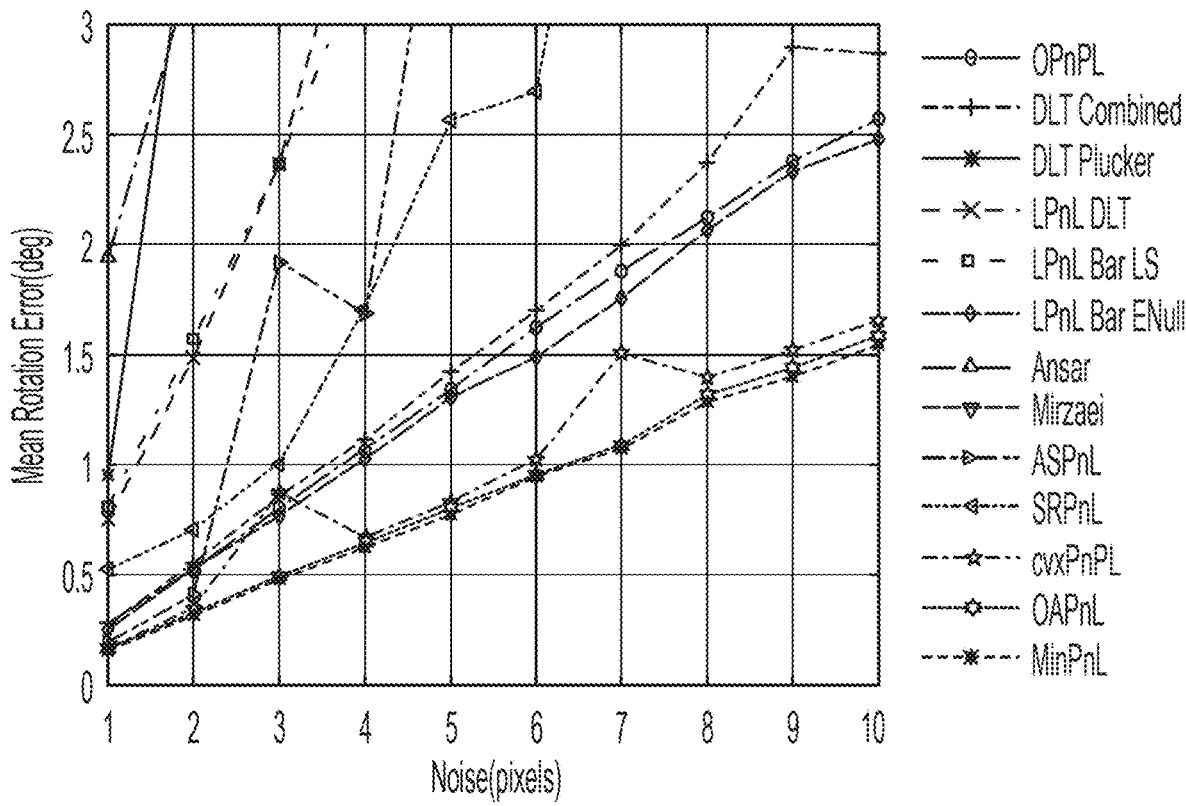
FIG. 24C is a plot showing median rotation errors of different PnL algorithms, according to some embodiments.
Figure 24D:
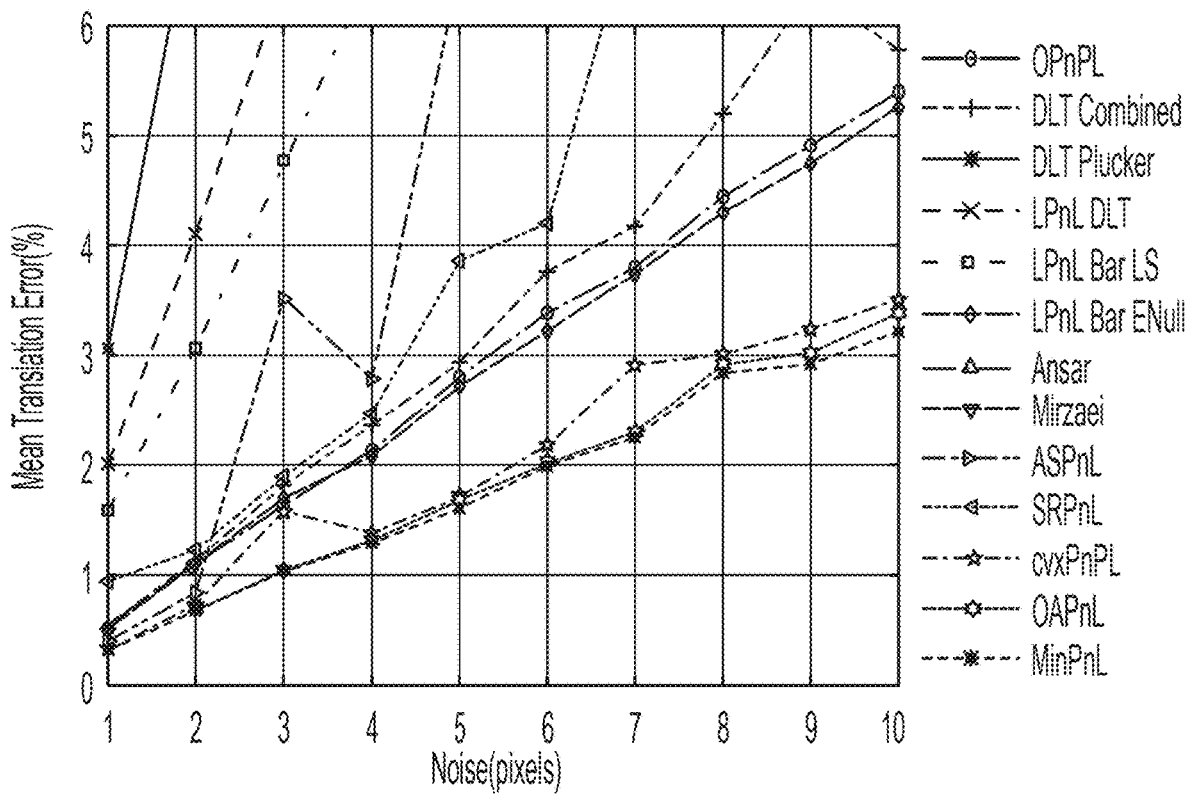
FIG. 24D is a plot showing median translation errors of different PnL algorithms, according to some embodiments.
Figure 25A:
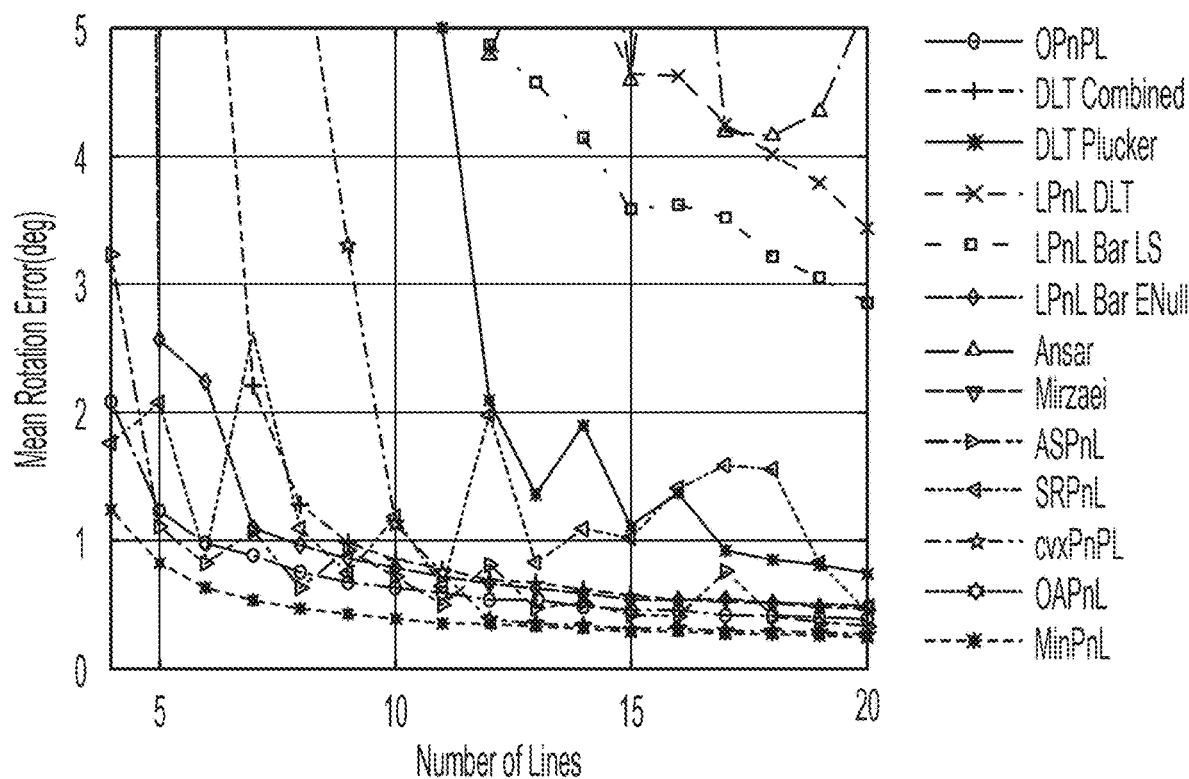
FIG. 25A is a plot showing mean rotation errors of different PnL algorithms, according to some embodiments.
Figure 25B:
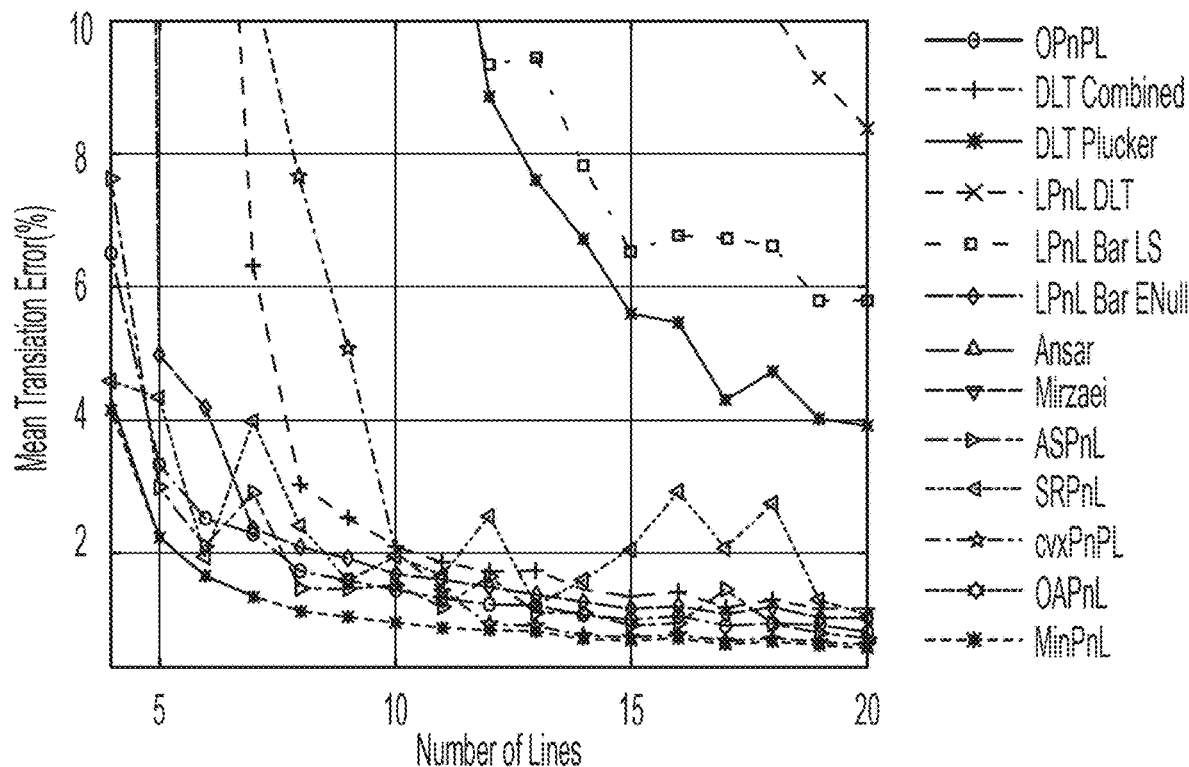
FIG. 25B is a plot showing mean translation errors of different PnL algorithms, according to some embodiments.
Figure 25C:
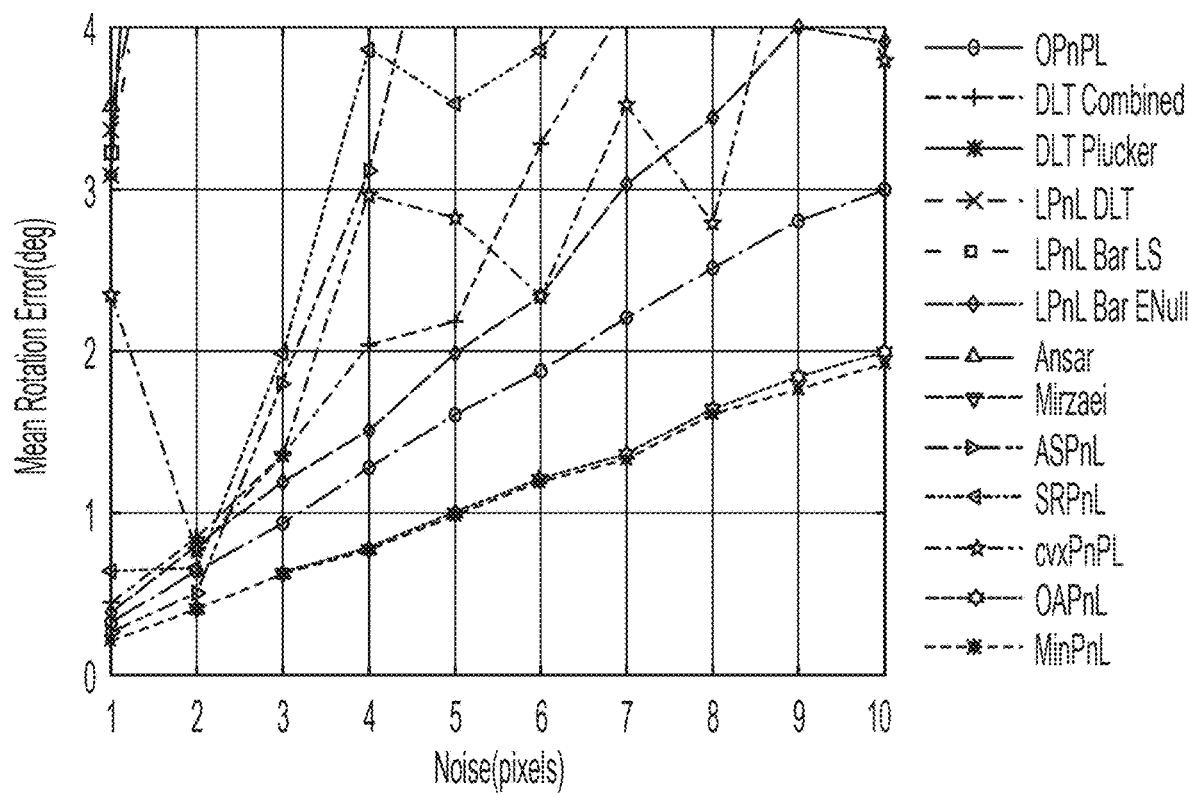
FIG. 25C is a plot showing median rotation errors of different PnL algorithms, according to some embodiments.
Figure 25D:
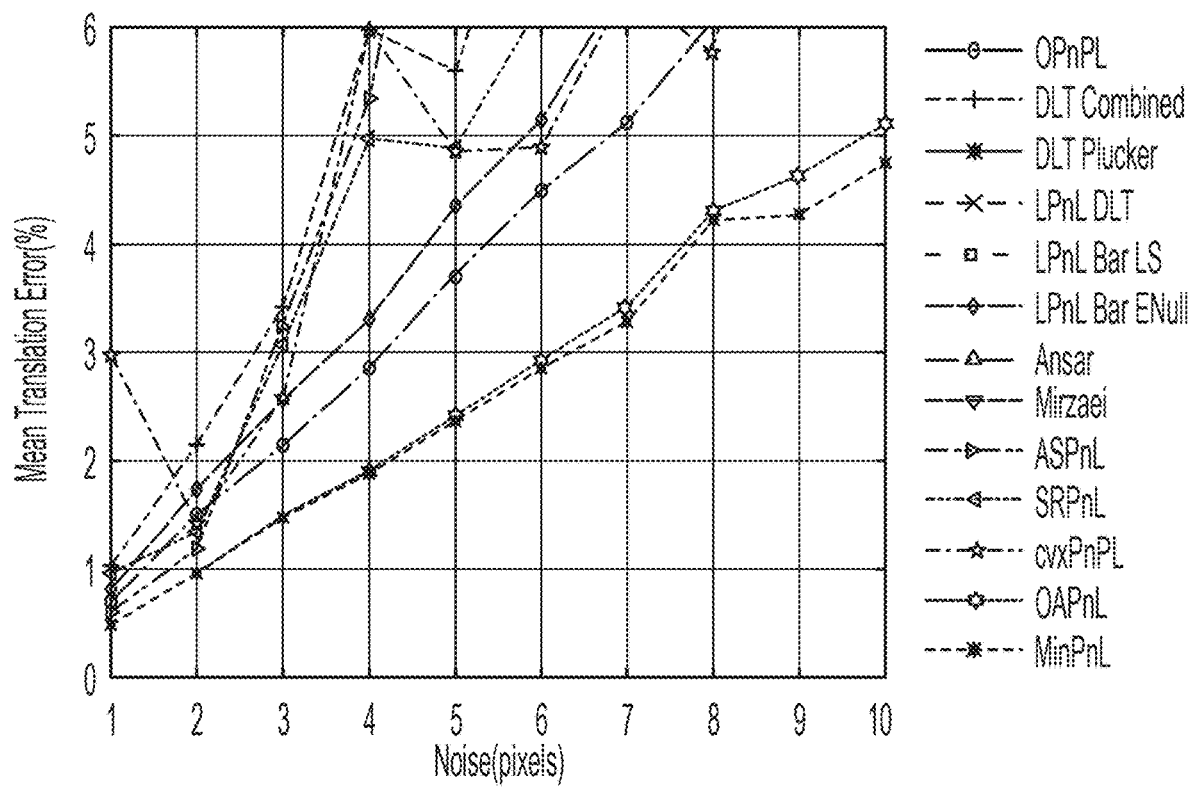
FIG. 25D is a plot showing median translation errors of different PnL algorithms, according to some embodiments.

FIGS. 23 A-B demonstrate the results. FIG. 23 A shows a comparison of mean rotational error in degrees between different P3L algorithms. FIG. 23 B shows a boxplot of rotational error between different P3L algorithms. The fixed choose of $r_3$ may encounter numerical problems when $K_3$ approximates a singular matrix. The Gram-Schmidt process used in some embodiments of the solution to the algorithm described herein can solve this problem, thus generating more stable results.

Figure 22B:
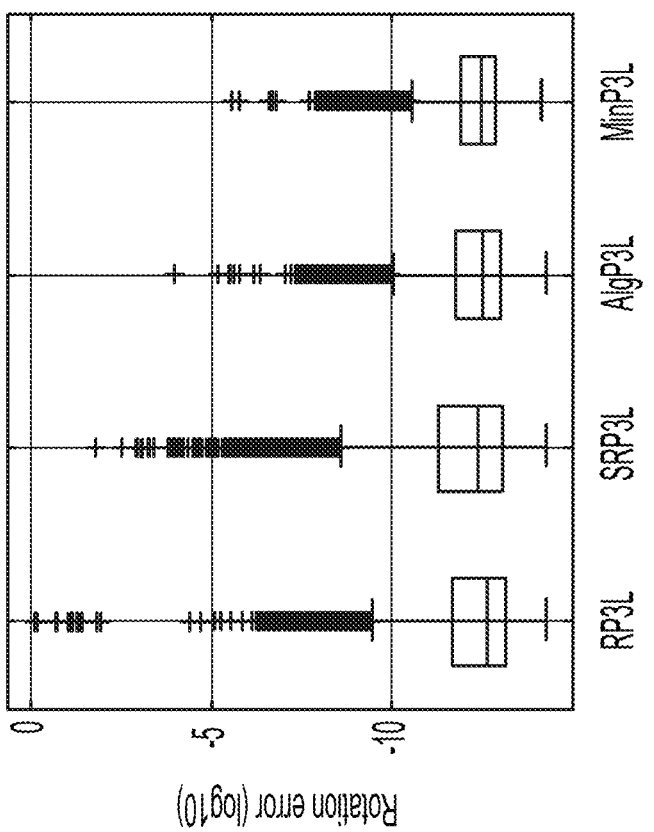
FIG. 22B is a box plot of translation error of an embodiment of an algorithm described herein and previous algorithms AlgP3L, RP3L and SRP3L, according to some embodiments.
Figure 22A:
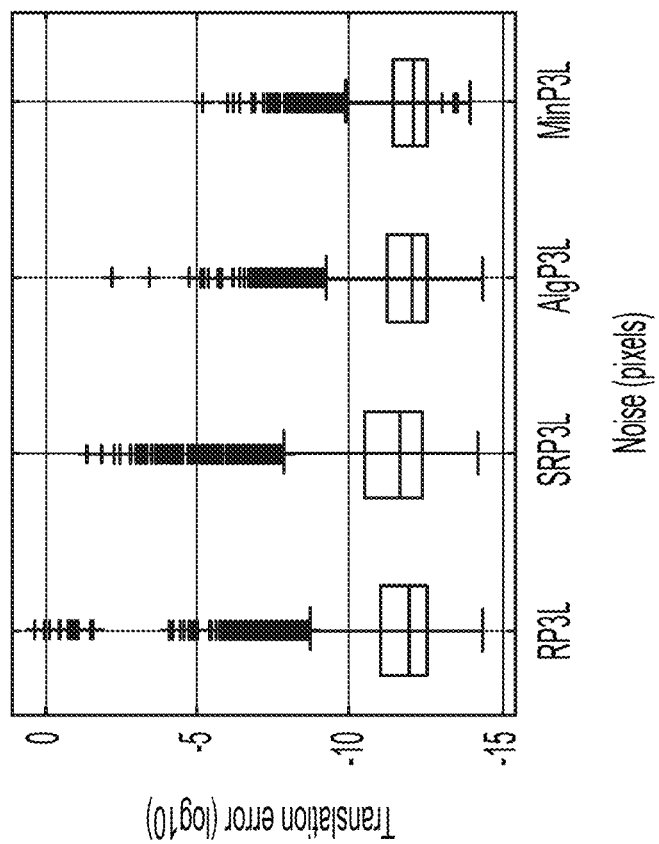
FIG. 22A is a plot of rotation error of an embodiment of an algorithm described herein and previous algorithms AlgP3L, RP3L and SRP3L, according to some embodiments.

MinP3L, a solution to the P3L problem as described herein, may be compared with previous P3L algorithms including AlgP3L (e.g. as described in "A stable algebraic camera pose estimation for minimal configurations of 2d/3d point and line correspondences. In: Asian Conference on Computer Vision"), RP3L (e.g. as described in "Pose estimation from line correspondences: A complete analysis and a series of solutions. IEEE transactions on pattern analysis and machine intelligence"), and SRP3L. To fairly compare the performance, the results are without the iterative refinement, as the compared algorithms do not have the refinement. The numerical stability of different algorithms, i.e., the estimation error without noise must be considered. 10,000 trials were conducted to test the accuracy. FIGS. 22 A-B shows the results. FIG. 22 A shows a box plot of rotation error of an embodiment of an algorithm described herein and algorithms AlgP3L, RP3L and SRP3L. FIG. 22 B shows a box plot of translation error of an embodiment of an algorithm described herein and previous algorithms AlgP3L, RP3L and SRP3L. The rotation and translation errors of MinP3L, which is implemented using methods and techniques described herein, are smaller than $10^{-5}$. Other algorithms all yield large errors as shown by the longer tail in the boxplot figures of FIG. 22. Then the behavior of the P3L algorithms is considered under varying noise level. Gaussian noise is added to the endpoints of the 2D lines. The standard deviation increases from 0.5 to 5 pixels. FIGS. 23 A-B show the results. FIG. 23 A shows mean rotation errors of an embodiment of an algorithm described herein and previous algorithms AlgP3L, RP3L and SRP3L. FIG. 23 B shows mean translation errors of an embodiment of an algorithm described herein and previous algorithms AlgP3L, RP3L and SRP3L.

The MinP3L algorithm, implemented using techniques described herein, shows stability. Similar to the noise-free case, the compared algorithms (e.g. as described in "A stable algebraic camera pose estimation for minimal configurations of 2d/3d point and line correspondences. In: Asian Conference on Computer Vision", "Pose estimation from line correspondences: A complete analysis and a series of solutions. IEEE transactions on pattern analysis and machine intelligence"), each have longer tails than algorithms developed using the techniques described herein. This may be caused by the numerically unstable operations in these algorithms.

As discussed in the references "A robust and efficient algorithm for the pnl problem using algebraic distance to approximate the reprojection distance", "Pose estimation from line correspondences: A complete analysis and a series of solutions. IEEE transactions on pattern analysis and machine intelligence", and "Camera pose estimation from lines: a fast, robust and general method. Machine Vision and Applications 30", two configurations of the 2D line segments were considered, including a centered case (e.g. the 2D line segments are uniformly distributed within the whole image) and an uncentered case (e.g. the 2D line segments are constrained within [0, 160]×[0, 120]). The following results are from 500 independent trials.

In the first experiment, the performance of the PnL algorithms is considered for varying number of correspondences. The standard deviation of the Gaussian noise added to the 2D line endpoints is set to 2 pixels. In the second experiment, we consider the situation of increasing noise level. σ is from 0.5 pixels to 5 pixels stepped by 0.5 pixels, and N is set to 10. FIGS. 24 A-D and 25 A-D shows the mean and median errors. FIG. 24 A shows mean rotation errors of different PnL algorithms. FIG. 24 B shows mean translation errors of different PnL algorithms. FIG. 24 C shows median rotation errors of different PnL algorithms. FIG. 24 D shows median translation errors of different PnL algorithms. FIG. 25 A shows mean rotation errors of different PnL algorithms. FIG. 25 B shows mean translation errors of different PnL algorithms. FIG. 25 C shows median rotation errors of different PnL algorithms. FIG. 25 D shows median translation errors of different PnL algorithms.

Figures 26A, 26B:
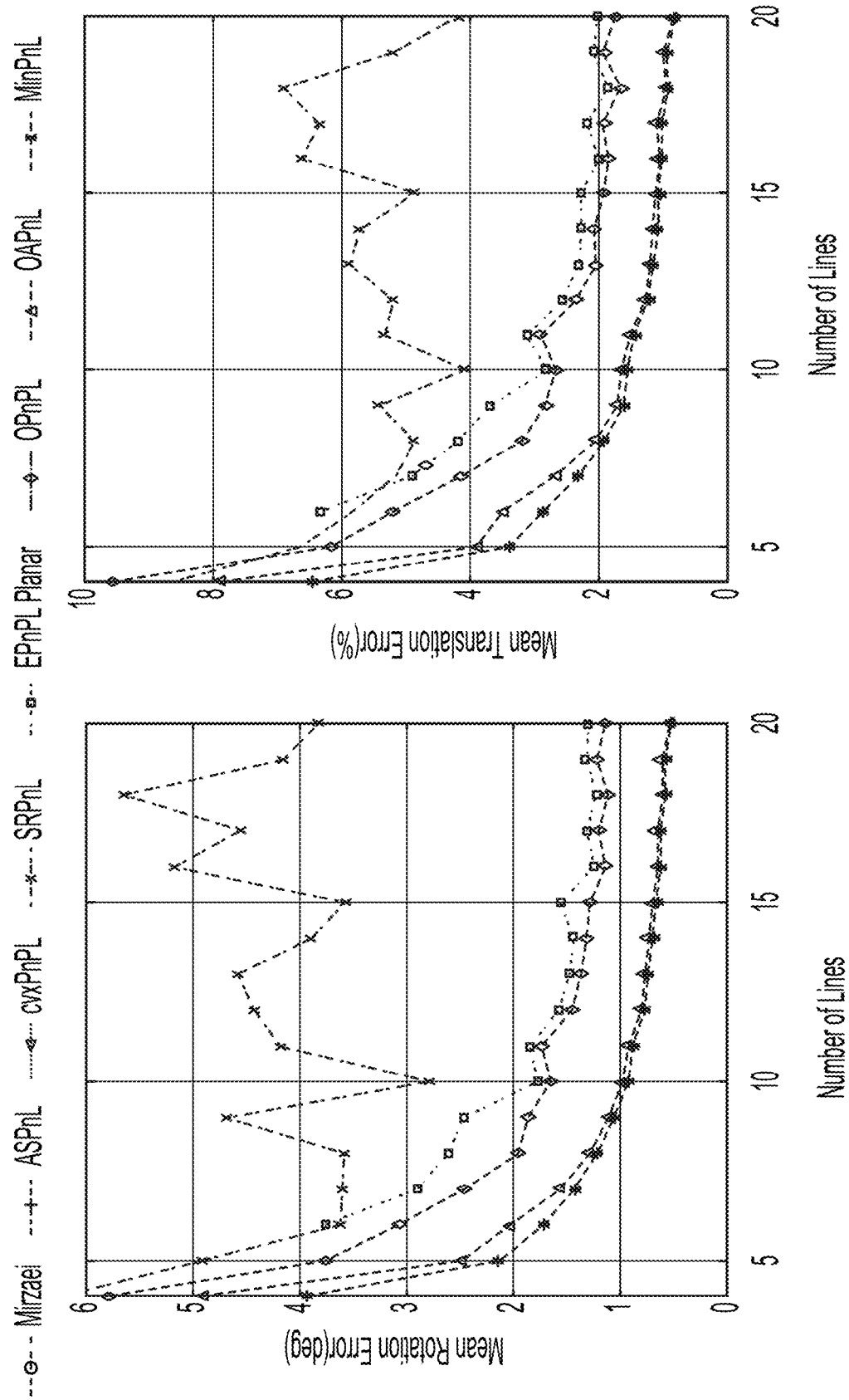
FIG. 26A is a plot showing mean rotation errors of different PnL algorithms, according to some embodiments.
FIG. 26B is a plot showing mean translation errors of different PnL algorithms, according to some embodiments.
Figure 26D:
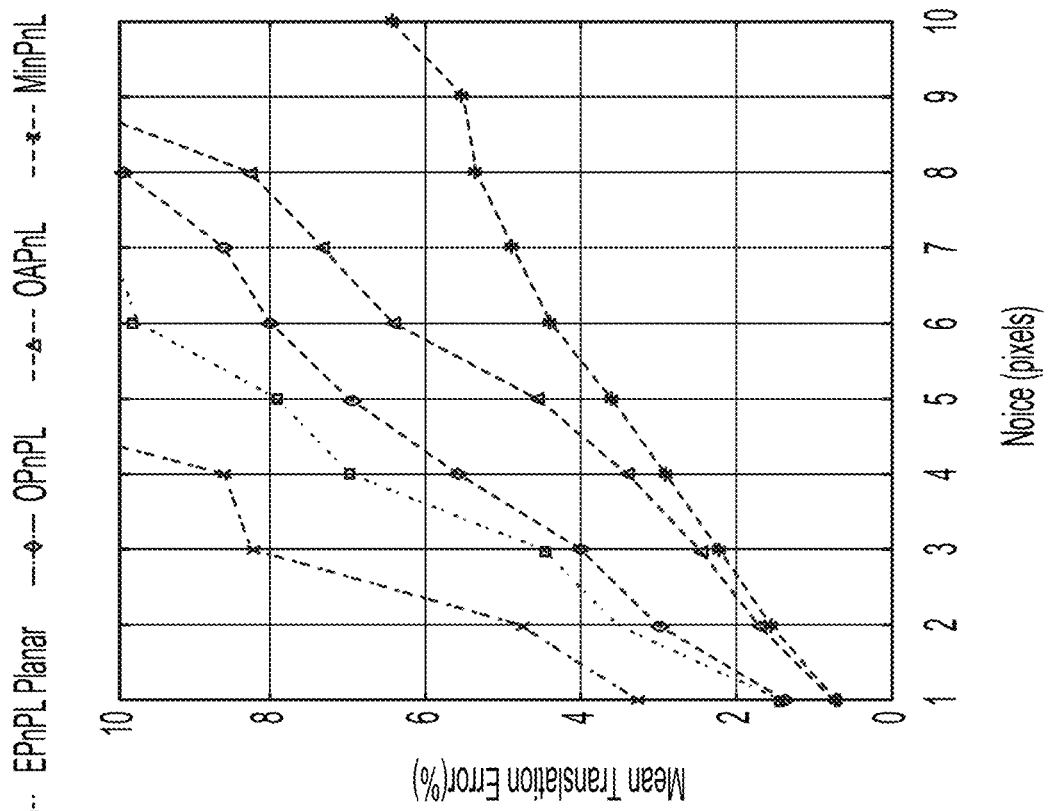
FIG. 26D is a plot showing median translation errors of different PnL algorithms, according to some embodiments.
Figure 26C:
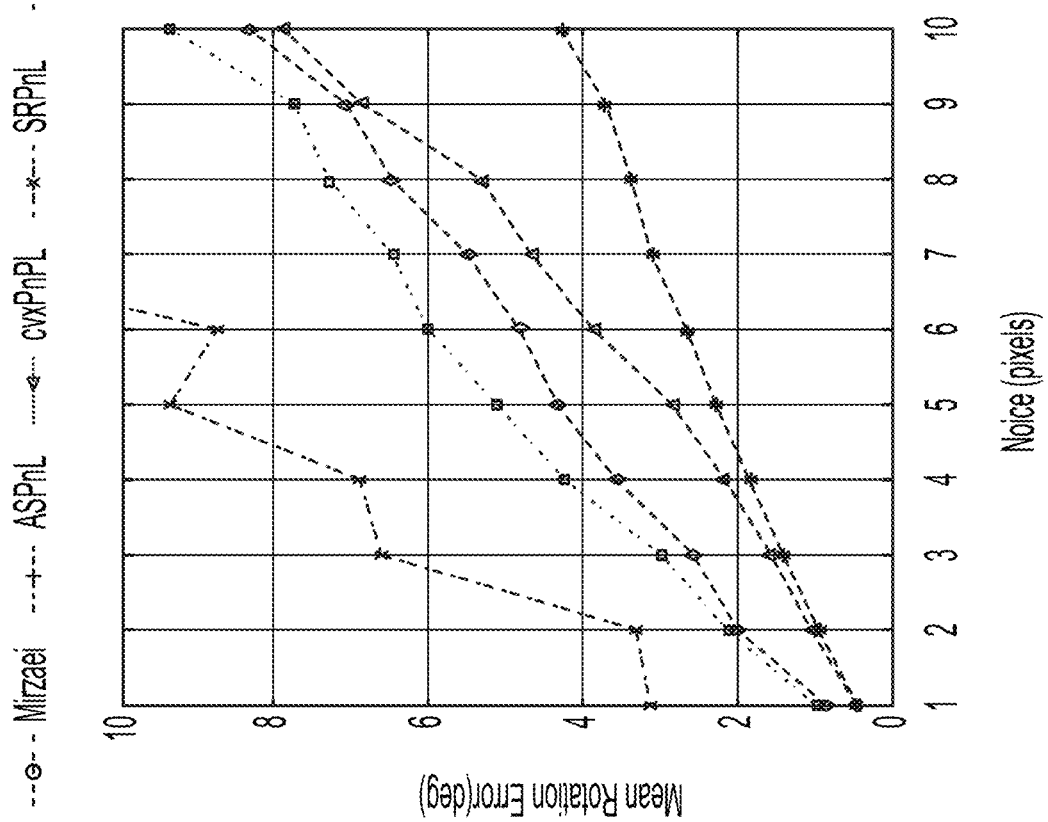
FIG. 26C is a plot showing median rotation errors of different PnL algorithms, according to some embodiments.
Figure 27B:
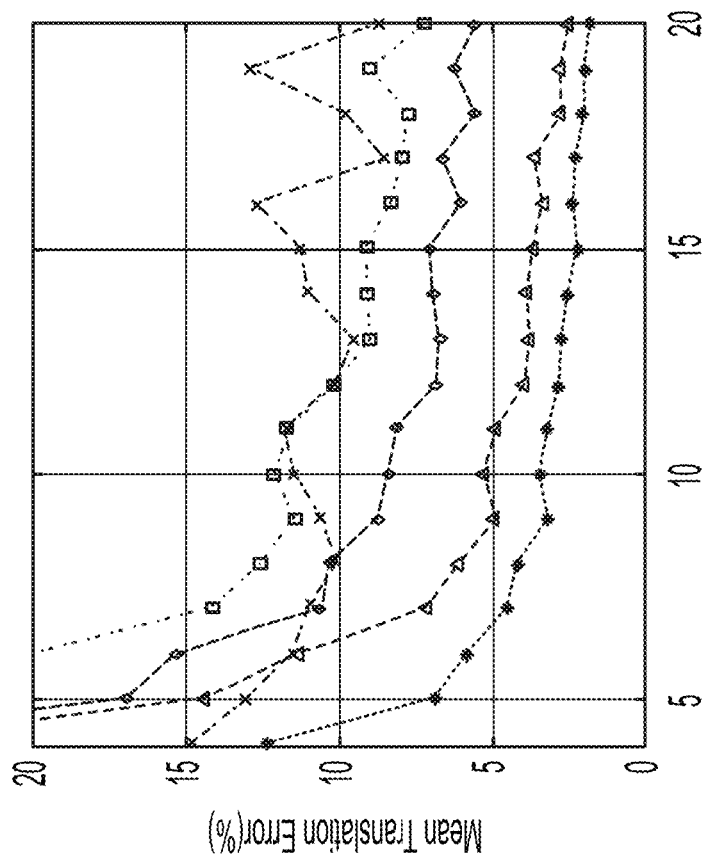
FIG. 27B is a plot showing mean translation errors of different PnL algorithms, according to some embodiments.
Figure 27A:
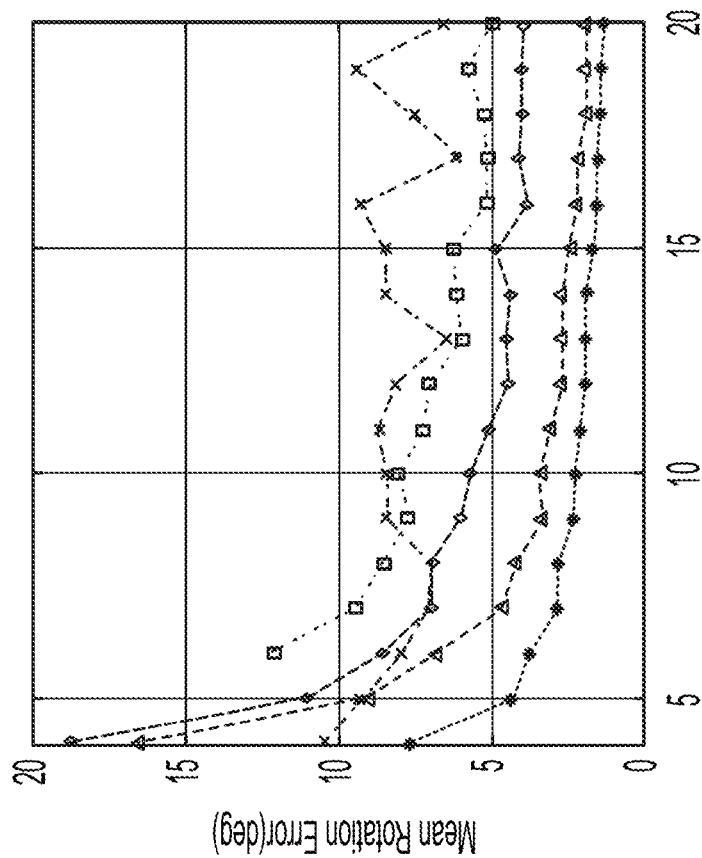
FIG. 27A is a plot showing mean rotation errors of different PnL algorithms, according to some embodiments.
Figure 27C:
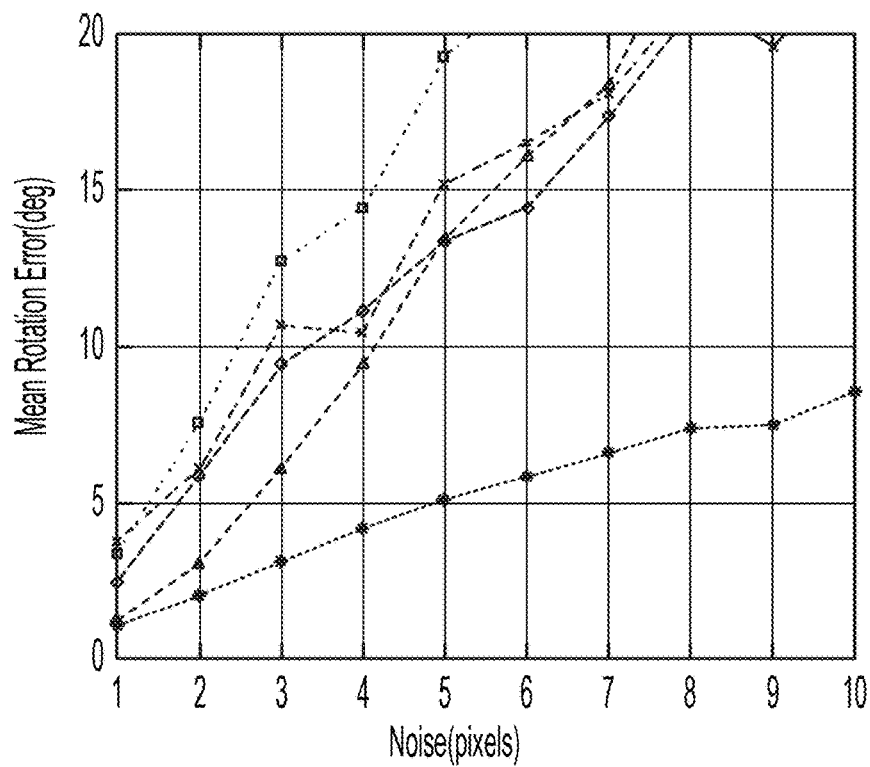
FIG. 27C is a plot showing median rotation errors of different PnL algorithms, according to some embodiments.
Figure 27D:
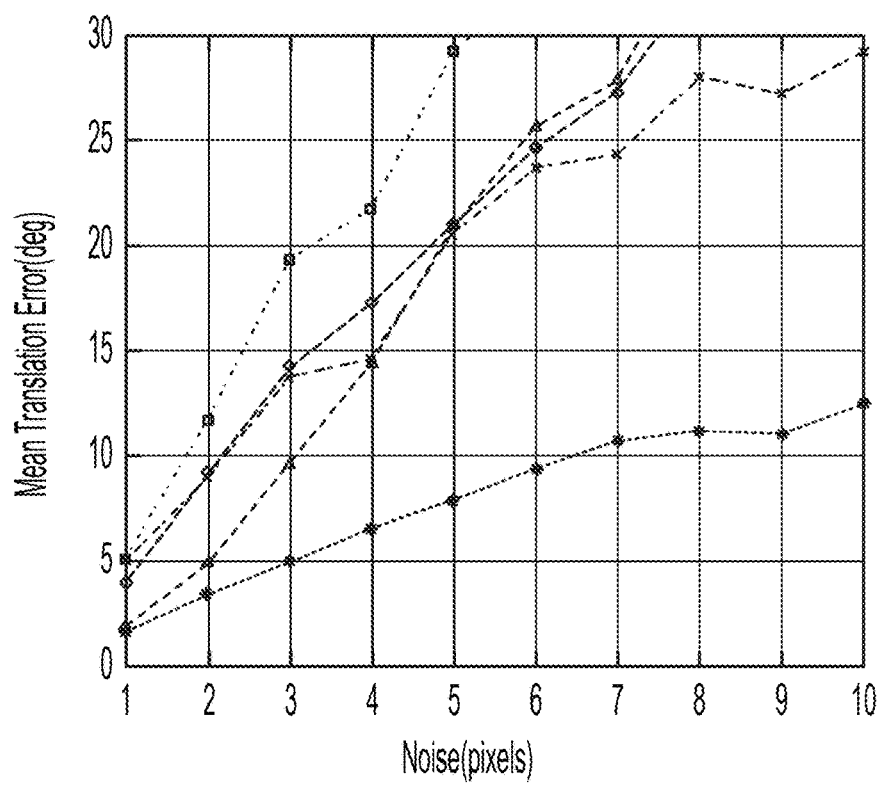
FIG. 27D is a plot showing median translation errors of different PnL algorithms, according to some embodiments.

Typically, solutions based on polynomial formulation are more stable than linear solutions. Other algorithms provide obviously larger errors. Furthermore, the performance of the PnL algorithms in the planar configuration is also considered (i.e. when all the 3D lines are on a plane). The planar configuration widely exists in man-made environments. However, many PnL algorithms are infeasible for the planar configuration as shown in "A robust and efficient algorithm for the pnl problem using algebraic distance to approximate the reprojection distance". Here we compare with 5 PnL algorithms as shown in FIGS. 26A-D and 27 A-D. FIG. 26 A shows mean rotation errors of different PnL algorithms. FIG. 26 B shows mean translation errors of different PnL algorithms. FIG. 26 C shows median rotation errors of different PnL algorithms. FIG. 26 D shows median translation errors of different PnL algorithms. FIG. 27 A shows mean rotation errors of different PnL algorithms. FIG. 27 B shows mean translation errors of different PnL algorithms. FIG. 27 C shows median rotation errors of different PnL algorithms. FIG. 27 D shows median translation errors of different PnL algorithms.

The MinPnL, implemented using techniques and methods described herein, achieves the best results. cvxPnPL and ASPnL (e.g. as described in "Pose estimation from line correspondences: A complete analysis and a series of solutions. IEEE transactions on pattern analysis and machine intelligence"), generate large errors which are out of the scope.

Some methods and techniques described herein for finding the pose of a camera using features may work even when the feature points and feature lines exist on the same plane.

Examples

Real data was also used to evaluate the PnL algorithms. The MPI and VGG datasets are used to evaluate the performance. They include 10 datasets in total, whose characteristics are listed in Table 1. Here we use the absolute translation error $\|t_{gt}-\hat{t}\|_2$ instead of the relative error in the simulation, as the ground truth translation is [0; 0; 0] in some cases. FIG. 28 shows a Table 1 presenting the results. Some algorithms generate large errors even for hundreds of lines, such as Mirzaei (e.g. as described in 'Globally optimal pose estimation from line correspondences. In: 2011 IEEE International Conference on Robotics and Automation. pp. 5581{5588. IEEE (2011)' by Mirzaei, F. M., Roumeliotis, S. I., which is hereby incorporated by reference in its entirety), ASPnL (e.g. as described in "Pose estimation from line correspondences: A complete analysis and a series of solutions. IEEE transactions on pattern analysis and machine intelligence"), and SRPnL (e.g. as described in "Camera pose estimation from lines: a fast, robust and general method. Machine Vision and Applications 30") on the BB dataset. The algorithm MinPnL achieves the best result among the compared algorithms, except for the MC2 dataset, which is slightly worse than the result of OAPnL. But the MinPnL algorithm is much faster as shown in the next section.

Figure 29B:
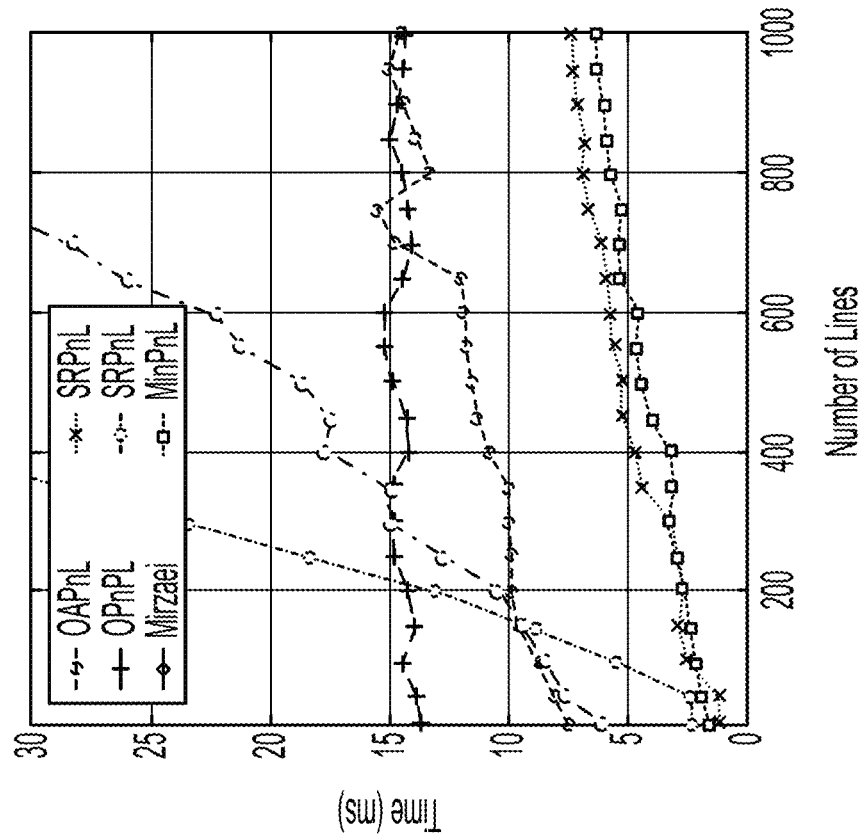
FIG. 29B is a diagram of computational time of an embodiment of an algorithm described herein as compared to computational times of algorithms involving polynomial system.
Figure 29A:
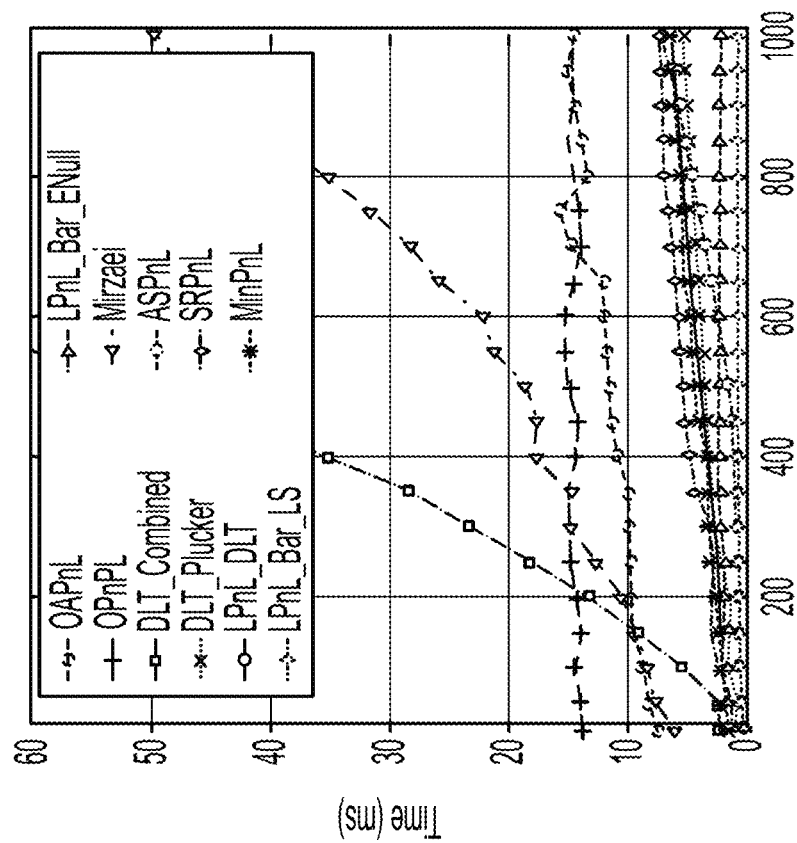
FIG. 29A is a diagram of computational time of many algorithms, according to some embodiments.
Figure 29C:
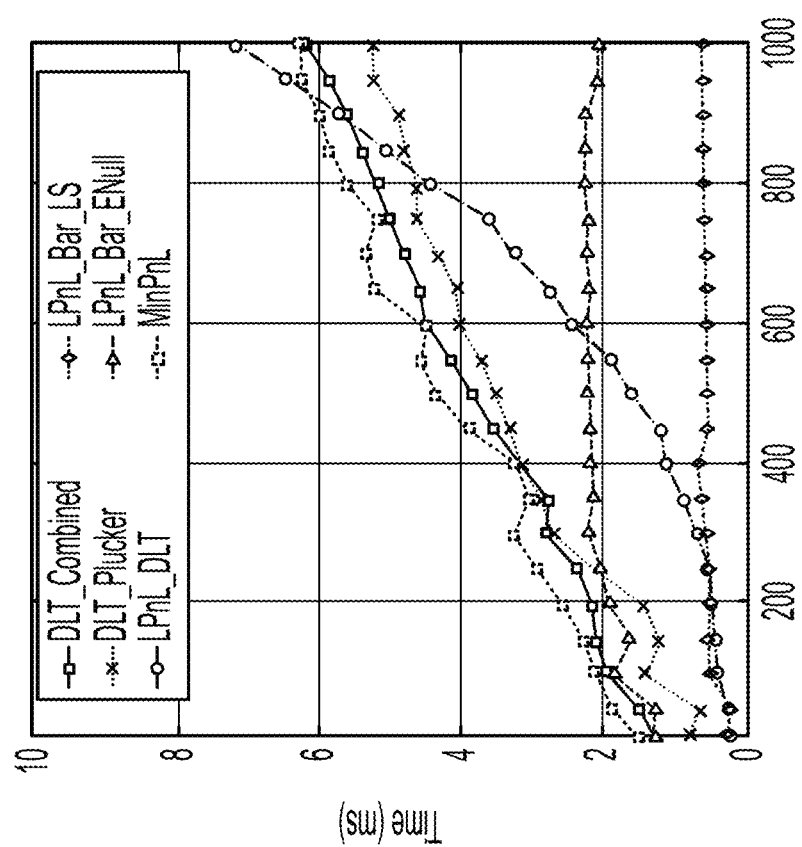
FIG. 29C is a diagram of computational time of an embodiment of an algorithm described herein as compared to computational times of algorithms based on linear transformation.

The computational time of PnL algorithms on a 3.1 HZ intel i7 laptop with Matlab 2019a were determined. The results from 500 independent trails are illustrated in FIGS. 29 A-C. The algorithms Ansar and cvxPnPL are slow and as such are not shown to be in the range of the graphs. As can be seen in FIGS. 29 A-C, the LPnL Bar LS is the fastest of those tested, however it is not stable. As shown above, OAPnL and the algorithm according to embodiments described herein are generally the most stable two algorithms. As shown in FIG. 29B, the algorithm according to embodiments described herein is about 2 times faster than OAPnL. The MinPnL algorithm has similar running time compared to the linear algorithm DLT Combined (e.g. as described in "Absolute pose estimation from line correspondences using direct linear transformation. Computer Vision and Image Understanding") and DLT Plucker (e.g. as described in "Camera pose estimation from lines using pln ucker coordinates. arXiv preprint"), slightly higher than LPnL Bar ENull (e.g. as described in "Pose estimation from line correspondences: A complete analysis and a series of solutions. IEEE transactions on pattern analysis and machine intelligence") when N is within 100, and faster than LPnL DLT (e.g. as described in "Pose estimation from line correspondences: A complete analysis and a series of solutions. IEEE transactions on pattern analysis and machine intelligence") when N is large.

FIG. 29 A is a diagram of computational time of many algorithms.

FIG. 29 B is a diagram of computational time of an embodiment of an algorithm described herein as compared to computational times of algorithms involving polynomial system.

FIG. 29 C is a diagram of computational time of an embodiment of an algorithm described herein as compared to computational times of algorithms based on linear transformation.

Further Considerations

Figure 32:
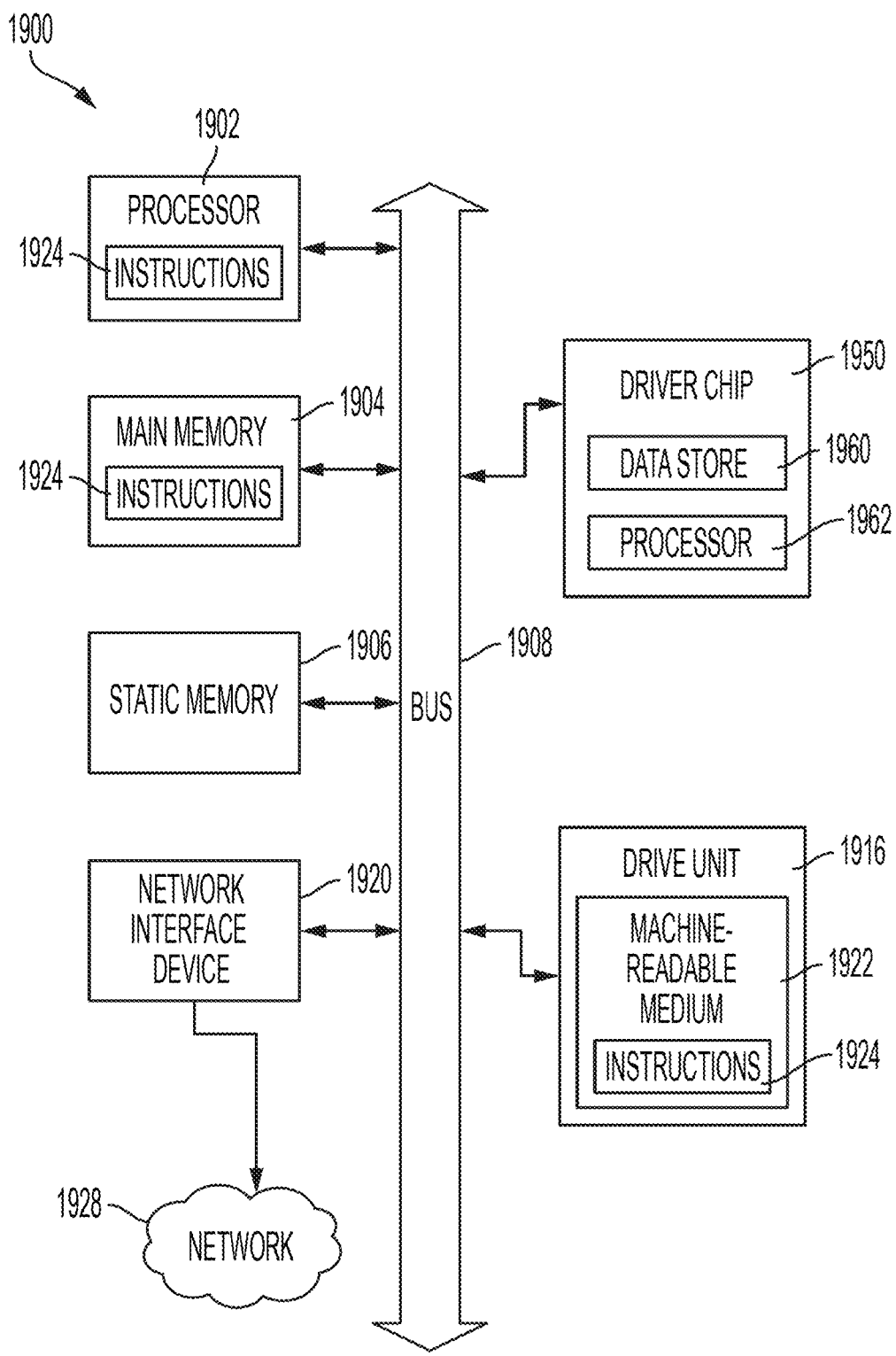
FIG. 32 is a block diagram of a machine in the form of a computer that can find application in the present invention system, according to some embodiments.

FIG. 32 shows a diagrammatic representation of a machine in the exemplary form of a computer system 1900 within which a set of instructions, for causing the machine to perform any one or more of the methodologies discussed herein, may be executed, according to some embodiments. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 1900 includes a processor 1902 (e.g., a central processing unit (CPU), a graphics processing unit (GPU) or both), a main memory 1904 (e.g., read only memory (ROM), flash memory, dynamic random access memory (DRAM) such as synchronous DRAM (SDRAM) or Rambus DRAM (RDRAM), etc.), and a static memory 1906 (e.g., flash memory, static random access memory (SRAM), etc.), which communicate with each other via a bus 1908.

The computer system 1900 may further include a disk drive unit 1916, and a network interface device 1920.

The disk drive unit 1916 includes a machine-readable medium 1922 on which is stored one or more sets of instructions 1924 (e.g., software) embodying any one or more of the methodologies or functions described herein. The software may also reside, completely or at least partially, within the main memory 1904 and/or within the processor 1902 during execution thereof by the computer system 1900, the main memory 1904 and the processor 1902 also constituting machine-readable media.

The software may further be transmitted or received over a network 18 via the network interface device 1920.

The computer system 1900 includes a driver chip 1950 that is used to drive projectors to generate light. The driver chip 1950 includes its own data store 1960 and its own processor 1962.

While the machine-readable medium 1922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

In accordance with various embodiments, communication network 1928 may be a local area network (LAN), a cell phone network, a Bluetooth network, the internet, or any other such network.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Such alterations, modifications, and improvements are intended to be part of this disclosure and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above.

Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Some values are described as being derived by "minimizing" or "optimizing." It should be understood that words such as "minimizing" and "optimizing" may, but need not, entail finding the smallest or largest possible value. Rather, these results may be achieved by finding the smallest or largest value based on a practical constraint, such as a number of iterations of process or executing successive iterations of a process until the change between iterations is below a threshold.

What is claimed is:

1. A method of determining a pose of a camera with respect to a map based on one or more images captured with the camera, wherein the pose is represented as a rotation matrix and a translation matrix, the method comprising:
   developing correspondences between a combination of points and/or lines in the one or more images and the map;
   transforming the correspondences into a set of three second-order polynomial equations;
   solving the set of equations for the rotation matrix; and
   computing the translation matrix based on the rotation matrix.

2. The method of claim 1, where the combination of points and/or lines are determined dynamically based on characteristics of the one or more images.

3. The method of claim 1, further comprising refining the pose by minimizing a cost function.

4. The method of claim 1, further comprising refining the pose by using a damped Newton step.

5. The method of claim 1, wherein transforming the correspondences into a set of three second-order polynomial equations comprises:
   deriving a set of constraints from the correspondences;
   forming a close-form expression of the translation matrix; and
   using a 3D vector to form a parametrization of the rotation matrix.

6. The method of claim 5, wherein using the 3D vector to form the parametrization of the rotation matrix comprises using Cayley-Gibbs-Rodriguez (CGR) parametrization.

7. The method of claim 5, wherein forming a close-form expression of the translation matrix comprises forming a linear equation system using the set of constraints.

8. The method of claim 1, wherein transforming the correspondences into a set of three second-order polynomial equations further comprises denoising by rank approximation.

9. The method of claim 1, wherein solving the set of equations for the rotation matrix comprises using a hidden variable method.

10. A method of determining the pose of a camera with respect to a map based on one or more images captured with the camera, wherein the pose is represented as a rotation matrix and a translation matrix, the method comprising:
    developing a plurality of correspondences between a combination of points and/or lines in the one or more images and the map;
    expressing the correspondences as an over-determined set of equations in a plurality of variables;
    formatting the over-determined set of equations as a minimal set of equations of meta-variables, in which each of the meta-variables represents a group of the plurality of variables;
    computing values of the meta-variables based on the minimal set of equations; and
    computing the pose from the meta-variables.

11. The method of claim 10, where the combination of points and/or lines may be determined dynamically based on characteristics of the one or more images.

12. The method of claim 11, wherein computing the pose from the meta-variables comprises:
    computing the rotation matrix; and
    computing the translation matrix based on the rotation matrix.

13. The method of claim 12, wherein computing the translation matrix comprises:
    deriving a set of constraints from the correspondences;
    forming a close-form expression of the translation matrix; and
    forming a linear equation system using the set of constraints.

14. The method of claim 11, wherein computing the translation matrix based on the rotation matrix comprises computing the translation matrix from an equation that expresses the plurality of correspondences based on the rotation matrix and is linear with respect to the translation matrix.

15. A portable electronic device comprising:
    a camera configured to capture one or more images;
    a processor; and
    a non-transitory computer-readable medium storing instructions that, when executed by the processor, cause the processor to determine a pose of the camera with respect to a map based on the one or more images captured by the camera, the pose represented as a rotation matrix and a translation matrix, wherein the instructions cause the processor to:
      develop correspondences between a combination of points and/or lines in the one or more images and the map;
      transform the correspondences into a set of three second-order polynomial equations;
      solve the set of equations for the rotation matrix; and
      compute the translation matrix based on the rotation matrix.

16. The device of claim 15, where the combination of points and/or lines are determined dynamically based on characteristics of the one or more images.

17. The device of claim 15, wherein the instructions further cause the processor to refine the pose by minimizing a cost function.

18. The device of claim 15 wherein transforming the correspondences into a set of three second-order polynomial equations comprises:
    deriving a set of constraints from the correspondences;
    forming a close-form expression of the translation matrix; and
    using a 3D vector to form a parameterization of the rotation matrix.

19. The device of claim 18, wherein using the 3D vector to form the parameterization of the rotation matrix comprises using CGR parameterization.

20. The device of claim 15, wherein transforming the correspondences into a set of three second-order polynomial equations comprises denoising by rank approximation.

* * * * *